United States Patent
Young et al.

(10) Patent No.: US 9,038,047 B2
(45) Date of Patent: *May 19, 2015

(54) AIRCRAFT SOFTWARE PART LIBRARY

(71) Applicant: The Boeing Company, Chicago, IL (US)

(72) Inventors: Dawnray H. Young, Camas, WA (US); Walter R. Beck, Salkum, WA (US); Travis Stephen Reid, Seattle, WA (US); Olga C. Walker, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/803,728

(22) Filed: Mar. 14, 2013

(65) Prior Publication Data

US 2013/0212569 A1    Aug. 15, 2013

Related U.S. Application Data

(63) Continuation of application No. 12/276,516, filed on Nov. 24, 2008, now Pat. No. 8,490,074.

(60) Provisional application No. 60/990,471, filed on Nov. 27, 2007.

(51) Int. Cl.
*G06F 9/44* (2006.01)
*G06F 9/445* (2006.01)

(52) U.S. Cl.
CPC ... *G06F 8/65* (2013.01); *G06F 8/61* (2013.01)

(58) Field of Classification Search
USPC ........................................................ 717/167
See application file for complete search history.

(56) References Cited

U.S. PATENT DOCUMENTS

| 3,748,597 A | 7/1973 | Reinhart |
| 4,216,168 A | 8/1980 | Evans et al. |

(Continued)

FOREIGN PATENT DOCUMENTS

| WO | 2009070655 A1 | 6/2009 |
| WO | 2009082592 A2 | 7/2009 |

OTHER PUBLICATIONS

Myron Kayton, "Avionics for Manned Spacecraft", vol. 25, No. 6, Nov. 1989, IEEE.*

(Continued)

*Primary Examiner* — Anna Deng
*Assistant Examiner* — Junchun Wu
(74) *Attorney, Agent, or Firm* — Yee & Associates, P.C.

(57) ABSTRACT

A computer implemented method, apparatus, and computer program product for managing aircraft software parts. An aircraft software part is received at a library. The received part is stored in the library with other aircraft software parts. A user interface is provided to manipulate the aircraft software parts. Responsive to receiving a user input from the user interface to uplink a selected aircraft software part to a target aircraft data processing system, a command is created to send the selected part to an aircraft in which the target aircraft data processing system is located. The uplink command is stored in a queue in the storage in the library. The uplink command is distributed to a proxy server application in response to a request for commands. Responsive to receiving a request from the proxy server application processing the stored uplink command, the selected part is sent to the proxy server application.

19 Claims, 57 Drawing Sheets

(56) References Cited

U.S. PATENT DOCUMENTS

| | | | |
|---|---|---|---|
| 6,044,323 A | 3/2000 | Yee et al. | |
| 6,047,165 A | 4/2000 | Wright et al. | |
| 6,085,067 A * | 7/2000 | Gallagher et al. | 455/13.1 |
| 6,173,230 B1 | 1/2001 | Camus et al. | |
| 6,181,992 B1 | 1/2001 | Gurne et al. | |
| 6,313,759 B1 | 11/2001 | Musland-Sipper | |
| 6,385,513 B1 | 5/2002 | Murray et al. | |
| 6,438,468 B1 | 8/2002 | Muxlow et al. | |
| 6,529,706 B1 | 3/2003 | Mitchell | |
| 6,567,040 B1 * | 5/2003 | Sevaston | 342/354 |
| 6,671,589 B2 | 12/2003 | Holst et al. | |
| 6,675,382 B1 | 1/2004 | Foster | |
| 6,691,004 B2 | 2/2004 | Johnson et al. | |
| 6,732,031 B1 | 5/2004 | Lightner et al. | |
| 6,741,841 B1 | 5/2004 | Mitchell | |
| 6,748,597 B1 | 6/2004 | Frisco et al. | |
| 6,795,758 B2 | 9/2004 | Sinex | |
| 6,816,728 B2 | 11/2004 | Igloi et al. | |
| 6,816,762 B2 | 11/2004 | Hensey et al. | |
| 6,831,912 B1 | 12/2004 | Sherman | |
| 6,898,492 B2 | 5/2005 | de Leon et al. | |
| 7,103,317 B2 | 9/2006 | Chang et al. | |
| 7,113,851 B1 * | 9/2006 | Gelon et al. | 701/13 |
| 7,133,767 B2 | 11/2006 | Ogino et al. | |
| 7,151,985 B2 | 12/2006 | Tripmaker | |
| 7,167,704 B2 * | 1/2007 | Chang et al. | 455/431 |
| 7,194,620 B1 | 3/2007 | Hayes | |
| 7,203,596 B2 | 4/2007 | Ledingham et al. | |
| 7,219,339 B1 * | 5/2007 | Goyal et al. | 717/143 |
| 7,230,221 B2 | 6/2007 | Busse et al. | |
| 7,254,640 B1 | 8/2007 | Alexander | |
| 7,292,579 B2 | 11/2007 | Morris | |
| 7,313,143 B1 | 12/2007 | Bruno | |
| 7,346,435 B2 | 3/2008 | Amendola et al. | |
| 7,356,389 B2 | 4/2008 | Holst et al. | |
| 7,366,589 B2 | 4/2008 | Habermas | |
| 7,412,291 B2 | 8/2008 | Judd et al. | |
| 7,420,476 B2 | 9/2008 | Stiffler | |
| 7,426,387 B2 | 9/2008 | Wright et al. | |
| 7,437,715 B2 | 10/2008 | Chatsinchai et al. | |
| 7,478,381 B2 | 1/2009 | Roberts et al. | |
| 7,506,309 B2 | 3/2009 | Schaefer | |
| 7,516,168 B2 | 4/2009 | LeCrone et al. | |
| 7,551,086 B2 | 6/2009 | Coop et al. | |
| 7,555,657 B2 | 6/2009 | Nasu | |
| 7,636,568 B2 | 12/2009 | Gould et al. | |
| 7,647,139 B2 | 1/2010 | Sandell et al. | |
| 7,653,212 B2 | 1/2010 | Haughawout et al. | |
| 7,703,145 B2 | 4/2010 | Stelling et al. | |
| 7,720,975 B2 | 5/2010 | Erickson | |
| 7,734,740 B2 | 6/2010 | To | |
| 7,747,531 B2 | 6/2010 | Cronce | |
| 7,756,145 B2 | 7/2010 | Kettering et al. | |
| 7,856,631 B2 | 12/2010 | Brodkorb et al. | |
| 7,876,259 B2 | 1/2011 | Schuchman | |
| 7,904,608 B2 | 3/2011 | Price | |
| 7,908,042 B2 | 3/2011 | Brinkley et al. | |
| 7,974,939 B2 | 7/2011 | Nanjangud Bhaskar et al. | |
| 8,027,758 B2 | 9/2011 | Ferro et al. | |
| 8,055,396 B2 | 11/2011 | Yates et al. | |
| 8,074,214 B2 | 12/2011 | Isaacson et al. | |
| 8,090,525 B2 | 1/2012 | Villiers | |
| 8,091,858 B2 | 1/2012 | Janich et al. | |
| 8,165,930 B2 | 4/2012 | Harnish et al. | |
| 8,185,254 B2 | 5/2012 | Brinkman | |
| 8,185,609 B2 | 5/2012 | Fuchs et al. | |
| 2002/0111720 A1 * | 8/2002 | Holst et al. | 701/3 |
| 2003/0003872 A1 | 1/2003 | Brinkley et al. | |
| 2003/0109973 A1 * | 6/2003 | Hensey et al. | 701/35 |
| 2003/0188303 A1 | 10/2003 | Barman et al. | |
| 2003/0191559 A1 * | 10/2003 | Chatsinchai et al. | 700/245 |
| 2003/0200026 A1 | 10/2003 | Pearson | |
| 2003/0203734 A1 * | 10/2003 | Igloi et al. | 455/431 |
| 2003/0225492 A1 | 12/2003 | Cope et al. | |
| 2004/0049609 A1 | 3/2004 | Simonson et al. | |
| 2005/0071385 A1 | 3/2005 | Rao | |
| 2005/0228558 A1 | 10/2005 | Valette et al. | |
| 2005/0286452 A1 | 12/2005 | Hardgrave et al. | |
| 2006/0010438 A1 | 1/2006 | Brady et al. | |
| 2006/0229772 A1 | 10/2006 | McClary | |
| 2006/0265110 A1 * | 11/2006 | Ferro et al. | 701/3 |
| 2008/0104686 A1 * | 5/2008 | Erickson | 726/7 |
| 2008/0140278 A1 | 6/2008 | Breed | |
| 2008/0151794 A1 * | 6/2008 | Moilanen | 370/310 |
| 2008/0208853 A1 | 8/2008 | Vismans et al. | |
| 2009/0024312 A1 * | 1/2009 | Brinkman | 701/200 |
| 2009/0138385 A1 | 5/2009 | Harnish et al. | |
| 2009/0138516 A1 | 5/2009 | Young et al. | |
| 2009/0138517 A1 | 5/2009 | McLain et al. | |
| 2009/0138518 A1 | 5/2009 | Rodgers et al. | |
| 2009/0138871 A1 | 5/2009 | Kimberly et al. | |
| 2009/0138872 A1 | 5/2009 | Fuchs et al. | |
| 2009/0138873 A1 | 5/2009 | Beck et al. | |
| 2009/0138874 A1 * | 5/2009 | Beck et al. | 717/173 |
| 2010/0017578 A1 | 1/2010 | Mansson et al. | |
| 2013/0246574 A1 | 9/2013 | Kimberly et al. | |

OTHER PUBLICATIONS

Eric Frew, "Flight Demonstrations of Self-directed Collaborative Navigation of Small Unmanned Aircraft", Sep. 2004, American Institute of Aeronautics and Astronautics.*

Arinc, "Optimization Requirements Document for the Meteorological Data Collection and Reporting System/Aircraft Meteorological Data Relay System", Mar. 2006, NOAA.*

Adelsbach et al., "Embedding Trust into Cars—Secure Software Delivery and Installation," Third Workshop on Embedded Security in Cars (ESCAR 2005), Nov. 2005, 15 pages.

Bhagavathula et al., "Efficient Data Storage Mechanisms for DAP," Proceedings of the 23rd Digital Avionics Systems Conference (DASC '04), Oct. 2004, 7 pages.

De Boer et al., "Generic Remote Software Update for Vehicle ECUs Using a Telematics Device as a Gateway," in: Advanced Microsystems for Automotive Applications 2005, Valdorf et al., (Eds.), Springer, May 2005, pp. 371-380.

Sampigethaya et al., "Information Management System for Ground Vehicles," U.S. Appl. No. 12/857,740, filed Aug. 17, 2010, 74 pages.

International Search Report, dated Jan. 26, 2009, regarding Application No. PCT/US2008084824 (WO2009070655), 2 pages.

International Search Report, dated May 22, 2009, regarding Application No. PCT/US2008/084839 (WO2009082592), 2 pages.

Written Opinion of the Hungarian Intellectual Property Office, dated Feb. 2, 2012, regarding Application No. 201002236-6, 9 pages.

Kayton, "Avionics for Manned Spacecraft," IEEE Transactions on Aerospace and Electronic Systems, vol. 25, No. 6, Nov. 1989, pp. 786-827.

* cited by examiner

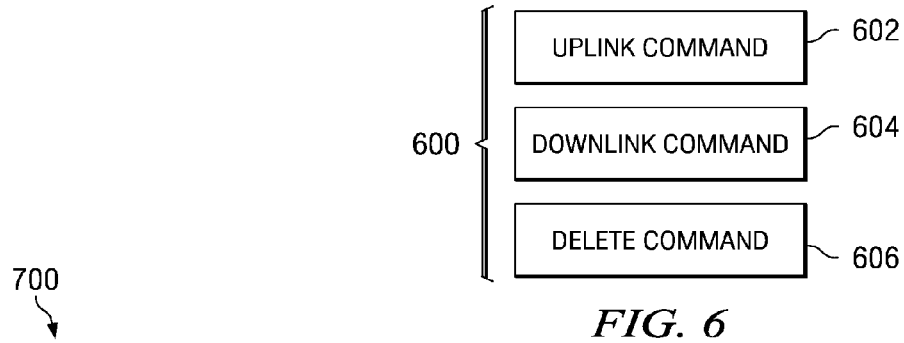
FIG. 6
```
700
<Cmd xmlns="http://www.boeing.com/787/obeds">
    <MsgId>kmad09ce87i6ef3c</MsgId> — 702
    <Type>uplink</Type> — 704
    <System>CIS-MS</System> — 706
    <AppId>OSM</AppId> — 708
    <LinkLabel>SMT</LinkLabel> — 710
    <ServerAddress>172.24.10.50</ServerAddress> — 712
    <DataType>LSAP</DataType> — 714
    <Resource type="LSAP">PNU 120 OJSDO</Resource> — 716
</Cmd>
```
FIG. 7
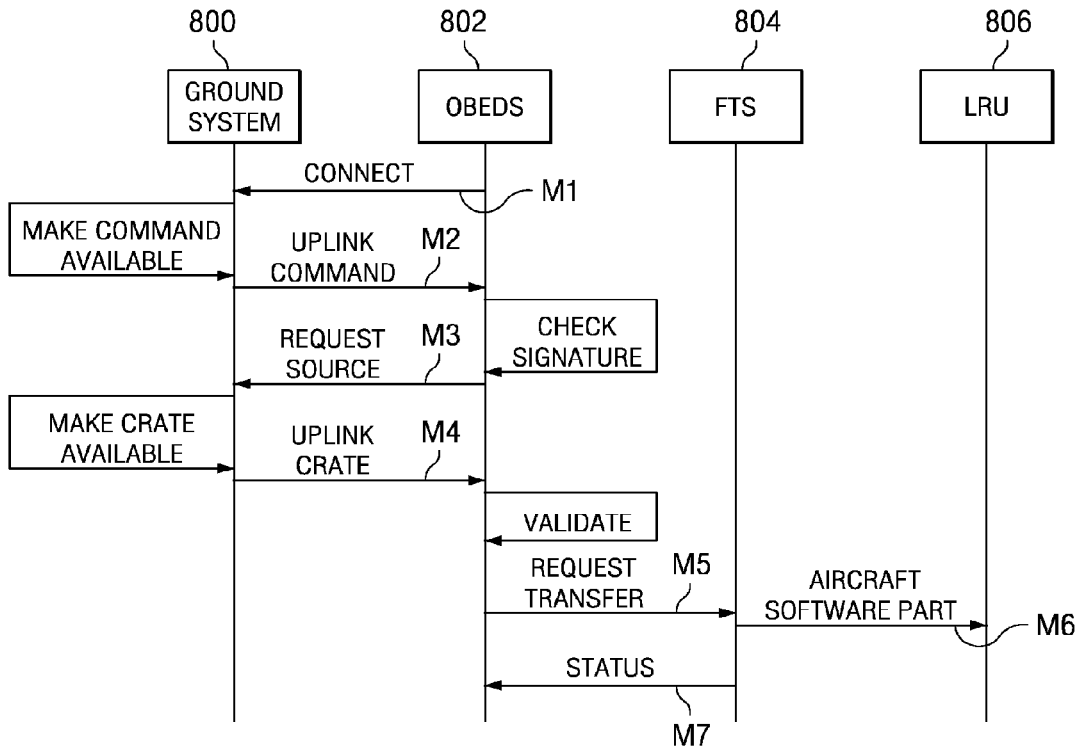
FIG. 8

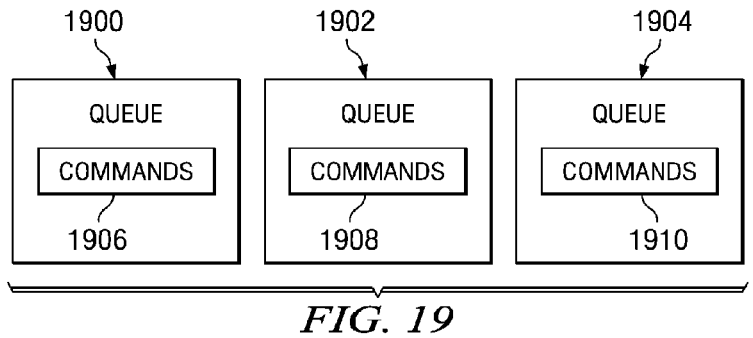

FIG. 19

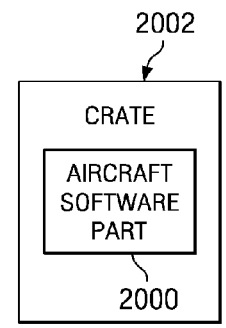

2100 {
Delete Command:
　//A list of file name to be deleted
　　String[] fileNames;  ～2102

//Or a list of part ID to be deleted
　　long [] partIds;～2104

//A list of airplane ID receiving command
　　long [] airplaneIds;～2106

//A list of device ID to serve the command
　　long [] deviceIds;～2108

//the destination system to receive the command
　　long sysAppId; ～2110

//device ID that request the command.
　　String user; ～2112

FIG. 22

2200 {
Uplink Command:
　//part ID this command include
　　long partId; ～2202

//A list of airplane ID receiving command
　　long [] airplaneIds;～2204

//A list of device ID to serve the command
　　long [] deviceIds;～2206

//the destination system to receive the command
　　long sysAppId;～2208

//device ID that request the command.
　　String user;～2210

| | NAME | NOMENCLATURE | PRODUCTION | EXPIRATION DATE | APPLICABLE STD | FIL |
|---|---|---|---|---|---|---|
| | ABC-Z-DEF-123-4 | This is a short desc. | RED_LABEL | Jul 13,2034 17:38:43 | AppSTD X | 3613 |
| + | DON-Z-123-456-0 | This is a short desc. | RED_LABEL | Jul 13,2034 17:38:43 | AppSTD X | 2809 |
| + | XXX-Z-A000-0100 | XXX82-A000-0-100 | BLUE_LABEL | Jul 13,2034 17:38:43 | ARINC 665-2 | 140972 |
| + | GN5-987-65-432 | This is a rather short descri... | RED_LABEL | Jul 13,2034 17:38:43 | AppSTD X | 3532 |
| + | EN46-C050-5003 | ZXCVZXCV | BLACK_LABEL | Jul 13,2034 17:38:43 | ARINC 665-2 | 608448 |
| + | XXX2A-5639-031H | This is a rather short descri... | RED_LABEL | Jan 20,2020 14:55:16 | AppSTD X | 7950130 |
| + | XXX2A-3215-706F | This is a rather short descri... | RED_LABEL | Jan 20,2020 14:55:16 | AppSTD X | 18046 |
| + | XXX2A-5256-902N | This is a rather short descri... | RED_LABEL | Jan 20,2020 14:55:16 | AppSTD X | 939443 |
| + | XXX2A-9606-909K | This is a rather short descri... | RED_LABEL | Jan 20,2020 14:55:16 | AppSTD X | 186860 |
| + | XXX2A-0690-170K | This is a rather short descri... | RED_LABEL | Jan 20,2020 14:55:16 | AppSTD X | 547803 |
| + | XXX2A-9479-657E | This is a rather short descri... | RED_LABEL | Jan 20,2020 14:55:16 | AppSTD X | 25727 |
| + | XXX2A-6807-071M | This is a rather short descri... | RED_LABEL | Jul 13,2034 17:38:43 | AppSTD X | 7949896 |
| + | ARI-Z665LSP | ASDFA | BLUE_LABEL | Jul 13,2034 17:38:43 | ARINC 665-2 | 4770 |
| + | TTTTTTTTTTT | ZXCV | BLACK_LABEL | Jul 13,2034 17:38:43 | ARINC 665-2 | 2967 |
| + | BCG22-0000-001U | BCG22-0000-001U | BLACK_LABEL | Jul 13,2034 17:38:43 | ARINC 665-2 | 234504 |
| + | XXX2A-7866-203L | This is a rather short descri... | RED_LABEL | Jan 20,2020 14:55:16 | AppSTD X | 3381318 |
| + | HNP5A-ALO1-1001 | This is a rather short descri... | RED_LABEL | Jul 13,2034 17:38:43 | AppSTD X | 4770 |
| + | ASDFASDF | | BLACK_LABEL | Jul 13,2034 17:38:43 | ARINC 665-2 | 5094 |
| + | MHARNISH | | BLACK_LABEL | Jun 18,2015 16:59:59 | ARINC 665-2 | 386533 |
| + | HEY-ZEREGUYS111 | ASDF | BLUE_LABEL | Jul 13,2034 17:38:43 | ARINC 665-2 | 4776 |

2610

Command Queues
Command Dispatcher
Parts Vault
Valid Parts
Incoming Parts — 2602
Expired Parts — 2604
Faulty Parts — 2606
2608
Maintenance
System Services
Reports

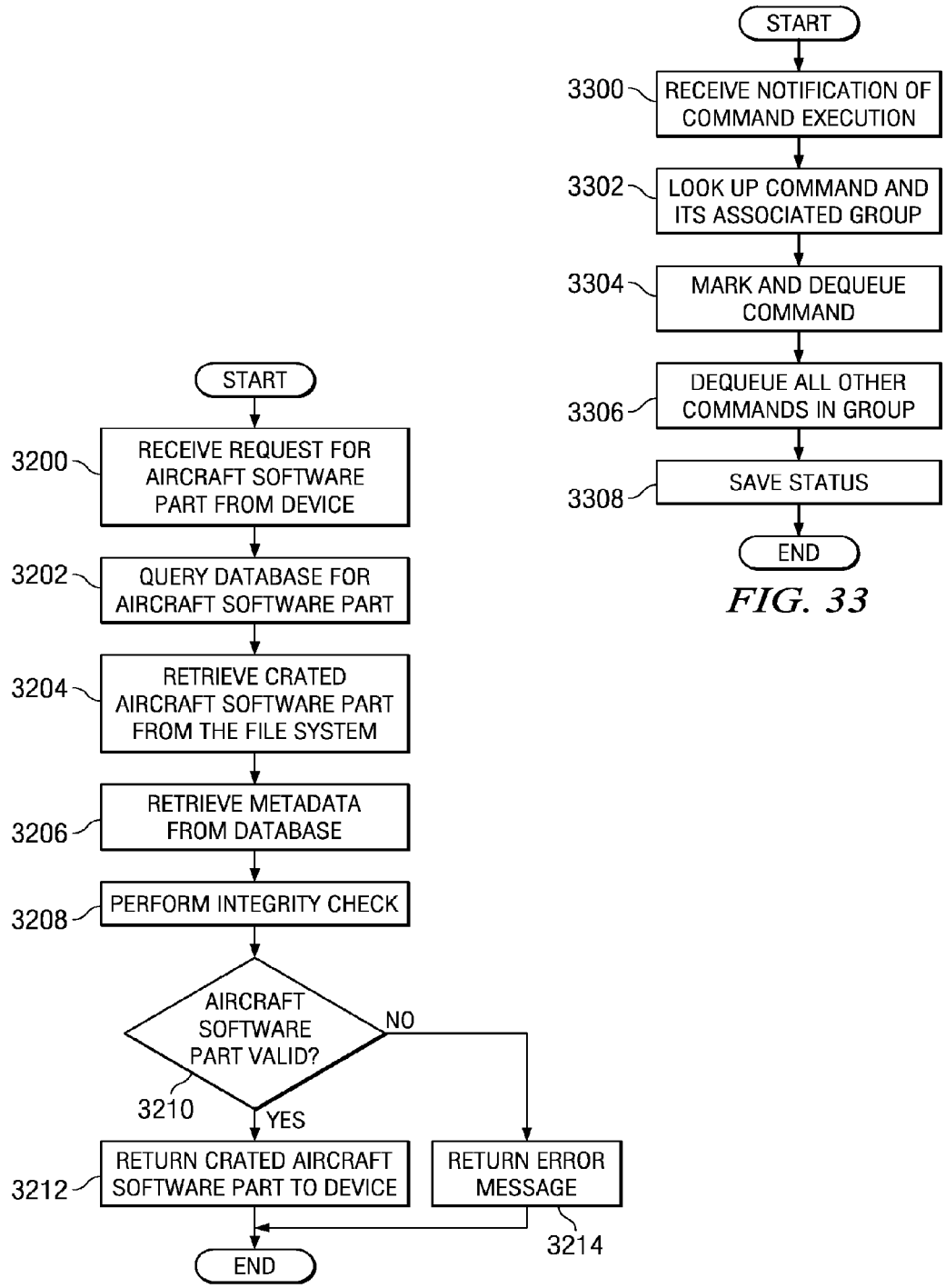

COMMAND RESULT DATABASE TABLE 3600

Command_results
- 3602 — Command_result_id (pk)
- 3604 — Command_id
- 3606 — Ground_status
- 3608 — Airplane_status
- 3610 — Date_result_reported
- 3612 — Command_type
- 3614 — Airplane_id
- 3616 — Ps_device_name

*FIG. 36*

DOWNLINK FILE DATABASE TABLE 3700

Downlink_files
- 3702 — Downlink_file_id (pk)
- 3704 — Airplane_id
- 3706 — Recvd_from_device
- 3708 — Date_recvd
- 3710 — File_name
- 3712 — File_url
- 3714 — File_status

*FIG. 37*

COMMAND DATABASE TABLE 3800

Commands
- 3804 — Command_id (pk)
- 3806 — Airplane_id
- 3808 — Application_name
- 3810 — Command_type
- 3812 — Device_name
- 3814 — System_name
- 3816 — Created_date
- 3818 — Servicing_status
- 3820 — Priority
- 3822 — Command_group
- 3824 — Crated_command
- 3826 — Crated_command_path

COMMAND RESOURCES DATABASE TABLE 3802

Command_resources
- Command_resource_id — 3828
- Data_type — 3830
- Application_standard — 3832
- Part_expiration_date — 3834
- Ip_owner — 3836
- Name — 3838
- Production_status — 3840
- Release_date — 3842
- Supplier — 3844
- Path — 3846
- Crate_expiration_date — 3848
- Command_id (fk) — 3850

*FIG. 38*

```
         C:\787\SMT
5802 ─── Parts\
5804 ─── Downlinks\
                <airplaneTailNumber>\
                ...
                <airplaneTailNumber>\
5806 ─── DownlinksUnpackDir\
5808 ─── Route\
5810 ─── App\
                SMT.log
                EventLogger.log
                EventLogger.log.<date> (saved by date when create new one)
                EventsConsoleLog.txt
5812 ─── Logs\
                EventLogger.xml
5814 ─── Conf\
                Ground.properties
                SMTPropertiesEditorDefinition.xml
                Ogc.log
                Ogc.logging.properties
```

FIG. 58

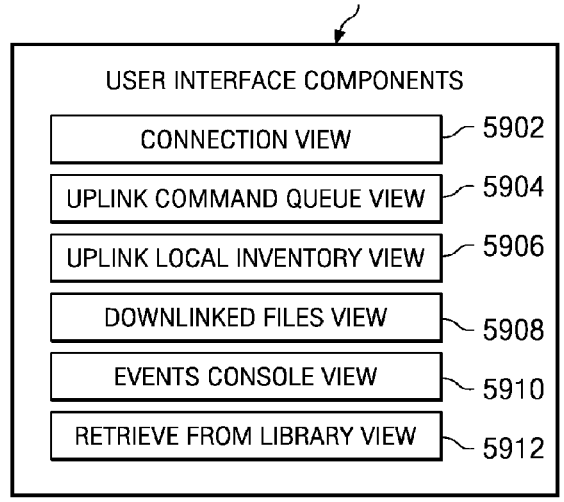

FIG. 59

AIRCRAFT SOFTWARE PART LIBRARY

RELATED PROVISIONAL APPLICATION

This application is a continuation application of U.S. application Ser. No. 12/276,516, filed Nov. 24, 2008, issued as U.S. Pat. No. 8,490,074 on Jul. 16, 2013, which claims the benefit of provisional application 60/990,471 filed on Nov. 27, 2007.

BACKGROUND INFORMATION

1. Field

The present disclosure relates generally to an improved data processing system and, in particular, to a method and apparatus for managing software for aircraft. Still more particularly, the present disclosure relates to a computer implemented method, apparatus, and computer usable program product for managing loadable software airplane parts, as well as other documents related to the parts known as part usage assets or simply as assets.

2. Background

Modern aircraft are extremely complex. For example, an aircraft may have many types of electronic systems on board. A particular electronic system on an aircraft may also be referred to as a line replaceable unit (LRU). Each line replaceable unit may take on various forms. A line replaceable unit may be, for example, without limitation, a flight management system, an autopilot, an in-flight entertainment system, a communications system, a navigation system, a flight controller, a flight recorder, and a collision avoidance system.

Line replaceable units may use software or programming to provide the logic or control for various operations and functions. The software used in these line replaceable units is commonly treated as parts in the airline industry. In particular, a software application for use in a line replaceable unit on an aircraft may also be tracked separately and referred to as a loadable aircraft software part, or aircraft software part. This software application also may be considered part of an airplane's configuration.

When an entity (i.e. an airline, maintenance, repair, and overhaul service provider ("MRO"), or military squadron) receives an aircraft, aircraft software parts are typically already installed in the line replaceable units in the aircraft. An airline, for example, may also receive copies of these aircraft software parts in case the parts need to be reinstalled or reloaded into the line replaceable units in the aircraft that have failed and have been replaced. Further, the airline also may receive updates to the loadable aircraft software parts from time to time. These updates may include additional features not present in the currently installed aircraft software parts, and may be considered upgrades to one or more line replaceable units.

The current system for managing, handling, and distributing loadable aircraft software parts is cumbersome and time consuming. Currently, aircraft software parts are stored on physical media, such as diskettes, compact discs, or digital versatile discs (DVD). An airline receives a delivery of the physical media and stores that physical media in a location such as, for example, filing cabinets. The media also may be kept on board the aircraft in many cases.

Maintenance operations may be performed on the aircraft to install or reinstall aircraft software parts from time to time. When an aircraft software part is needed, the media containing that part must be located and retrieved for use by maintenance personnel. This type of storage and retrieval system and process takes up both space and time.

Thus, it would be advantageous to have an improved method and apparatus for distributing aircraft software parts that solves the above-described problems.

SUMMARY

The different advantageous embodiments provide a computer implemented method, apparatus, and computer program product for managing aircraft software parts. In one advantageous embodiment, an aircraft software part is received at a library to form a received aircraft software part. The received aircraft software part is stored in a storage in the library with a plurality of aircraft software parts. A user interface system is provided to manipulate the plurality of aircraft software parts in the library. Responsive to receiving a user input from the user interface system to uplink a selected aircraft software part from the plurality of aircraft software parts in the library to a target aircraft data processing system, a command is created to send the selected aircraft software part to an aircraft in which the target aircraft data processing system is located to form an uplink command. The uplink command is stored in a queue in the storage in the library to form a stored uplink command. The stored uplink command is distributed to a proxy server application in response to a request for commands from a proxy server application. Responsive to receiving a request for the selected aircraft software part from the proxy server application processing the stored uplink command, the selected aircraft software part is sent to the proxy server application.

In another advantageous embodiment, an apparatus comprises a file system located on a storage device, a database located on the storage device, a manage component, and a user interface. The file system stores a plurality of aircraft software parts, and the database stores a plurality of commands used to manage the plurality of aircraft software parts. The management component is capable of generating the plurality of commands. The user interface system is capable of receiving user input to operate the management component.

In yet another advantageous embodiment, a computer comprises a bus, a communications adapter connected to the bus, a memory connected to the bus, wherein computer usable program code is stored on the bus, and a processor unit connected to the bus. The processor unit executes the computer usable program code to receive an aircraft software part at a library to form a received aircraft software part; store the received aircraft software part in a storage in the library with a plurality of aircraft software parts; provide a user interface system to manipulate the plurality of aircraft software parts in the library; create a command to send the selected aircraft software part to an aircraft in which the target aircraft data processing system is located to form an uplink command in response to receiving a user input from the user interface system to uplink a selected aircraft software part from the plurality of aircraft software parts in the library to a target aircraft data processing system; store the uplink command in a queue in the storage in the library to form a stored uplink command; distribute the stored uplink command to a proxy server application in response to a request for commands from a proxy server application; and send the selected aircraft software part to the proxy server application in response to receiving a request for the selected aircraft software part from the proxy server application processing the stored uplink command.

In still another advantageous embodiment, a computer program product comprises a computer recordable storage media and program code. The program code includes code for receiving an aircraft software part at a library to form a received aircraft software part. The program code also includes code for storing the received aircraft software part in a storage in the library with a plurality of aircraft software parts and for providing a user interface system to manipulate the plurality of aircraft software parts in the library. The program code includes code, responsive to receiving a user input from the user interface system to uplink a selected aircraft software part from the plurality of aircraft software parts in the library to a target aircraft data processing system, for creating a command to send the selected aircraft software part to an aircraft in which the target aircraft data processing system is located to form an uplink command. Code is also present for storing the uplink command in a queue in the storage in the library to form a stored uplink command. The program code includes code for distributing the stored uplink command to a proxy server application in response to a request for commands from a proxy server application and code, responsive to receiving a request for the selected aircraft software part from the proxy server application processing the stored uplink command, for sending the selected aircraft software part to the proxy server application.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 6 is a diagram illustrating command types in accordance with an advantageous embodiment;

FIG. 7 is a format for commands in accordance with an advantageous embodiment;

FIG. 8 is a message flow diagram illustrating processing of uplink commands in accordance with an advantageous embodiment;

FIG. 19 is a block diagram illustrating an organization of commands in queues in accordance with an advantageous embodiment;

FIG. 20 is a block diagram of an aircraft software part in accordance with an advantageous embodiment;

FIG. 21 is a command data structure for a delete command in accordance with an advantageous embodiment;

FIG. 22 is a diagram illustrating a command data structure for an uplink command in accordance with an advantageous embodiment;

FIG. 25 is a diagram illustrating a user interface for viewing commands in accordance with an advantageous embodiment;

FIG. 26 is a diagram of a user interface for viewing parts in accordance with an advantageous embodiment;

FIG. 32 is a flowchart of a process for dispatching parts in accordance with an advantageous embodiment;

FIG. 33 is a flowchart of a process for dequeuing commands in accordance with an advantageous embodiment;

FIGS. 36-39 are diagrams illustrating data structures in accordance with an advantageous embodiment;

FIG. 58 is a diagram of a software maintenance tool file system directory structure in accordance with an advantageous embodiment;

FIG. 59 is a diagram illustrating interface components implemented in a software maintenance tool in accordance with an advantageous embodiment;

DETAILED DESCRIPTION

Figure 1:
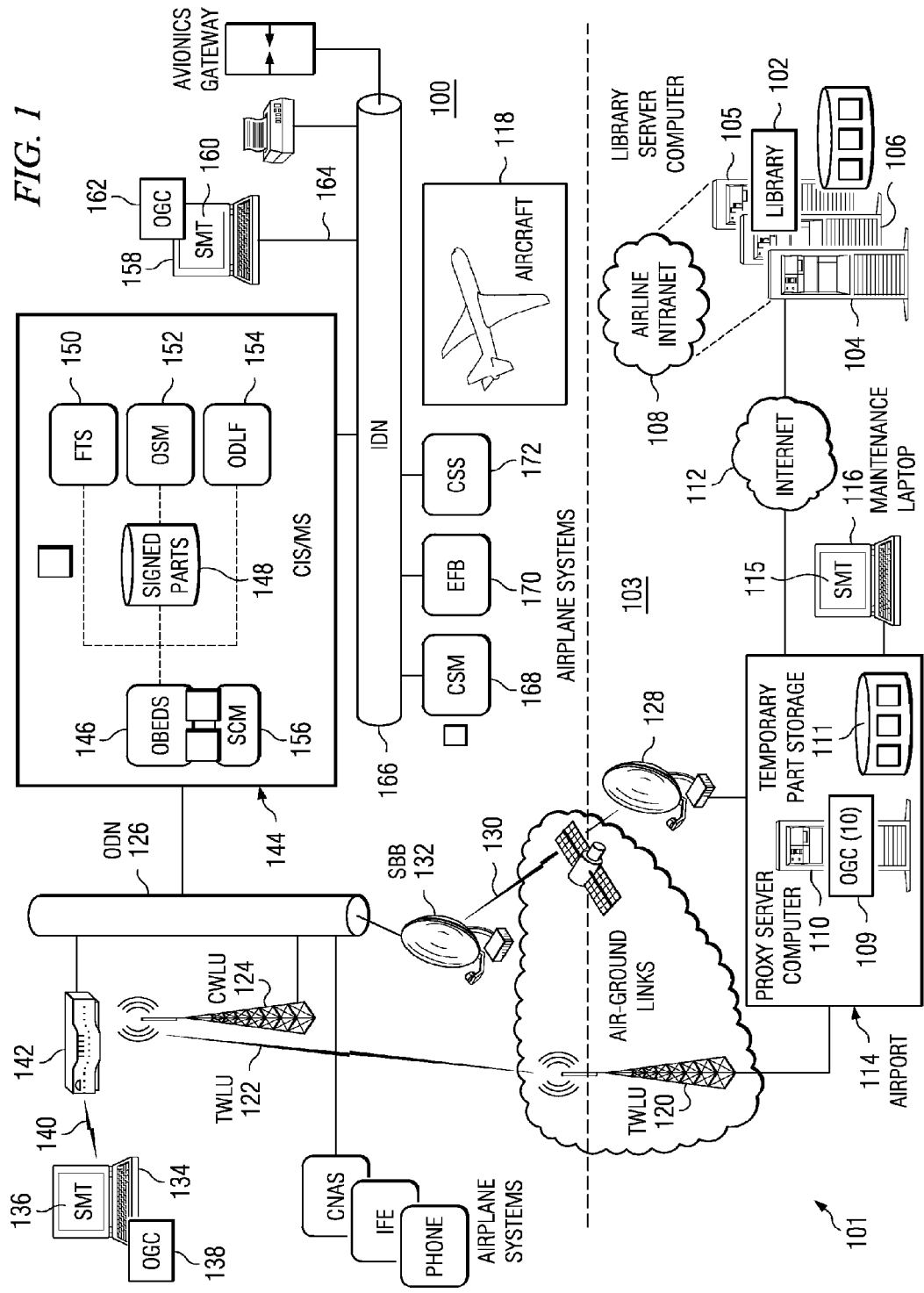
FIG. 1 is a diagram of a data processing environment in accordance with an illustrative embodiment.

With reference now to the figures and, in particular, with reference to FIG. 1, an exemplary diagram of a data processing environment is provided in which the advantageous embodiments may be implemented. It should be appreciated that FIG. 1 is only exemplary and is not intended to assert or imply any limitation with regard to the environments in which different embodiments may be implemented. As used herein, the term exemplary refers to an example and not necessarily an ideal implementation. Many modifications to the depicted environments may be made.

Turning now to FIG. 1, a diagram illustrating a network data processing system in which a software part management environment may be implemented is depicted in accordance with an advantageous embodiment. In this example, network data processing system 100 is a network data processing system in which information may be transferred between aircraft network 101 and ground network 103. This information may include, for example, without limitation, commands, aircraft software parts, downlink data, error logs, usage history, flight data, status information, and manuals. Ground network 103 includes networks and computers located on the ground. Aircraft network system 101 is a network and computers located on an aircraft.

In these examples, commands may be generated on library 102 located on library server computer 104. Library server computer 104 and other data processing systems, such as server computers 105 and 106, connect to intranet 108.

These commands may be distributed to on ground component (OGC) 109 on proxy server computer 110 through a network, such as Internet 112. Intranet 108 and Internet 112 may include connections such as, for example, wires, fiber optic cables, or wireless communications links. Proxy server computer 110 may be located in a facility, such as airport 114. Proxy servers, such as proxy server computer 110, may be located at other airports and other locations, such as maintenance locations. Proxy server computer 110 provides for temporary part storage 111 for commands and parts received from library 102.

The commands and aircraft software parts also may be sent to software maintenance tools on portable computers, such as software maintenance tool 115 on maintenance laptop 116. Proxy server computer 110 and maintenance laptop 116 are referred to collectively as ground tools. A ground tool may be any data processing system that is configured with an appropriate application to transfer information, such as commands, aircraft software parts, and downlink data.

Proxy server computer 110 may connect to aircraft 118 through various types of connections or links. For example, wireless unit 120 may establish wireless connection 122 with wireless unit 124 on aircraft 118. Wireless unit 124 connects to open data network 126 in aircraft 118. Maintenance laptop 134 has software maintenance tool 136 and on ground component (OGC) 138 and may communicate with aircraft 118 establishing communications link 140 with cabin wireless access unit 142. Communications link 140 is a wireless virtual private network tunnel. Cabin wireless access unit 142 connects to open data network 126 in these examples. Open data network 126 provides an interface for various communications links, such as wireless link 122. Additionally, satellite unit 128 connected to proxy server computer 110 at airport 114 may establish satellite link 130 with satellite unit 132, which is also connected to open data network 126.

Open data network 126 connects to aircraft data processing system 144, which contains onboard electronic distribution system (OBEDS) 146. Storage device 148 also is located in aircraft data processing system 144. Storage device 148 provides a location to store information, such as aircraft parts. Aircraft data processing system 144 also includes file transfer system (FTS) 150, onboard storage manager (OSM) 152, onboard data load function (ODLF) 154, and signer-crater module (SCM) 156. In these examples, signer-crater module 156 may be implemented as a Java® library compiled into onboard electronic distribution system 146. Also, aircraft data processing system 144 may take the form of a crew information system/maintenance system computer.

File transfer system 150 is used to transfer files from storage device 148 to a line replaceable unit. Onboard storage manager 152 manages information stored in storage device 148. Onboard data load function 154 is a software component used to load aircraft software parts onto line replaceable units. Signer-crater module 156 is used to process incoming crates and store the contents of those crates in storage device 148. Additionally, signer-crater module 156 may crate download data for downloading to proxy server computer 110.

All command processing, in these examples, is initiated by onboard electronic distribution system 146 located in aircraft data processing system 144. Onboard electronic distribution system 146 monitors the air-to-ground link status and determines whether a communications link has been established. If a link becomes available, onboard electronic distribution system 146 connects to a ground data processing system via the link.

In other advantageous embodiments, maintenance laptop 158 may establish communications link 164 with isolated data network 166. Maintenance laptop 158 has software maintenance tool 160 and on ground component 162. Communications link 164 may be a wired connection. The line replaceable units may be, for example, central server module (CSM) 168, electronic flight bag (EFB) 170, and cabin services system (CSS) 172. Central server module 168 provides common networking functions for the different networks in aircraft 118. These services include, for example, packet routing, firewall, and wireless access. Cabin services system 172 provides applications to control systems in the aircraft, such as lighting, cabin doors, and address system.

If onboard electronic distribution system 146 establishes a connection to a ground device, onboard electronic distribution system 146 requests a list of commands queued or stored for aircraft 118. Onboard ground components 109, 138, or 162, on data processing systems, such as proxy server computer 110, maintenance laptop 134, and/or maintenance laptop 158, communicate with onboard electronic distribution system 146 on aircraft data processing system 144 in these examples. This type of software component provides an application program interface to the ground tool to uplink commands and aircraft software parts to aircraft 118 as well as downlinking data or files.

The illustration of particular components and configurations in network data processing system 100 are not meant to imply architectural limitations to the manner in which different embodiments may be implemented. For example, although only a single aircraft is shown in aircraft network 101, multiple aircraft may be present within aircraft network 101. As another example, airline network 108 in ground network 103 may connect to computers, such as proxy server computer 110, at airports, such as airport 114, through other types of networks other than Internet 112. For example, a wide area network (WAN) may be used in place of, or in conjunction with, Internet 112.

Figure 2:
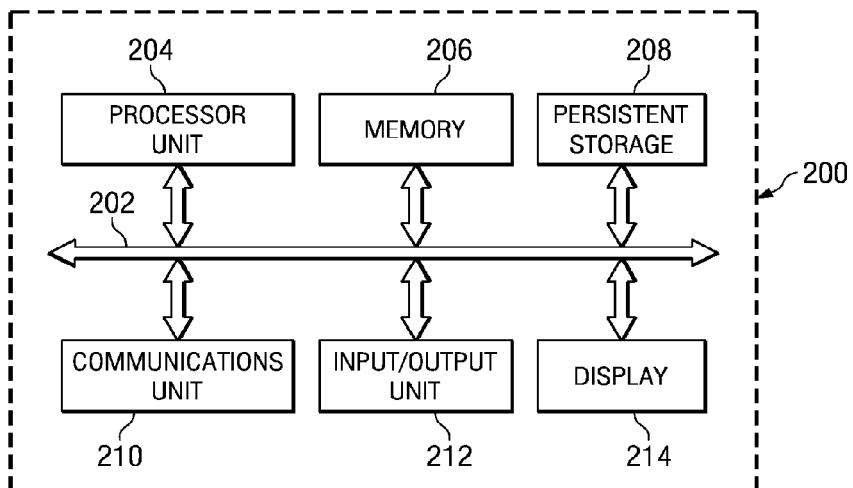
FIG. 2 is a diagram of a data processing system in accordance with an illustrative embodiment.

Turning now to FIG. 2, a diagram of a data processing system is depicted in accordance with an advantageous embodiment. In these examples, data processing system 200 is an example of a data processing system that may be used to implement data processing systems, such as library server computer 104, maintenance laptop 116, proxy server computer 110, maintenance laptop 134, maintenance laptop 158, and aircraft data processing system 144 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. A storage device is hardware that is capable of storing program code in a functional form for execution by a processor or other hardware device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is in a functional form and located on computer readable media 218 and may be loaded onto or transferred to data processing system 200 for execution by processor unit 204. Program code 216 and computer readable media 218 form computer program product 220 in these examples. In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory, which is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments provide a computer implemented method, apparatus, and computer usable program product for managing aircraft software parts.

Figure 3:
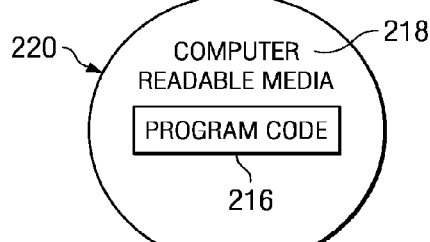
FIG. 3 is a diagram illustrating an aircraft software part management apparatus in accordance with an advantageous embodiment.

With reference now to FIG. 3, a diagram illustrating an aircraft software part management apparatus is depicted in accordance with an advantageous embodiment. In this example, aircraft software part management apparatus 300 includes receiving module 302, library 304, proxy server application 306, software maintenance tool 308, and onboard electronic distribution system 310.

Receiving module 302 is capable of receiving an aircraft software part from a source and sending the aircraft software part to library 304 for storage. The source may include, for example, an aircraft manufacturer, a software vendor, a library supplier, or an airline.

In these examples, library 304 is located on a data processing system, such as library server computer 102 in FIG. 1. Library 304 provides a storage system for the aircraft software part. Also, library 304 may be used to manage the aircraft software parts. The management of the parts may include, for example, without limitation, organizing aircraft software parts, deleting aircraft software parts, and distributing aircraft software parts. Security and versioning control processes may be used to manage the aircraft software parts.

Proxy server application 306 may be located on the same data processing system or a different data processing system, depending on the particular implementation. Proxy server application 306 is in communication with library 304 and is capable of serving different aircraft clients.

Software maintenance tool 308 may be a software maintenance tool located on a portable computer that provides an alternate route to send the aircraft software part to onboard electronic distribution system 310 from library 304. Software maintenance tool 308 may receive the aircraft software part directly from library 304 or through proxy server application 306, depending on the particular implementation.

Onboard electronic distribution system 310 is an example of an aircraft client located on an aircraft. Onboard electronic distribution system 310 is a software client that executes on a data processing system on the aircraft. Onboard electronic distribution system 310 may receive an aircraft software part for the aircraft from library 304 through proxy server application 306. After the aircraft software part has been received by onboard electronic distribution system 310, the aircraft software part may be installed in a line replaceable unit for use.

In addition to using aircraft software part management apparatus 300 to distribute aircraft software parts to an aircraft, this apparatus also may be used to receive data generated by the aircraft. This data also is referred to as downlink data. For example, a flight recorder may generate data describing different events occurring during a flight. This data may be downlinked through onboard electronic distribution system 310 through proxy server application 306 and/or software maintenance tool 308 back to library 304 for later use and analysis. This data also may include configuration data about the aircraft software part, the line replaceable unit, or the airplane configuration.

Figure 4:
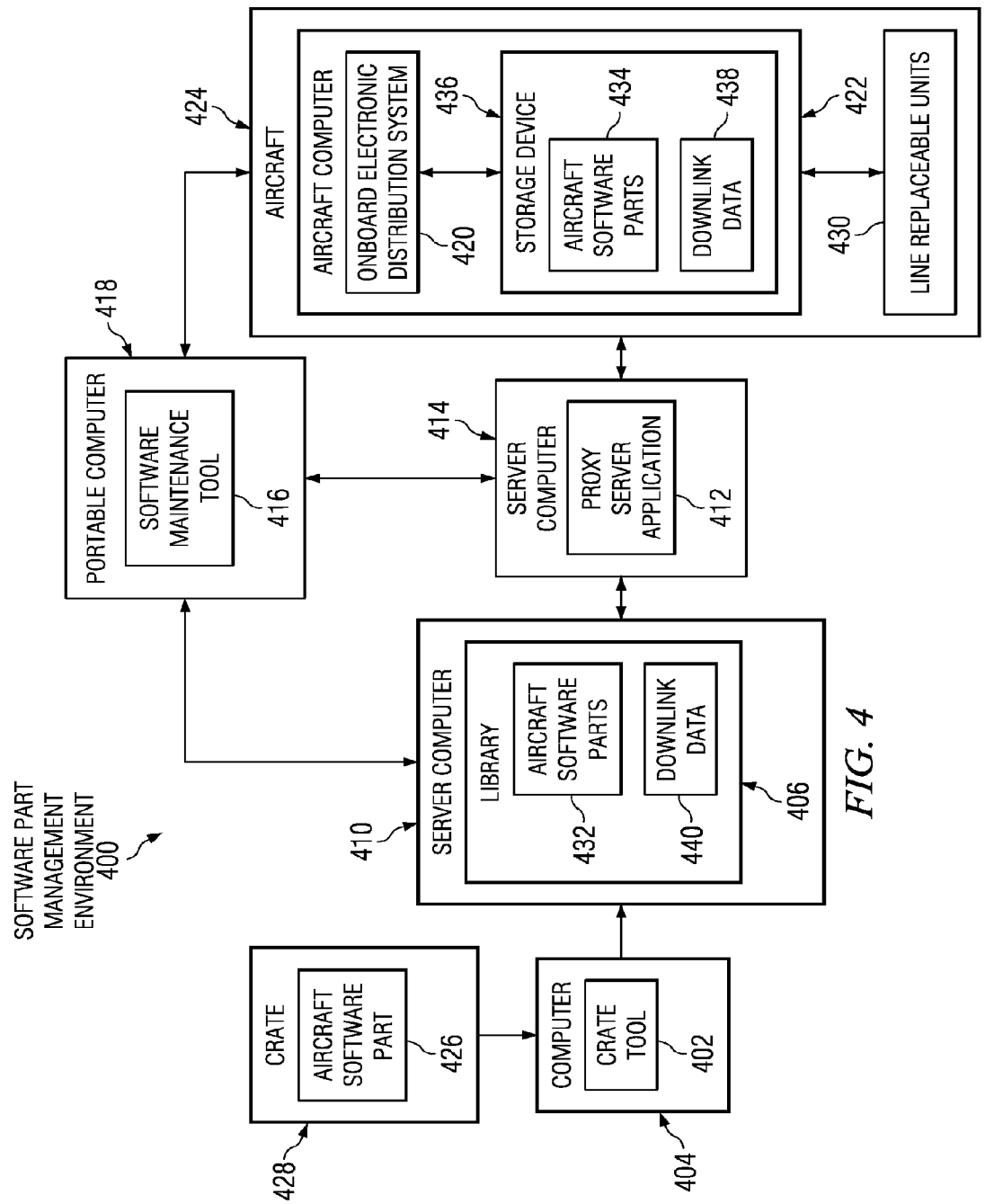
FIG. 4 is a block diagram of a software part management environment in accordance with an advantageous embodiment.

With reference now to FIG. 4, a block diagram of a software part management environment is depicted in accordance with an advantageous embodiment. Software part management environment 400 is an example of one implementation for aircraft software part management apparatus 300 in FIG. 3.

In this example, crate tool 402 executes on computer 404. Crate tool 402 is an example of one implementation of receiving module 302 in FIG. 3. Library 406 is located on server computer 410. Library 406 is an example of one implementation of library 304 in FIG. 3. Proxy server application 412 executes on server computer 414 and is an example of an implementation of proxy server application 306 in FIG. 3. Software maintenance tool 416 executes on portable computer 418. Software maintenance tool 416 is an example of software maintenance tool 308 in FIG. 3. Onboard electronic distribution system 420 runs on aircraft computer 422 on aircraft 424. Onboard electronic distribution system 420 is an example of one implementation for onboard electronic distribution system 310 in FIG. 3.

In these examples, crate tool 402 may receive and process software parts, such as aircraft software part 426 in crate 428. Crate 428 is a packaging system for aircraft software part 426 and is not a physical object. Crate 428, in these examples, is a file that contains aircraft software part 426. Crate 428 may be, for example, a zip file using a zip file format.

A zip file format is a data compression and archival format in which the zip file may contain one or more files that have been compressed. Other examples of packaging systems for files include, for example, JAVA® archive (JAR) files. These files also may be encrypted or digitally signed, depending on the particular implementation. Of course, any type of mechanism that provides a wrapper for aircraft software part 426 may be used. In these examples, the wrapper is a security wrapper that is designed to meet various security requirements that may be set or required for aircraft software part 426.

Aircraft software part 426 may be a software application for use on a data processing system in the aircraft in these examples. The data processing system may be one located within line replaceable units 430 in aircraft 424. The application may include a set of files. The set of files may include, for example, one or more programs, data files, libraries, configuration files, or other information or code. As used herein, "a set" refers to one or more items. As an example, a set of aircraft software parts is one or more aircraft software parts, and a set of commands is one or more commands.

Crate tool 402 receives crate 428 and processes crate 428 to store aircraft software part 426 in aircraft software parts 432 in library 406. This processing may include, for example, validating signatures for crate 428 and aircraft software part 426. This validation may be performed to ensure that no corruption or errors has occurred in crate 428 or aircraft software part 426. The different parts stored within library 406 may be distributed to an aircraft, such as aircraft 424, through the proxy server application.

Library 406 provides a component within software part management environment 400 to perform various management operations on aircraft software parts 432. These management operations may include, for example, without limitation, distributing aircraft software parts to an aircraft, organizing aircraft software parts, deleting aircraft software parts, receiving data from aircraft on which aircraft software parts are present, and receiving new aircraft software parts.

Proxy server application 412 may obtain a set of aircraft software parts from aircraft software parts 432 and send those parts to onboard electronic distribution system 420. Proxy server application 412 is in communication with onboard electronic distribution system 420 through a communications link. This communications link may take various forms. For example, a wireless communications link may be used. In this manner, aircraft parts and data may be exchanged while the aircraft is on ground or even in flight. In other examples, server computer 414 may be connected to aircraft computer 422 through a wired link in a network.

Onboard electronic distribution system 420 processes the set of aircraft parts and stores these parts as aircraft software parts 434 within storage device 436 on aircraft computer 422. As needed, an aircraft software part from aircraft software parts 434 may be installed in line replaceable units 430. Data, such as an aircraft software part, manuals, documentation, and commands, sent to the aircraft are referred to as uplink data.

Additionally, data may flow in the other direction from aircraft 424 through proxy server application 412 back to library 406. This type of data is referred to as downlink data. In these examples, line replaceable units 430 may generate downlink data 438, which is temporarily stored in storage device 436. Onboard electronic distribution system 420 may send downlink data 438 to proxy server application 412. In turn, proxy server application 412 sends downlink data 438 to library 406 for storage. This data may then be processed and analyzed. This data also may include, for example, the status of software on an aircraft. This status information may be used to send an operator to the aircraft to initiate loading and installation of the line replaceable unit on the aircraft.

Additionally, software maintenance tool 416 on portable computer 418 provides an alternative route for transferring aircraft software parts and downlink data. Portable computer 418 may be, for example, a laptop computer. Portable computer 418 may obtain an aircraft software part from aircraft software parts 432 through proxy server application 412 or directly from library 406, depending on the particular implementation. Thereafter, portable computer 418 may be transported to aircraft 424 and establish a communications link with onboard electronic distribution system 420 on aircraft computer 422 to send the aircraft software part to onboard electronic distribution system 420.

This type of distribution of aircraft software parts is especially useful when network connections or communications links cannot be established between server computer 414 and aircraft computer 422 on aircraft 424. This type of situation may occur depending on the type of equipment available at an airport or maintenance facility. Further, in some cases, the network or communications systems providing communications links may be temporarily unavailable or require repair. In this manner, software maintenance tool 416 may transfer an aircraft software part to onboard electronic distribution system 420. Further, software maintenance tool 416 may also receive downlink data 438 while in communication with onboard electronic distribution system 420.

In this manner, the different advantageous embodiments provide a computer implemented method, apparatus, and computer usable program code for managing aircraft software parts. Further, the different advantageous embodiments also may provide for the transfer of data from an aircraft to a facility or location for later analysis or review.

Figure 5:
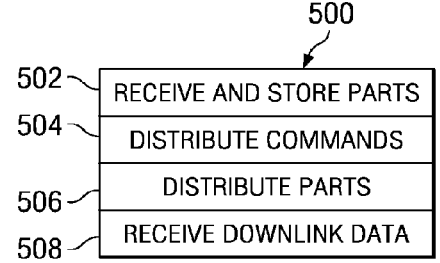
FIG. 5 is a table illustrating modes of operation for a software part management environment in accordance with an advantageous embodiment.

Turning now to FIG. 5, a table illustrating modes of operation for a software part management environment is depicted in accordance with an advantageous embodiment. In this example, table 500 illustrates some of the different modes of operation that may occur within software part management environment 400 in FIG. 4. In these examples, the different modes of operation include receive and store parts mode 502, distribute commands mode 504, distribute parts mode 506, and receive downlink data mode 508. These different modes of operations illustrated in table 500 are ones that may occur in one or more components within software part management environment 400 in FIG. 4.

In receive and store parts mode 502, aircraft software parts may be received and stored within library 406 in FIG. 4. Distribute commands mode 504 is used to send commands to the aircraft. These commands may be, for example, to uplink data. This data may include, for example, sending aircraft software parts to an aircraft. The uplink data also may include commands to send documentation or other information to an aircraft. Distribute parts mode 506 is the mode of operation in which aircraft software parts are actually sent to the aircraft. Receive downlink data mode 508 is a mode of operation in which data is sent from various components in an aircraft to the library in the software part management environment.

With reference now to FIG. 6, a diagram illustrating command types is depicted in accordance with an advantageous embodiment. In this example, command types 600 include uplink command 602, downlink command 604, and delete command 606. Uplink command 602 is used to send information from a library to an aircraft. This information may include, for example, aircraft software parts, configuration information, and other data. Downlink command 604 is used to initiate the transfer of data from an aircraft to a library. This information may include, for example, status information on the uplinking of aircraft software parts and reports of configuration of line replaceable units on the aircraft. Delete command 606 is employed to delete information on the aircraft. For example, delete command 606 may be used to delete a selected aircraft software part on an aircraft. In these examples, these different commands are sent to the aircraft in a crate.

Turning now to FIG. 7, a format for commands is depicted in accordance with an advantageous embodiment. In this example, command 700 takes the form of an extensible markup language (XML) data structure. Command 700, in this example, is an uplink command.

Message identifier element 702 in command 700 provides a unique identifier for the command. Type element 704 indicates the type of command. In this example, the type of command is identified as an uplink command. System element 706 identifies the target system for the command. Application identifier element 708 identifies the application on the target system to receive the command.

Link label element 710 identifies the type of network link used to transfer the command from the library to the aircraft. For example, the link may be a wired link or a wireless link. Server address element 712 identifies the address of the identified device. Data type element 714 provides an identification of the type of information that is subject to the command. Resource type element 716 identifies the particular file that is subject to the command.

Turning now to FIG. 8, a message flow diagram illustrating processing of uplink commands is depicted in accordance with an advantageous embodiment. In this example, processing of an uplink command involves ground system 800, onboard electronic distribution system (OBEDS) 802, file transfer system (FTS) 804, and line replaceable unit (LRU) 806. In these examples, ground system 800 is, for example, a proxy server application on a computer or a software maintenance tool located on a laptop computer.

The process begins by onboard electronic distribution system 802 establishing a connection with ground system 800 (message M1). In response to the connection, ground system 800 makes the next command available. In this example, the next command is an uplink command. Ground system 800 sends the uplink command to onboard electronic distribution system 802 (message M2). Onboard electronic distribution system 802 checks the signature for the uplink command.

Thereafter, onboard electronic distribution system 802 sends a request for the source to ground system 800 (message M3). Ground system 800 makes the crate corresponding to the request available for transfer. The request in message M3 is identified from the uplink command received in message M2.

Onboard electronic distribution system 802 uplinks the crate from ground system 800 (message M4). After receiving the crate, onboard electronic distribution system 802 validates the signatures on the crate. This validation includes validating the signature on the crate as well as the signatures for the aircraft software part.

Thereafter, onboard electronic distribution system 802 sends a transfer request to file transfer system 804 (message M5). In response, file transfer system 804 transfers the aircraft software part to line replaceable unit 806 (message M6).

The status is then transferred from file transfer system 804 to onboard electronic distribution system 802 (message M7).

Figure 9:
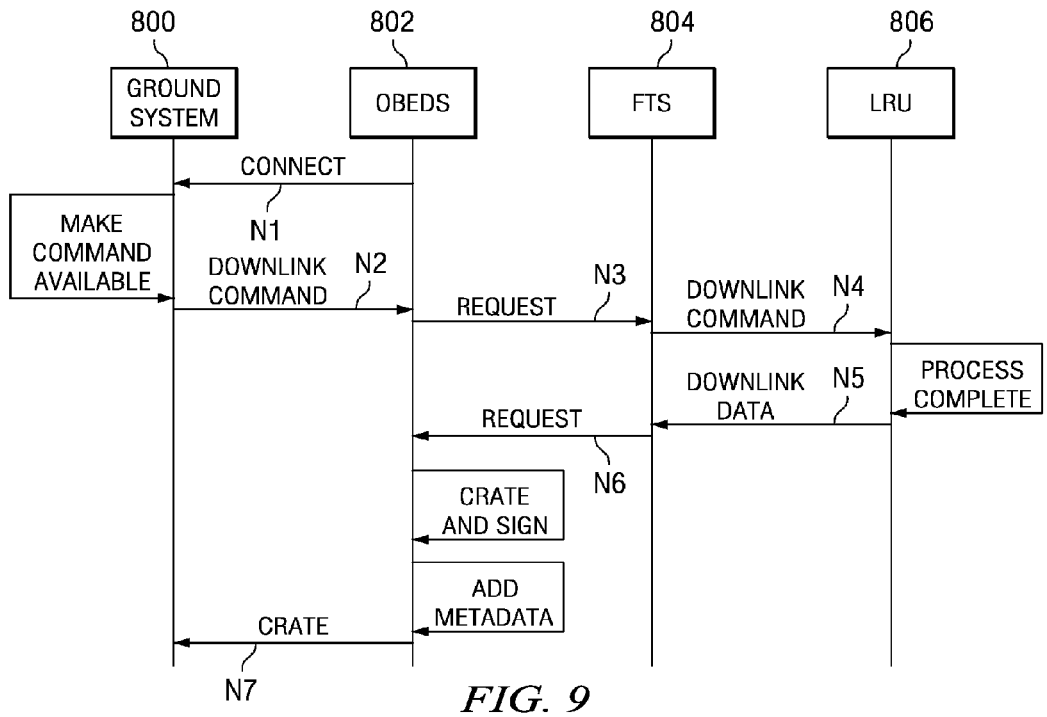
FIG. 9 is a messaging diagram illustrating processing of a downlink command in accordance with an advantageous embodiment.

Turning now to FIG. 9, a messaging diagram illustrating processing of a downlink command is depicted in accordance with an advantageous embodiment. In this example, the same components as in FIG. 8 are present for processing a downlink command. In this example, onboard electronic distribution system 802 connects to ground system 800 (message N1). Ground system 800 makes the next command available for processing.

A downlink command is sent to onboard electronic distribution system 802 (message N2). Onboard electronic distribution system 802 sends a request to file transfer system 804 to send the downlink command to line replaceable unit 806 (message N3). In turn, file transfer system 804 sends the downlink command to line replaceable unit 806 (message N4). Line replaceable unit 806 processes the command and then sends downlink data to file transfer system 804 (message N5). File transfer system 804 sends a request to onboard electronic distribution system 802 to send downlink data to ground system 800 (message N6). In response, onboard electronic distribution system 802 crates and signs the downlink data. Additionally, onboard electronic distribution system 802 also adds metadata to the crate. Thereafter, onboard electronic distribution system 802 sends the crate to ground system 800 (message N7).

Figure 10:
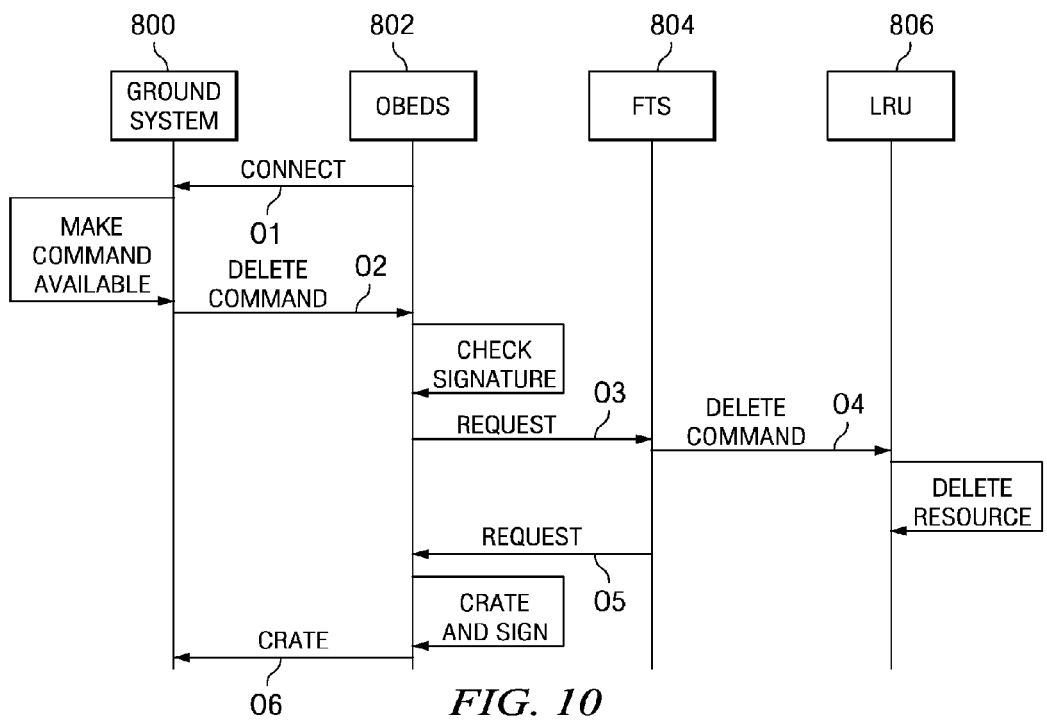
FIG. 10 is a message flow diagram illustrating processing of a delete command in accordance with an advantageous embodiment.

Turning now to FIG. 10, a message flow diagram illustrating processing of a delete command is depicted in accordance with an advantageous embodiment. The same components as depicted in FIGS. 8 and 9 are used to process a delete command. The process begins with onboard electronic distribution system 802 connecting to ground system 800 (message O1). In response, ground system 800 makes the next command for onboard electronic distribution system 802 available. Onboard electronic distribution system 802 receives the delete command (message O2).

Thereafter, onboard electronic distribution system 802 checks the signature for the command. If the signature is valid, onboard electronic distribution system 802 sends a request to file transfer system 804 to send the delete command to line replaceable unit 806 (message O3). In these examples, the only time the signature on the command is checked is if the command is issued from the proxy server. The same occurs for the downlink command. Thereafter, file transfer system 804 sends the delete command to line replaceable unit 806 (message O4).

In response to receiving the delete command, line replaceable unit 806 deletes the resource identified by the delete command.

File transfer system 804 sends a request to onboard electronic distribution system 802 to send the status to ground system 800 (message O5). This status indicates whether the resource was successfully deleted by line replaceable unit 806. In response to receiving this request, onboard electronic distribution system 802 crates and signs the status. Thereafter, the crate is sent to ground system 800 (message O6).

Figure 11:
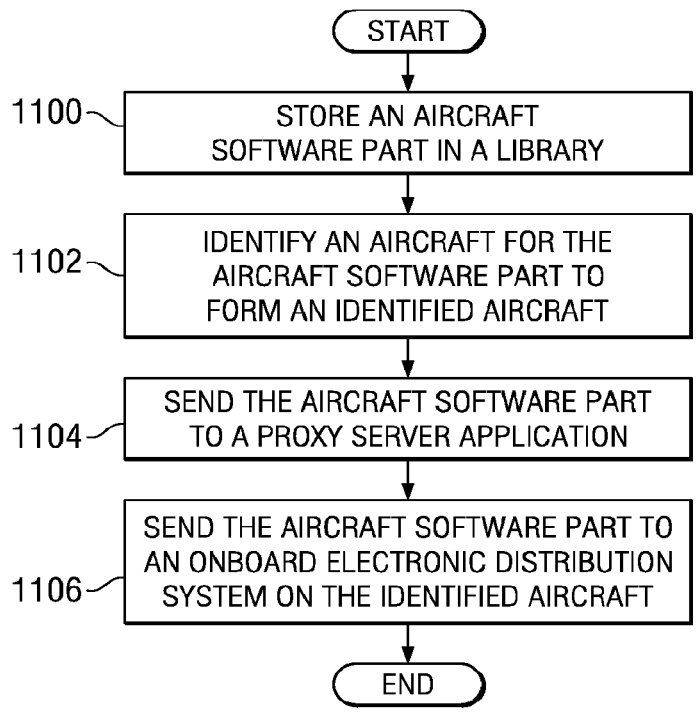
FIG. 11 is a high level flowchart of a process used to distribute an aircraft software part in accordance with an advantageous embodiment.

Turning now to FIG. 11, a high level flowchart of a process used to distribute an aircraft software part is depicted in accordance with an advantageous embodiment. The process illustrated in FIG. 11 is an example of a process that may be found in software part management environment 400 in FIG. 4 to install an aircraft software part on an aircraft.

The process begins by storing an aircraft software part in a library (operation 1100). In these examples, the library is a software aircraft management component, such as library 406 in FIG. 4. The process then identifies an aircraft to receive the aircraft software part to form an identified aircraft (operation 1102). In operation 1102, an operator of the library may select aircraft software parts for distribution to a set of aircraft. In other embodiments, the target aircraft for aircraft software parts may be preselected through a communication or file received from another system.

Thereafter, the aircraft software part is sent to a proxy server application (operation 1104) in the form of an uplink command. The proxy server application sends the uplink command and the aircraft software part to an onboard electronic distribution system on the identified aircraft (operation 1106), with the process terminating thereafter.

Figure 12:
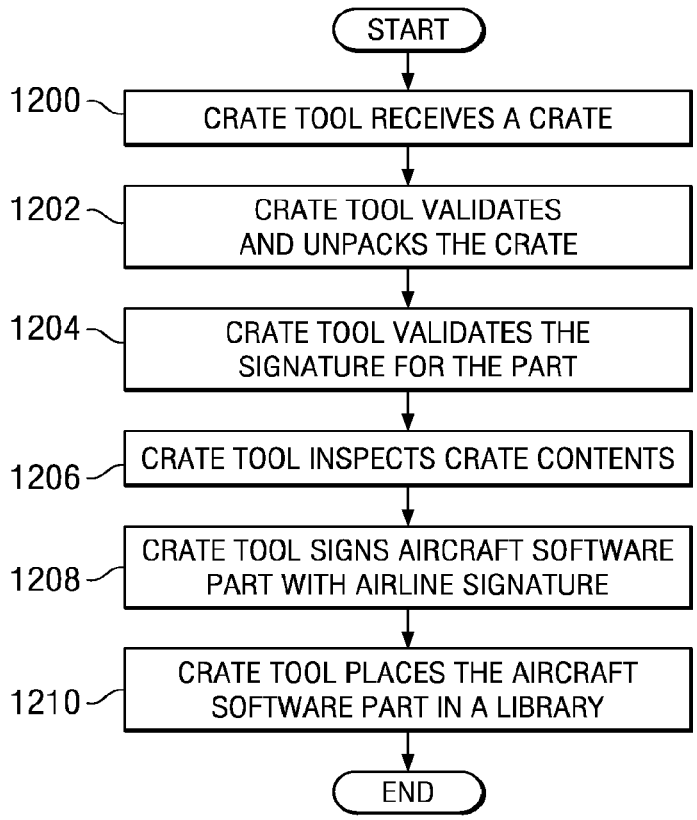
FIG. 12 is a flowchart for receiving and storing aircraft software parts in accordance with an advantageous embodiment.

Turning now to FIG. 12, a flowchart for receiving and storing aircraft software parts is depicted in accordance with an advantageous embodiment. The process illustrated in FIG. 12 may be implemented in software part management environment 400 in FIG. 4. This process is an example of steps that may be performed in receive and store parts mode 502 in FIG. 5.

The process begins with a crate tool receiving a crate (operation 1200). This tool may be, for example, crate tool 402 in FIG. 4. In this example, the crate contains an aircraft software part that may be requested from a point of origin, such as a manufacturer of the aircraft or line replaceable units in the aircraft. The aircraft software part may be received in response to a notification of the availability of the aircraft software part and delivered through some transport mechanism. The crate may be received on a physical or tangible media, such as a compact disc, flash memory, or digital versatile disc. In other embodiments, the crate may be received through a transmission media, such as a communications link over a network.

The crate tool validates and unpacks the crate (operation 1202). In this operation, a notification is generated if the signature is invalid or the digest does not match the one calculated by the crate tool. If no problems are detected, the crate is unpacked into various locations for additional processing. Next, the crate tool validates the signature for the aircraft software part (operation 1204). If the signature is invalid or the digest for the aircraft software part does not match the one calculated, a notification is generated. If no problems are detected, the part is now ready to be signed after the contents of the crate have been validated or verified.

The crate tool then inspects the crate contents (operation 1206). In this operation, the contents of the crate may be displayed for an inspector to verify the contents. In other embodiments, this operation may be performed automatically for a comparison of the contents with a file or configuration information identifying the expected contents of the crate.

Once the contents have been verified, the crate tool signs the aircraft software part with the airline's signature (operation 1208). Depending on the implementation, another entity's signature may be used. For example, the signature may be that of a customer or other party that manages the library. If no errors occur in signing the aircraft software part, the part is ready for storage.

Thereafter, the crate tool places the aircraft software part into a library (operation 1210), with the process terminating thereafter. This operation involves moving the aircraft software part from its current location on the file system to the storage area for the library containing the different aircraft software parts. In these examples, this library may be, for example, library 406 in FIG. 4.

Figure 13:
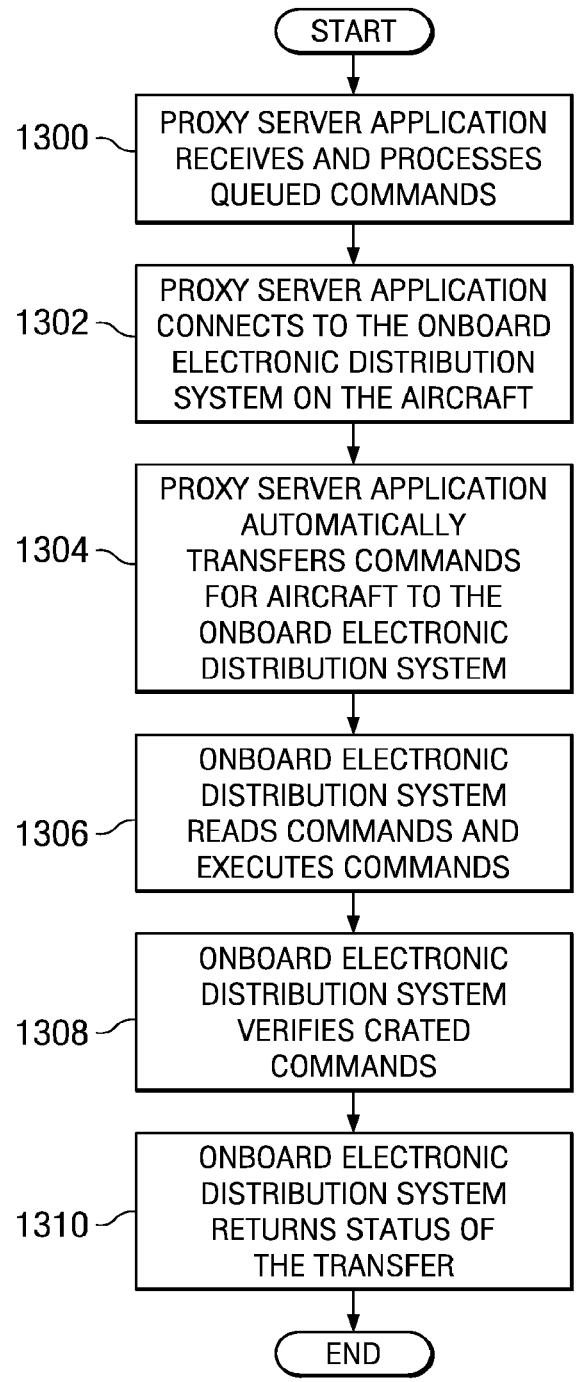
FIG. 13 is a flowchart of a process for distributing commands through a proxy server in accordance with an advantageous embodiment.

Referring to FIG. 13, a flowchart of a process for distributing commands through a proxy server is depicted in accordance with an advantageous embodiment. The process illustrated in FIG. 13 may be implemented in software part management environment 400 in FIG. 4. In particular, this process is an example of one executed during distribute commands mode 504 in FIG. 5.

The process begins by the proxy server application receiving and processing queued commands (operation 1300). In these examples, queued commands are sent in crates, referred to as command packages. The crates are processed and sent to appropriate aircraft command queues in the library. The proxy server application may access and retrieve the queued commands from queues in the library. If these commands include uplink commands, crated aircraft software parts also are placed into local inventory of the proxy server. In these examples, the commands are placed into crates for distribution to the proxy server.

Thereafter, the proxy server application connects to the onboard electronic distribution system on the aircraft (operation 1302). The proxy server application may connect to multiple aircraft at the same time. In these examples, the aircraft connects to the proxy server application through a wireless connection or communications link. Once the communications link is established, information may flow between the proxy server application and the onboard electronic distribution system. This information may include, for example, commands, data, aircraft software parts, configuration files, manuals, and status information.

The proxy server application then automatically transfers the crate commands for the aircraft to the onboard electronic distribution system (operation 1304). In these examples, the crate commands designated for the aircraft are available for retrieval by the onboard electronic distribution system.

The onboard electronic distribution system reads the commands and executes the commands (operation 1306). In these examples, the onboard electronic distribution system polls the command queue on the proxy server application and retrieves each command for the aircraft one command at a time. The onboard electronic distribution system then verifies the crated commands (operation 1308). If the crate is verified, the command is passed on to the designated system and application. Thereafter, the onboard electronic distribution system returns the status of the transfer for the commands (operation 1310), with the process terminating thereafter.

Figure 14:
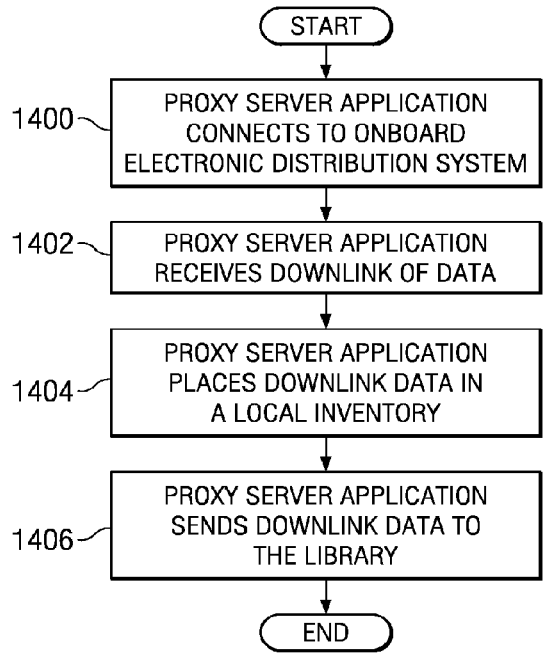
FIG. 14 is a flowchart of a process for receiving and distributing downlink data through a proxy server application in accordance with an advantageous embodiment.

Turning next to FIG. 14, a flowchart of a process for receiving and distributing downlink data through a proxy server application is depicted in accordance with an advantageous embodiment. The process illustrated in FIG. 14 may be implemented in software part management environment 400 in FIG. 4. In particular, the process illustrated in FIG. 14 is an example of operations that occur during receive downlink data mode 508 in FIG. 5.

The process begins with the proxy server application connecting to the onboard electronic distribution system on an aircraft (operation 1400). Thereafter, the proxy server application receives the downlink of the data (operation 1402). In these examples, the onboard electronic distribution system generates a downlink for each item in the queue containing downlink data.

Thereafter, the proxy server application places the downlink data in a local inventory (operation 1404). This downlink data is stored for transfer back to the library based on some event. In these examples, the event may be a period event, such as the expiration of a timer. In other examples, the event may be a non-period event, such as a request generated by a user. Afterwards, the proxy server application sends the downlink data to the library (operation 1406), with the process terminating thereafter. In operation 1406, the downlink data is placed in a directory for later use or analysis.

Figure 15:
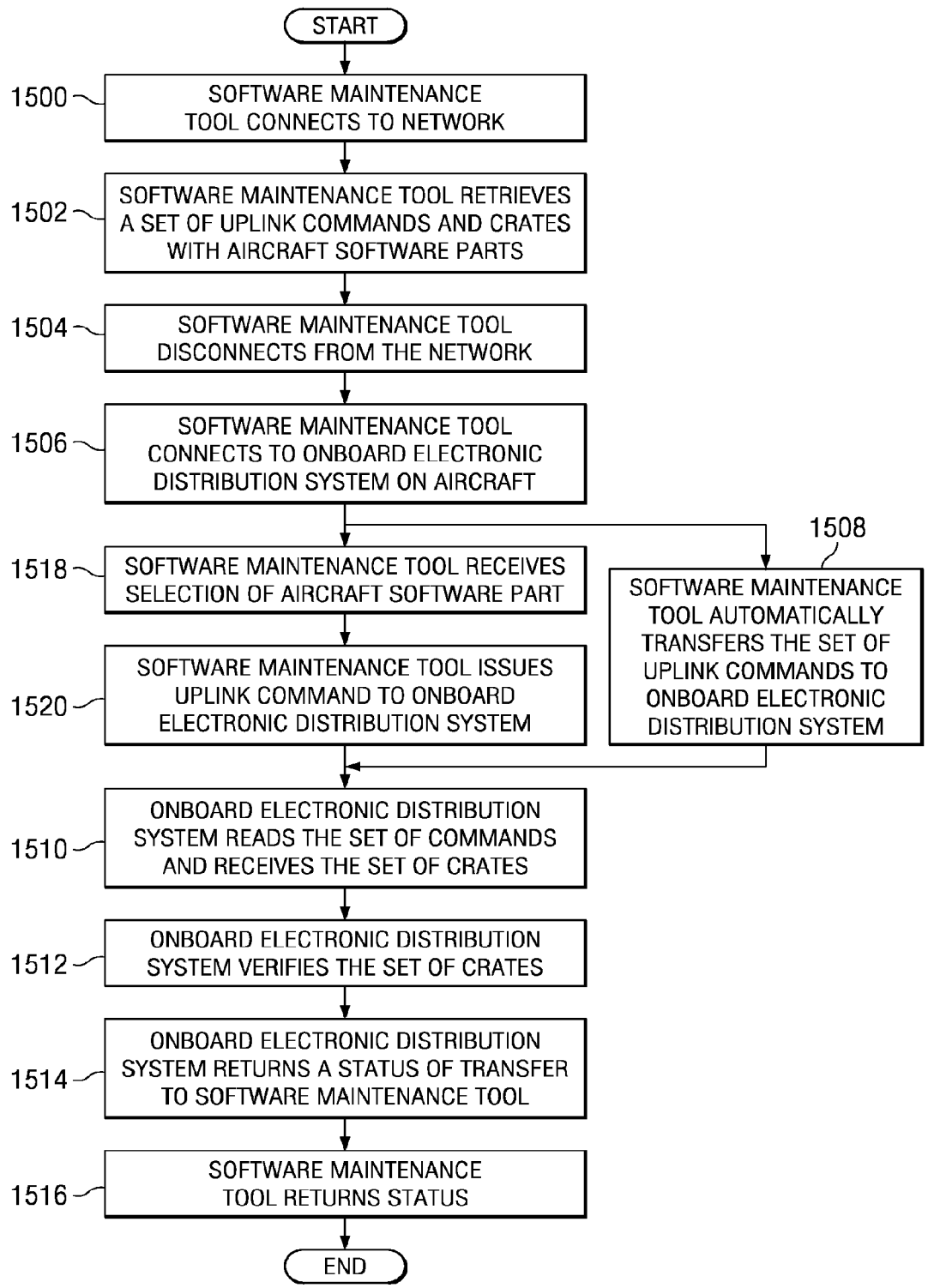
FIG. 15 is a flowchart of a process for distributing aircraft software parts using a software maintenance tool in accordance with an advantageous embodiment.

Turning now to FIG. 15, a flowchart of a process for distributing aircraft software parts using a software maintenance tool is depicted in accordance with an advantageous embodiment. The process illustrated in FIG. 15 may be implemented in software part management environment 400 in FIG. 4. The different operations in this process are examples of operations that occur during distribute parts mode 506 in FIG. 5.

The process begins with the software maintenance tool connecting to the network (operation 1500). This is the network in which the library is present. In this example, parts are not present and located on the software maintenance tool. Next, the software maintenance tool retrieves a set of uplink commands and crates with aircraft software parts (operation 1502).

Thereafter, the software maintenance tool disconnects from the network (operation 1504). The software maintenance tool is then moved and connected to the onboard electronic distribution system on the aircraft (operation 1506). In these examples, the connection requires a human operator to initiate the connection. The software maintenance tool automatically transfers the set of uplink commands to the onboard electronic distribution system (operation 1508). In these examples, the commands are sent to the onboard electronic distribution system one command at a time. Each time a command is sent within operation 1508, a check is made as to whether the onboard electronic distribution system is done uplinking the command or other information before sending the next command.

The onboard electronic distribution system reads the set of commands and receives the set of crates containing the aircraft software part (operation 1510). In these examples, each command in the set of commands is retrieved one at a time by the onboard electronic distribution system from the software maintenance tool. The onboard electronic distribution system verifies the set of crates (operation 1512). If the crates are verified, the aircraft software parts are then passed on for storage and distribution in the aircraft.

Then, the onboard electronic distribution system returns a status of the transfer to the software maintenance tool (operation 1514). The software maintenance tool then returns the status of the transfer (operation 1516), with the process terminating thereafter. In this example, the software maintenance tool returns the status to a source of the aircraft software part, such as a library or proxy server application.

In these examples, the uplink commands may be manually added rather than automatically received from the library. For example, an operator of the software maintenance tool may select aircraft software parts for transfer to an aircraft. This selection results in the software maintenance tool generating the appropriate commands to transfer the aircraft software parts. The process still receives crates for the aircraft software parts.

In this type of implementation, however, the process proceeds from operation 1508 to receive a selection of the aircraft software part (operation 1518). This selection is based on user input in these examples. Thereafter, the software maintenance tool issues an uplink command to the onboard electronic distribution system (operation 1520). This command may be placed in a command queue for the onboard electronic distribution system to retrieve.

Figure 16:
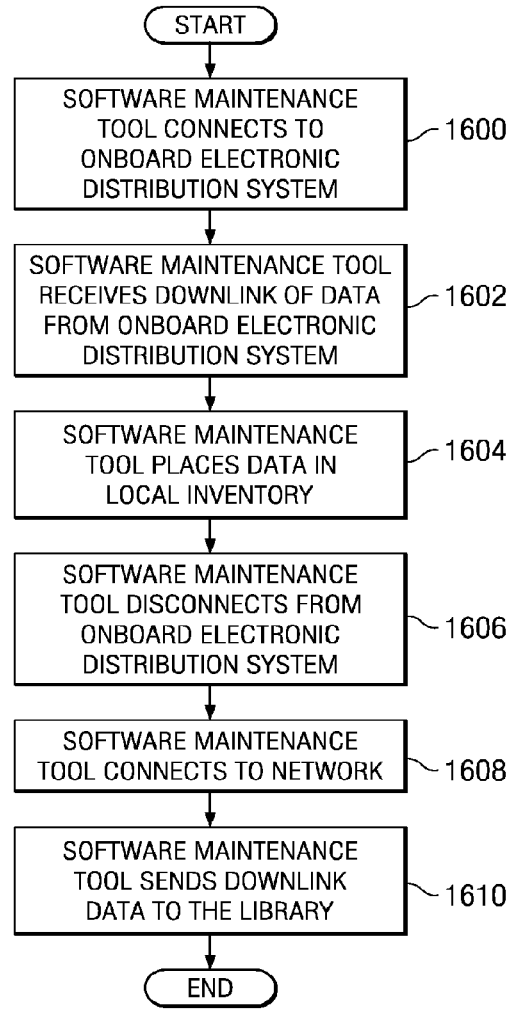
FIG. 16 is a flowchart of a process for receiving data using a software maintenance tool in accordance with an advantageous embodiment.

Turning now to FIG. 16, a flowchart of a process for receiving data using a software maintenance tool is depicted in accordance with an advantageous embodiment. The process illustrated in FIG. 16 may be implemented using software part management environment 400 in FIG. 4. The operations illustrated in FIG. 16 are examples of operations that may occur during receive downlink data mode 508 in FIG. 5.

The process begins with the software maintenance tool connecting to the onboard electronic distribution system (operation 1600). The software maintenance tool receives a downlink of data from the onboard electronic distribution system (operation 1602). The onboard electronic distribution system initiates a downlink for each item within its queue of downlink data.

Thereafter, the software maintenance tool places the data in the local inventory (operation 1604). In this operation, the software maintenance tool accepts the downlink and places the data in its inventory. Other data associated with the downlink data may be displayed in a user interface. This user interface may allow a user to sort downlink data into filtered downlink data using various parameters. These parameters may include, for example, without limitation, aircraft identification, system identification, application identification, or data type.

Next, the software maintenance tool disconnects from the onboard electronic distribution system (operation 1606). The software maintenance tool is moved from the aircraft to another location to transfer the downlink data. The software maintenance tool connects to the network (operation 1608). The software maintenance tool then sends the downlink data to the library (operation 1610), with the process terminating thereafter.

FIGS. 17-33 describe a library in a software part management environment. In particular, these figures illustrate one example of an implementation of library 406 in software part management environment 400 in FIG. 4.

Figure 17:
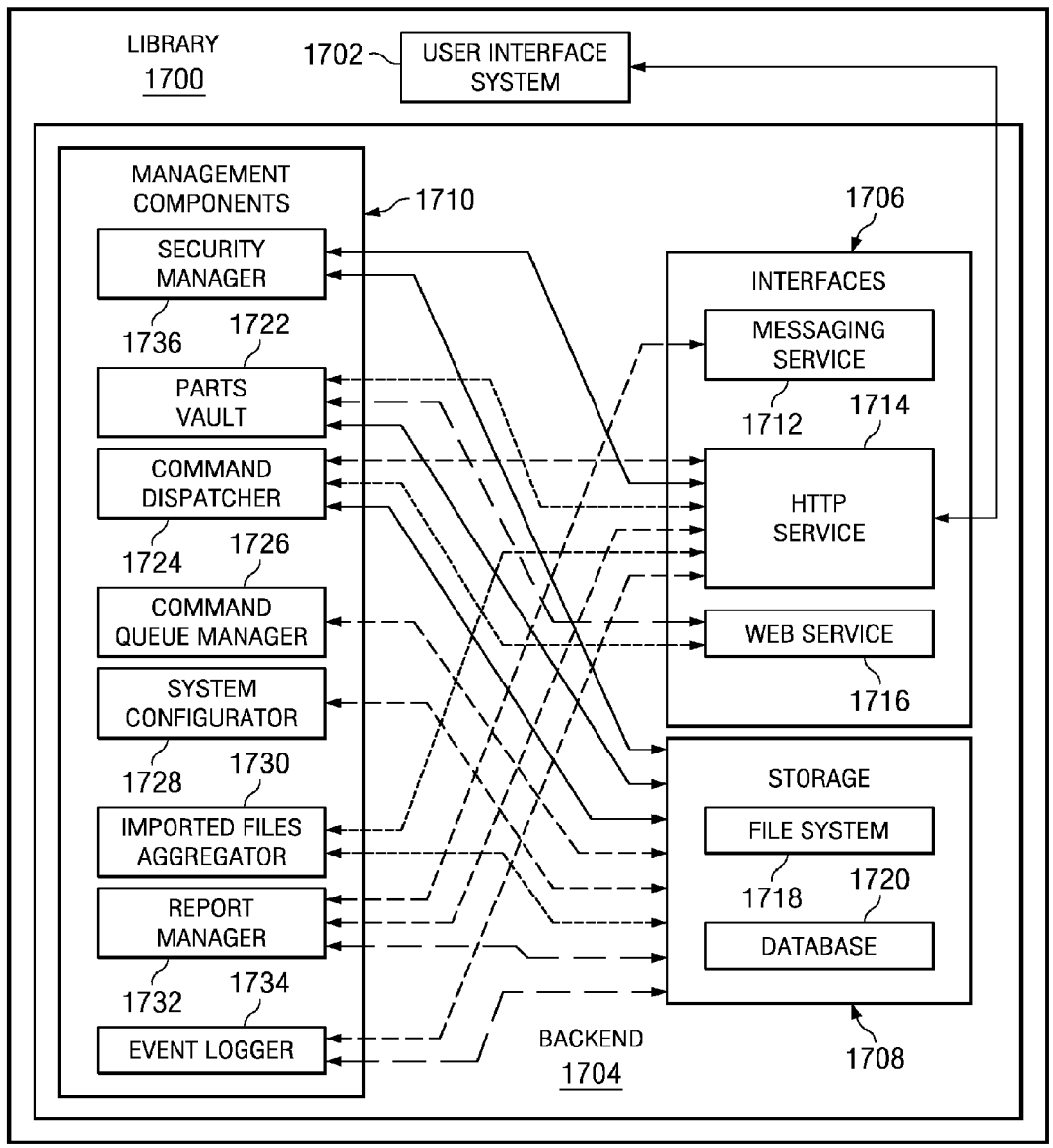
FIG. 17 is a functional block diagram of a library in accordance with an advantageous embodiment.

With reference to FIG. 17, a functional block diagram of a library is depicted in accordance with an advantageous embodiment. Library 1700 is a more detailed example of library 406 in FIG. 4. Library 1700 includes user interface system 1702 and backend 1704. Backend 1704 includes interfaces 1706, storage 1708, and management components 1710.

Interfaces 1706 include messaging service 1712, hypertext transport protocol (HTTP) service 1714, and web service 1716. Storage 1708 contains file system 1718 and database 1720. In these examples, management components 1710 include parts vault 1722, command dispatcher 1724, command queue manager 1726, system configurator 1728, imported files aggregator 1730, report manager 1732, event logger 1734, and security manager 1736.

User interface system 1702 provides an operator access to backend 1704 to perform different tasks and operations. User interface system 1702 may be a graphical user interface. More specifically, user interface system 1702 may be a web-based application that allows a user to access library 1700 from a remote location.

Interfaces 1706 contain a number of different interfaces that may be used to transfer information into and out of library 1700. Within interfaces 1706, messaging service 1712 allows various components within management components 1710 to communicate with other applications. In these examples, report manager 1732 uses messaging service 1712 to distribute reports in response to requests. Messaging service 1712 may be implemented using various types of messaging services. For example, messaging service 1712 may be implemented using Java® Messaging Service, which is part of the Java® 2 Enterprise Edition Suite. This product is available from Sun Microsystems, Inc.

Web service 1716 may be implemented using any web service system. Web service 1716 is designed to provide interaction between library 1700 and other devices over a network. Web service 1716 in interfaces 1706 may be implemented using application programming interfaces accessed over a network, such as the Internet. Web service 1716 may be implemented using various protocols such as, for example, simple object access protocol (SOAP) or web surface description language (WSDL). Hypertext transport protocol (HTTP) service 1714 may be implemented to provide a request and response system to manage responses made by clients. These requests are typically referred to as HTTP requests.

In these examples, hypertext transport protocol service 1714 may be used to send and receive information, such as files. These files may be, for example, files containing aircraft software parts, commands, downlink data, and other suitable information. In these examples, hypertext transport protocol service 1714 is used by parts vault 1722, command dispatcher 1724, imported files aggregator 1730, report manager 1732, and event logger 1734.

As depicted, the different components from components within management components 1710 may access storage 1708 for various reasons. Storage 1708 contains the different storage systems used to store information within backend 1704 of library 1700, such as file system 1718 and database 1720. Storage 1708 is a functional component that stores information and may be located on one or more storage devices, such as a hard drive or a random access memory. Storage 1708 may be, for example, located on a single storage device, such as a hard drive.

In other embodiments, storage 1708 may be located on multiple storage devices, which may be located in the same physical location or in different physical locations. Within storage 1708, file system 1718 provides a structure or architecture for storing data. This data may include, for example, aircraft software parts, documentation, downlink data, and other files. Database 1720, in these examples, may contain, for example, metadata and commands related to files located within file system 1718. Additionally, database 1720 may include other commands for performing other functions such as, for example, deleting files on an aircraft or downloading downlink data.

Parts vault 1722 provides processes to manage the storage and distribution of aircraft software parts to different aircraft. In particular, parts vault 1722 provides for a secure distribution of parts. These processes may receive new aircraft software parts, as well as package or crate aircraft software parts for distribution to an aircraft.

Command queue manager 1726 is a component that manages aircraft commands. Command queue manager 1726 may allow a user or operator, through user interface system 1702, to inspect, reorder, and change the status of commands within database 1720. The inspection of commands may allow a user to see different commands or filter commands based on different criteria.

Command dispatcher 1724 is a component that manages creation and dispatching of commands. This component may allow a user or operator, through user interface system 1702, to create uplink, delete, and downlink commands. Command dispatcher 1724 also provides validations of input parameters when creating these various types of commands. This component provides a mechanism to group, crate, and dispatch commands when external devices request by various criteria.

In these examples, system configurator 1728 manages the configuration of data to support operations performed by command dispatcher 1724. System configurator 1728 allows a user to define, select, or import information to define external devices that may be connected to library 1700. Additionally, this component may allow defining of aircraft models, particular aircrafts, and destination systems for the aircraft software parts. These destination systems, in these examples, may include line replaceable units located in the aircraft.

Imported files aggregator 1730 performs concurrent importing of large files sent from external devices to library 1700. Report manager 1732 allows an operator to define reports that may be generated by library 1700. These reports may be ones that include information from the event logs that may be aggregated from various sources pertinent to the operation of the software part management environment. For example, report manager 1732 may allow a user to define a report that identifies successful uplinking of a specific type of aircraft software part to a specific model of aircraft being managed within the software part management environment.

Event logger 1734 logs events with respect to the operation of library 1700. Additionally, event logger 1734 may aggregate logs from different devices connected to library 1700. These events may include, for example, without limitation, aircraft software parts received from outside sources, successful transfers of aircraft software parts to aircrafts, commands generated for uplinking data, commands generated for downlinking data, and commands generated to delete aircraft software parts.

Next, security manager 1736 provides a mechanism to manage access to library 1700 by operators using user interface system 1702. Security manager 1736 may be implemented using roles and responsibilities that may be configured for particular users. This type of access may provide users privileges to access different features or functionalities within library 1700. Further, security manager 1736 also may provide for secure communications between external devices and library 1700. As an example, security manager 1736 may ensure that communications through interfaces 1706 occur through mechanisms, such as encryption or virtual private networks.

In operation, library 1700 may receive aircraft software parts from an external program such as, for example, crate tool 402 in FIG. 4. In this type of operation, the external program connects a service, such as hypertext transport protocol service 1714 and interfaces 1706. Security manager 1736 performs authentication of the connection and determines whether aircraft software parts can be imported. If the connection is allowed, hypertext transport protocol service 1714 may then send a request to parts vault 1722 to handle the input process. In this process, parts vault 1722 writes metadata about the aircraft software parts into database 1720 while storing the actual aircraft software parts within file system 1718 in some selected file directory.

When managing parts in library 1700, aircraft software parts may be retrieved from file system 1718 through parts vault 1722 and sent to a user for inspection or review. Further, aircraft software parts may be archived in file system 1718. This type of archiving saves the part in some designated directory or other storage device. Further, parts vault 1722 also may scan certificates for parts within file system 1718 to identify whether any certificates signing the part have expired. A notification of expiration may be generated in advance through user interface system 1702. Further, expiration of a certificate also causes parts vault 1722 to disable any commands that contain the part.

Library 1700 also may be used to create and distribute commands to outside devices. These commands may be created by an operator through user interface system 1702. User interface system 1702 allows a user to enter information for commands. Once the commands are generated, these commands are stored within database 1720.

When these commands are needed by external devices, the commands may be crated and sent via interfaces 1706. In particular, web service 1716 may be used to send these commands to an outside component, such as a proxy server application or software maintenance tool. If aircraft software parts are specified by a command, these parts may be sent in a separate transfer through hypertext transport protocol service 1714 in these examples. These aircraft software parts may be sent when requested or sent as part of the transfer, depending on the particular implementation.

Additionally, reports are examples of other data that may be stored in file system 1718. These reports may be, for example, spreadsheets, parts lists, and live reports.

Information obtained from downlinking data, such as files and device logs, may be stored within file system 1718. These files may be aggregated using imported files aggregator 1730. This component may accept files and create metadata entries in database 1720, in addition to saving the files within file system 1718.

The different components illustrated for library 1700 are presented as one example of communication for different functions. The presentation and organization of these different components is not intended to imply architectural limitations to the manner in which the components may be implemented. For example, the different components within library 1700 may be subdivided or combined in other fashions other than that as displayed. Additionally, in other implementations, some functions may be omitted or other functions may be added. Further, some functions may be combined and implemented as a single module or application within library 1700. As another example, interfaces 1706 may be implemented using other interfaces in addition to, or in place of, the ones illustrated.

Figure 18:
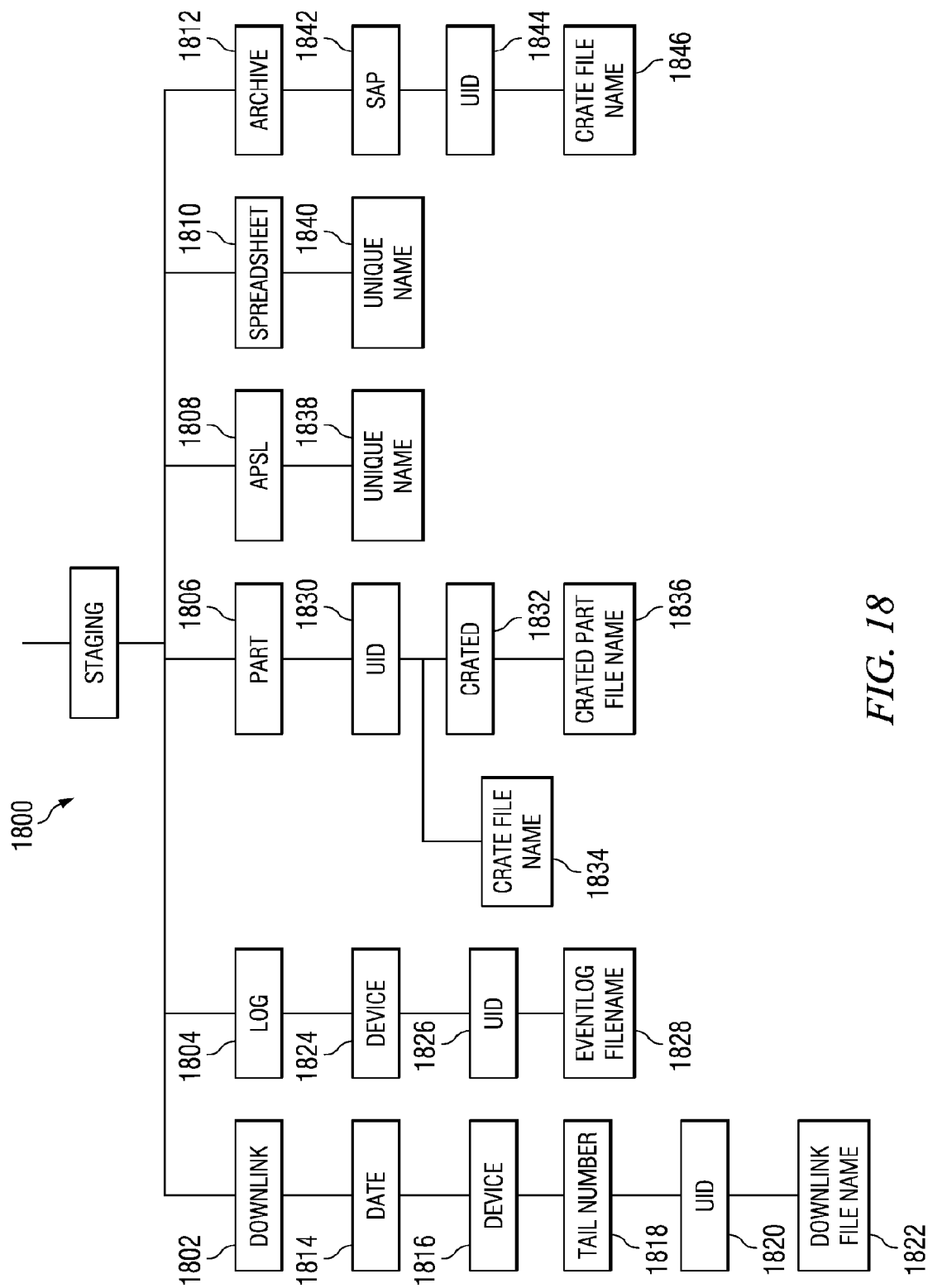
FIG. 18 is a diagram illustrating a file system directory layout in accordance with an advantageous embodiment.

Turning now to FIG. 18, a diagram illustrating a file system directory layout is depicted in accordance with an advantageous embodiment. File system directory layout 1800 is an example of a layout or schema used within file system 1718 in FIG. 17. In this example, file system directory layout 1800 defines information used to locate files within file system 1718 in FIG. 17. The file types include, for example, downlink 1802, log 1804, part 1806, alternate part sign list (APSL) 1808, spreadsheet 1810, and archive 1812.

Each of these types of files is identified within file system directory layout 1800 with different types of information. For example, downlink 1802 includes date 1814, device 1816, tail number 1818, unique identifier (UID) 1820, and downlink file name 1822. Date 1814 identifies the creation date of the downlink file. Device 1816 identifies the device that transferred the downlink data from the aircraft to the library. This device may be, for example, a proxy server application or software maintenance tool. Tail number 1818 identifies a particular aircraft on which the downlink data was located. Unique identifier 1820 uniquely identifies the file within the file system. Downlink file name 1822 is the name of the downlink file.

Next, log 1804 includes device 1824, unique identifier (UID) 1826, and eventlog filename 1828. Part 1806 is for an aircraft software part and includes unique identifier (UID) 1830, crated 1832, crate file name 1834, and crated part file name 1836. Crated 1832 identifies a directory in which the crate, containing the aircraft software part, is located. Crate file name 1834 is a name of the crate file. Crated part file name 1836 is the name of the file containing the aircraft software part.

Alternate part signature list 1808 includes unique name 1838, and spreadsheet 1810 includes unique name 1840. Archive 1812 includes aircraft software part (SAP) 1842, unique identifier (UID) 1844, and crate file name 1846.

File system directory layout 1800 is provided as an example of one implementation for file system 1718 in FIG. 17. In other advantageous embodiments, other file system layouts or schemas may be used, which are suitable for the particular implementation.

With reference now to FIG. 19, a block diagram illustrating an organization of commands in queues is depicted in accordance with an advantageous embodiment. In this example, queues 1900, 1902, and 1904 are examples of queues that are located in database 1720 in FIG. 17.

Queue 1900 includes commands 1906; queue 1902 includes commands 1908; and queue 1904 includes commands 1910. Commands 1906, 1908, and 1910 are commands destined for a particular aircraft in these examples. The commands may be, for example, uplink commands, downlink commands, or delete commands. An uplink command is a command that sends information from library 1700 in FIG. 17 to an aircraft, while a downlink command is a command that sends information from an aircraft to library 1700 in FIG. 17.

A delete command is a command that is used to delete information on the aircraft. This information may be, for example, an aircraft software part, a configuration file, or a manual. Each of these queues, in these examples, is associated with a particular ground tool or device. In these examples, queues 1900, 1902, and 1904 are associated or designated for different devices that are to distribute the commands to aircraft.

For example, queue 1900 may be associated with a first proxy server application, queue 1902 with a second proxy server application, and queue 1904 with a software maintenance tool. When different devices contact library 1700 in FIG. 17, commands are distributed to those devices based on whether commands are present in the queues associated with those devices.

Turning now to FIG. 20, a block diagram of an aircraft software part is depicted in accordance with an advantageous embodiment. In this example, aircraft software part 2000 is stored in crate 2002. Crate 2002 is stored within file system 1718 in FIG. 17.

Crate 2002 is a file in these examples. Crate 2002 may be, for example, without limitation, in a zip file format. Crate 2002 also may, in some embodiments, contain more than one aircraft software part. Aircraft software part 2000 may include a set of files that provide functionality for the particular part. These files may include, for example, executable files, data files, configuration files, and library files.

In the depicted embodiments, crate 2002 and aircraft software part 2000 are signed. In other words, aircraft software part 2000 is signed with one digital signature, while crate 2002 is signed with another digital signature. These digital signatures may be the same or different, depending on the particular embodiment. Of course, in other implementations, aircraft software part 2000 may not be stored in crate 2002.

Figures 23, 24:
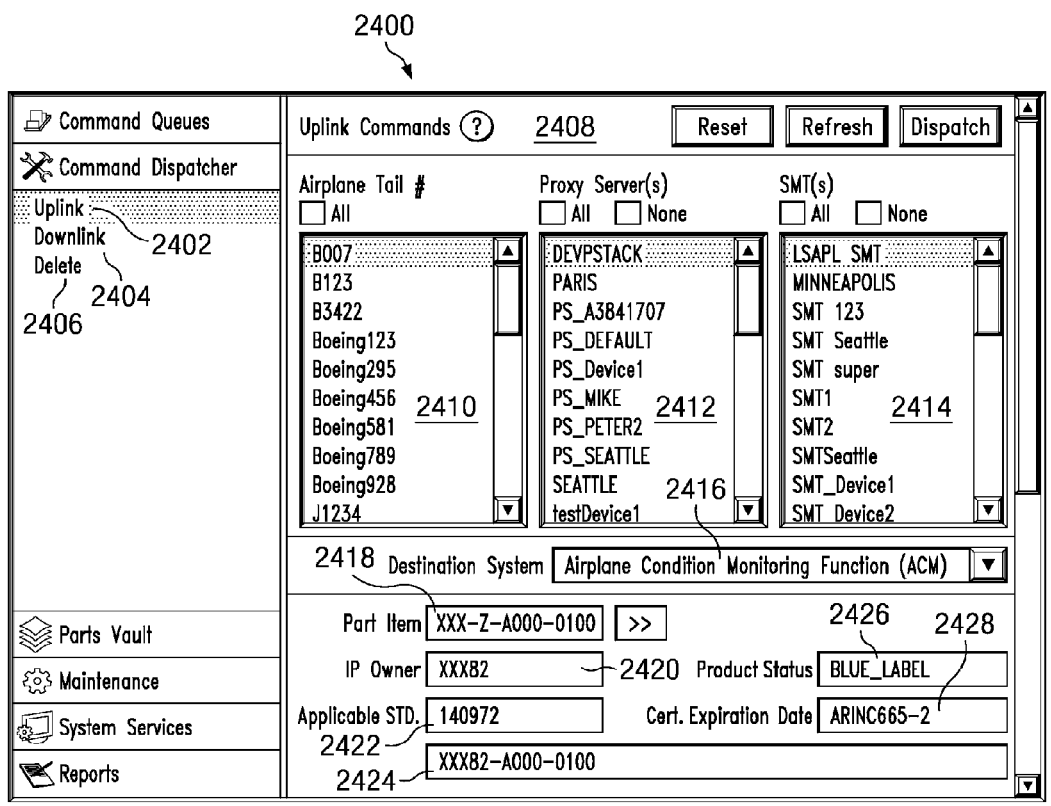
FIG. 23 is a diagram illustrating a data structure for a downlink command in accordance with an advantageous embodiment.
FIG. 24 is a diagram of a user interface for dispatching commands in accordance with an advantageous embodiment.

With reference now to FIGS. 21-23, examples of command data structures are depicted in accordance with an advantageous embodiment. The different command data structures illustrated in these figures are examples of temporary data structures created from commands stored in queues, such as queues 1900, 1902, and 1904 in FIG. 19.

Turning now to FIG. 21, a command data structure for a delete command is depicted in accordance with an advantageous embodiment. In this example, delete command data structure 2100 includes parameters 2102, 2104, 2106, 2108, 2110, and 2112.

Parameter 2102 identifies a set of file names to be deleted. Parameter 2104 identifies a set of part identifiers to be deleted. Parameter 2106 is a set of airplane identifiers that identify the particular aircraft to receive the delete command. This list of airplane identifiers may be, for example, tail numbers. Parameter 2108 identifies a set of devices that are to send the command. These devices may be, for example, ground tools, such as a proxy server application or software maintenance tool.

Parameter 2110 identifies the destination system to receive the command. In these examples, the destination system is the particular line replaceable unit that is to receive the command. Parameter 2112 identifies a user that requests the command.

In FIG. 22, a diagram illustrating a command data structure for an uplink command is depicted in accordance with an advantageous embodiment. In this example, uplink command data structure 2200 includes parameters 2202, 2204, 2206, 2208, and 2210. Parameter 2202 identifies the aircraft software part to be uplinked or sent. Parameter 2204 identifies a set of airplanes to receive the commands. These parameters contain aircraft identifiers. Parameter 2206 is a set of device identifiers for devices to process the command. Parameter 2208 is a set of parameters identifying the destination system to receive the command. Parameter 2210 identifies the user that requested the command.

Turning next to FIG. 23, a diagram illustrating a data structure for a downlink command is depicted in accordance with an advantageous embodiment. In this example, downlink command data structure 2300 includes parameters 2302, 2304, 2306, 2308, and 2310.

Parameter 2302 identifies the type of data that is being downlinked. Parameter 2304 identifies a set of aircraft to receive the command to downlink data. Parameter 2306 is for a set of devices to send the command to the set of aircraft. Parameter 2308 identifies a set of line replaceable units on the set of aircraft to receive the command. Parameter 2310 identifies a user that requests the command.

These command data structures are abbreviated forms of the commands that allow devices, such as a proxy server application or software maintenance tool, to begin processing the commands referenced by the command data structures. These command data structures may reduce the amount of traffic across various communications links in these examples. The devices may request the actual commands after receiving these command data structures. These command data structures are deleted after being sent to the ground tools in these examples.

With reference now to FIG. 24, a diagram of a user interface for dispatching commands is depicted in accordance with an advantageous embodiment. Window 2400 is an example of a user interface that may be presented through user interface system 1702 for command dispatcher 1724 in FIG. 17.

In this example, a user may select between creating commands, such as uplink commands and downlink commands. This selection may be made through controls 2402 and 2404. Control 2402 may be used to generate an uplink command, while control 2404 may be used to generate a downlink command. Control 2406 may be used to generate delete commands.

In this depicted example, control 2402 has been selected, resulting in section 2408 being displayed within window 2400. Section 2408 provides a user an ability to input information to create an uplink command. For example, the user may select an airplane tail number from list 2410. These airplane tail numbers are unique to particular aircraft.

The user also may select a device in the form of a proxy server application from list 2412 to distribute the command. Also, devices in the form of software maintenance tools may be selected through list 2414. The destination system on the aircraft may be selected through field 2416. The destination system is a particular line replaceable unit in these examples. Field 2418 allows the entry of a part number. Entry of this part number provides other information about the part shown in fields 2420, 2422, 2424, 2426, and 2428. The particular information displayed about the part may vary, depending on the particular implementation.

Field 2416 has different selectable values for different command types.

Figure 25:
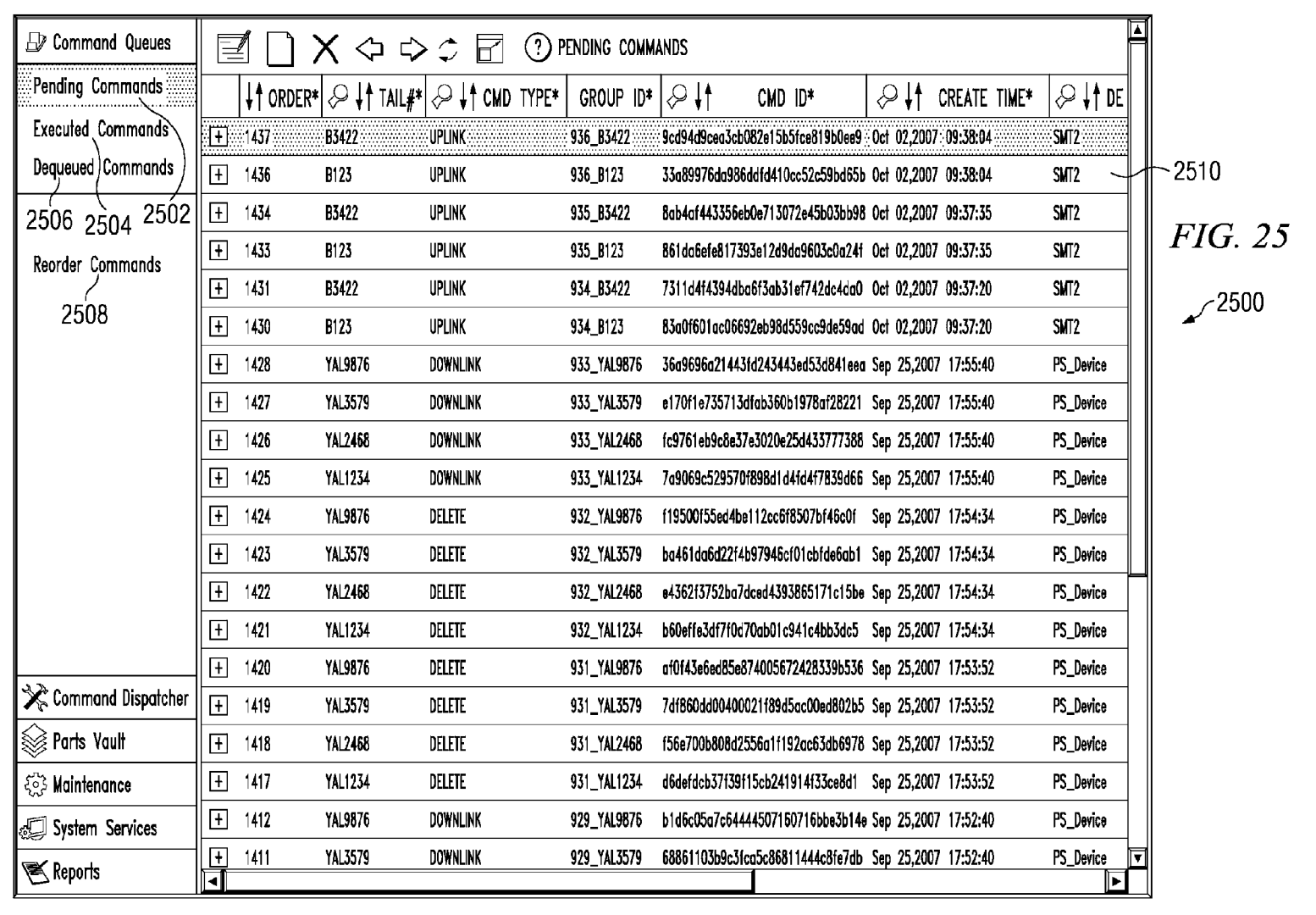

FIGS. 25-26 are diagrams of graphical user interfaces in accordance with an advantageous embodiment. These graphical user interfaces are examples of interfaces that may be presented through user interface system 1702 in FIG. 17. These depicted graphical user interfaces are presented for purposes of illustrating one particular implementation and not meant to limit the manner in which a graphical user interface may be designed or presented by user interface system 1702 in FIG. 17.

Turning to FIG. 25, a diagram illustrating a user interface for viewing commands is depicted in accordance with an advantageous embodiment. In this example, window 2500 is an example of a graphical user interface that may be displayed through user interface system 1702 for command queue manager 1726 in FIG. 17. In this example, the user may view the status of various commands. In particular, specific types of commands may be viewed through window 2500.

Commands may be viewed using controls 2502, 2504, and 2506. Pending commands may be viewed by selecting control 2502, executed commands may be viewed by selecting control 2504, and dequeued commands may be viewed by selecting control 2506. A user may reorder or change the order in which commands are stored in the queue through control 2508. In this example, pending commands have been selected and are displayed within section 2510 of window 2500.

With reference now to FIG. 26, a diagram of a user interface for viewing parts is depicted in accordance with an advantageous embodiment. Window 2600 is an example of a graphical user interface presented through user interface system 1702 for parts vault 1722 in FIG. 17.

In this depicted example, aircraft software parts within the library may be viewed. Valid parts may be viewed through the selection of control 2602, incoming parts may be viewed through the selection of control 2604, expired parts may be viewed through the selection of control 2606, and faulty parts may be viewed through the selection of control 2608. In this example, control 2602 has been selected, and valid parts located within the library are displayed within section 2610 of window 2600.

Figure 27:
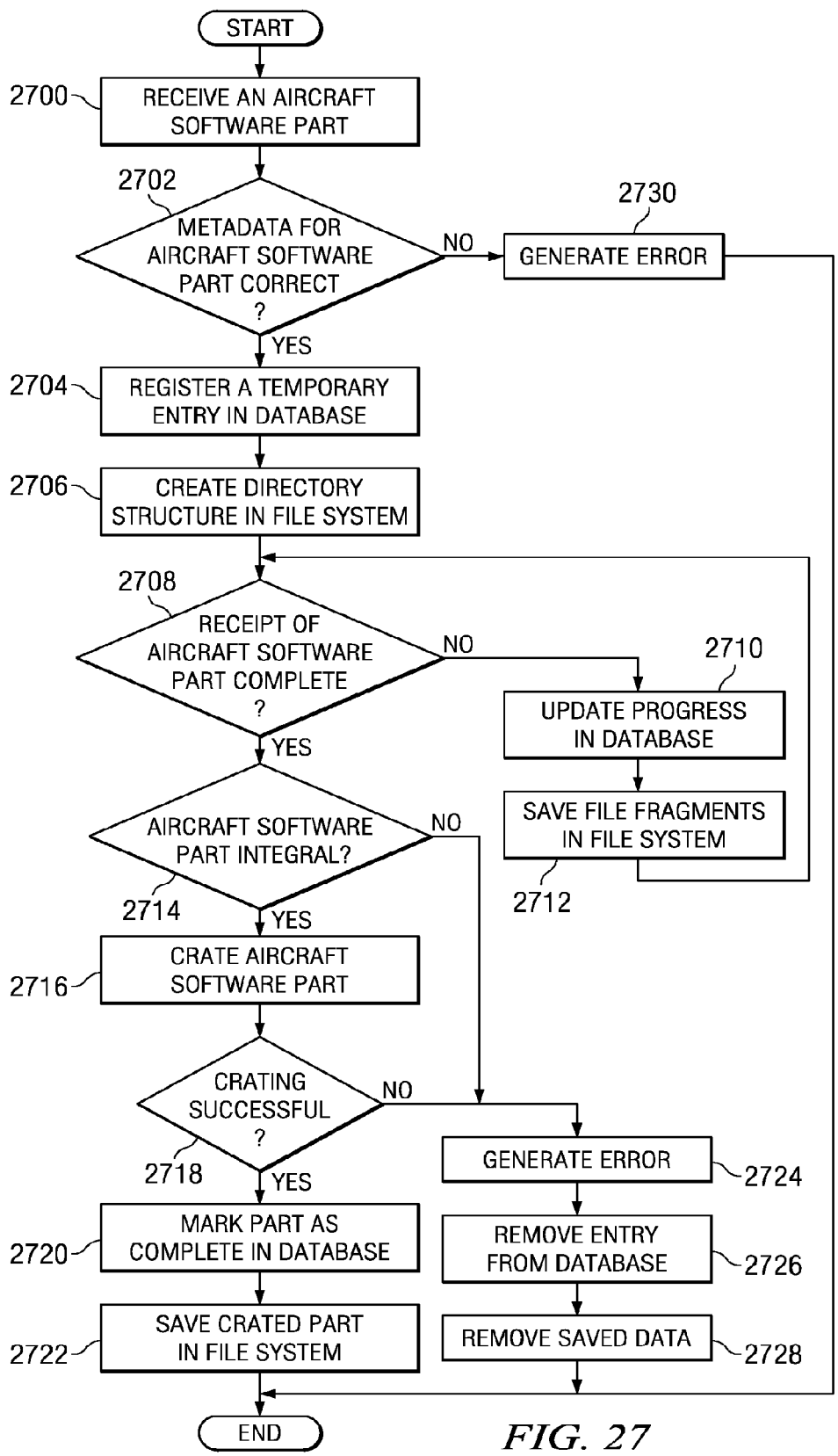
FIG. 27 is a flowchart of a process for receiving aircraft software parts in a library in accordance with an advantageous embodiment.

With reference now to FIG. 27, a flowchart of a process for receiving aircraft software parts in a library is depicted in accordance with an advantageous embodiment. The process illustrated in FIG. 27 may be implemented in library 1700 in FIG. 17. In particular, these processes may be implemented in parts vault 1722 within management components 1710 of library 1700 in FIG. 17.

The process begins by receiving an aircraft software part (operation 2700). In receiving the aircraft software part, metadata is received as well as a stream of data for the aircraft software part. The process determines whether the metadata for the aircraft software part is correct (operation 2702). In these examples, the metadata is data that is associated with and/or describes the aircraft software part.

In these examples, the following metadata may be checked: whether part name conforms to the regular expression [^~/:*?\"<>,|.\\]* and less or equal to 200 characters; whether the production status is BLACK_LABEL, RED_LABEL, or BLUE_LABEL; whether the applicable standard is of a length greater or equal to 0 and less or equal to 500 characters; whether the intellectual property owner is of a length greater or equal to 0 and less or equal to 100 characters; whether the release date has a correct date format; and whether the description is of a length greater or equal to 0 and less or equal to 2000 characters.

If the metadata for the part is correct, the process registers a temporary entry in the database in the library (operation 2704). This temporary entry is used to provide a status of the process for receiving the part. The entry initially indicates that the receiving of the part has begun. The process also creates a directory structure in the file system (operation 2706). This directory structure is used to save portions or fragments of the file containing the aircraft software part as the file is received.

A determination is made as to whether the receipt of the aircraft software part is complete (operation 2708). If the receipt of the aircraft software part is not complete, the progress is updated in the database (operation 2710), and the file fragments received are saved in the file system (operation 2712). This progress may be displayed in the user interface. The process then returns to operation 2708 to continue checking the status of the received operation for the aircraft software part.

When the receipt of the aircraft software part is complete in operation 2708, the process determines whether the part is integral (operation 2714). This operation is performed to determine whether the aircraft software part is complete and whether the part has errors. The check may be made by matching a certificate to the received part.

If the aircraft software part is integral, the process crates the aircraft software part (operation 2716). The process then determines whether the crating operation was successful (operation 2718). If the crating was successful, the part is marked as complete in the database (operation 2720). The crated part is saved in the file system for later retrieval (operation 2722), with the process terminating thereafter.

With reference again to operation 2718, if the crating operation is not successful, an error is generated (operation 2724). Thereafter, the process removes the entry from the database (operation 2726), and removes the saved data for the aircraft software part (operation 2728), with the process terminating thereafter. With reference again to operation 2714, if the aircraft software part is not integral, the process also proceeds to operation 2724. Operations 2726 and 2728 are performed to clean up the database entry and the file system entry for the failed receipt of the aircraft software part.

With reference again to operation 2702, if the metadata for the aircraft software part is not correct, the process generates an error (operation 2730), with the process terminating thereafter. The errors generated in operations 2730 and 2724 may be stored in a log for later use.

Figure 28:
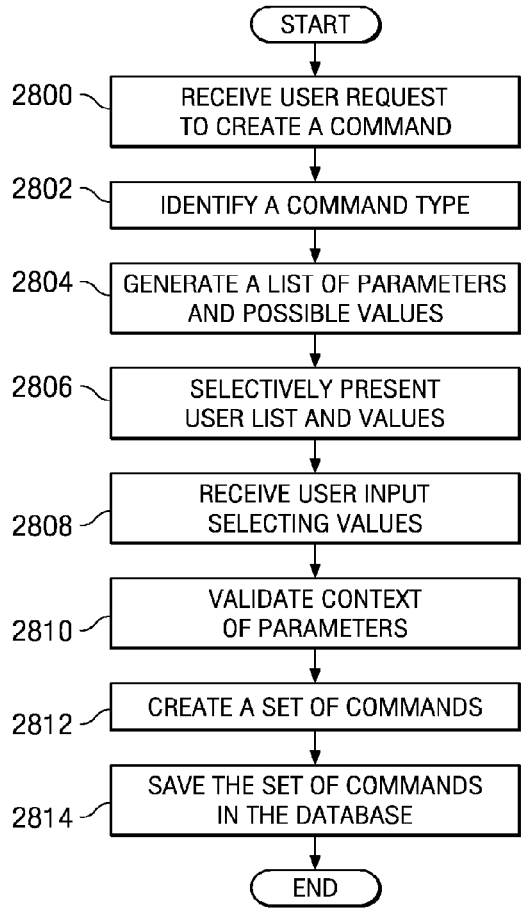
FIG. 28 is a flowchart of a process for creating a command in accordance with an advantageous embodiment.

Turning now to FIG. 28, a flowchart of a process for creating a command is depicted in accordance with an advantageous embodiment. The process illustrated in FIG. 28 may be implemented in library 1700 in FIG. 17. In particular, this process may be implemented in command dispatcher 1724 in FIG. 17.

The process begins by receiving a user request to create a command (operation 2800). This command may be received through a user interface, such as that provided through user interface system 1702 in FIG. 17. A user may select one of three command types in these examples. The command types include uplink, downlink, and delete. The process identifies a command type from the user input (operation 2802).

In response to the type of command identified, the process generates a list of parameters and possible values (operation 2804). This list includes, for example, aircraft tail numbers, applicable device name lists, and destination line replaceable units to receive the command. The process then selectively presents the list and values to the user (operation 2806). In these examples, the list is a context-sensitive list that provides additional options or values, depending on the previous selections made by the user.

The process receives user input selecting values from the presented list and values (operation 2808). The process then validates the context of the parameters (operation 2810). In these examples, the context sensitive values exist in user interface system 1702 in FIG. 17. This interface implements what is allowable within a command type the values of destination systems. Operation 2810 rechecks these rules at backend 1704 in FIG. 17. Backend 1704 may serve other user interfaces other than user interface system 1702 in FIG. 17 that may not have the same validation rules.

The process creates a set of commands (operation 2812). In operation 2812, the process creates a command for each combination of command type, tail number, and device name. Of course, other rules and policies may be used to identify what commands are created from the user selections. Typically, all commands of the same type and target to the same aircraft may be logically grouped. Thereafter, the set of commands is saved in the database in the library (operation 2814), with the process terminating thereafter.

Figure 29:
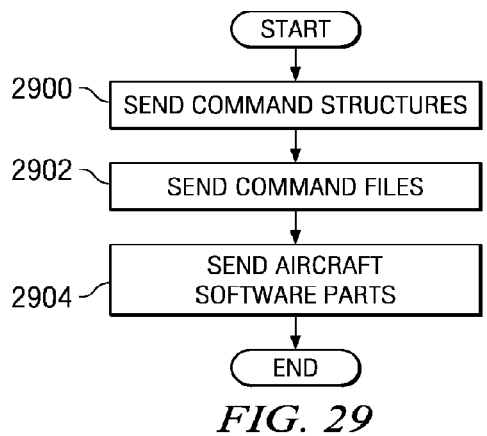
FIG. 29 is a high level flowchart of a process for managing aircraft software parts in accordance with an advantageous embodiment.

With reference to FIG. 29, a high-level flowchart of a process for managing aircraft software parts is depicted in accordance with an advantageous embodiment. The process illustrated in FIG. 29 may be implemented in library 1700 in FIG. 17 in these examples.

The process begins by sending command structures to distribution devices (operation 2900). These command structures may be, for example, delete command data structure 2100 in FIG. 21, uplink command data structure 2200 in FIG. 22, or downlink command data structure 2300 in FIG. 23. These command structures are sent in response to requests for commands from various devices, such as a proxy server application or software maintenance tool.

Thereafter, command files are sent to the devices (operation 2902). These command files are sent in response to requests for the commands themselves when a particular device executes a command. Command structures are sent instead of sending command files to reduce the amount of traffic that may occur from constant polling by various devices. Instead, command files are sent when devices actually begin executing the commands. Thereafter, the process sends the aircraft software parts (operation 2904), with the process terminating thereafter. In this operation, the aircraft parts are sent as part of the execution of a command.

Figure 30:
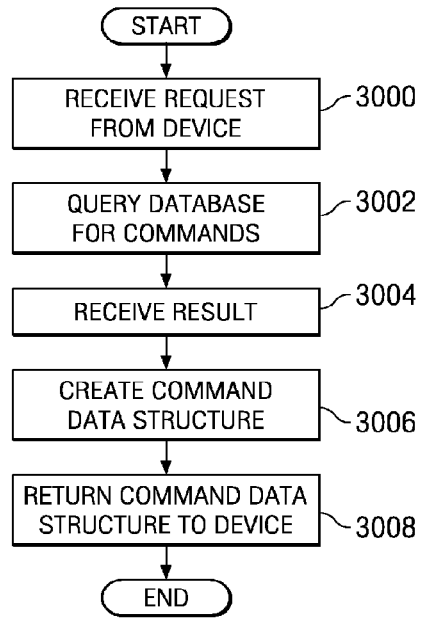
FIG. 30 is a flowchart of a process for dispatching command structures in accordance with an advantageous embodiment.

Turning now to FIG. 30, a flowchart of a process for dispatching command structures is depicted in accordance with an advantageous embodiment. The process illustrated in FIG. 30 is a more detailed description of operation 2900 in FIG. 29.

The process begins by receiving a request from a device (operation 3000). In these examples, the device may be, for example, a proxy server application or a software maintenance tool. Of course, the device may be any device that contacts or connects to the library to obtain commands.

The process then queries the database for commands associated or placed in a command queue for the particular device (operation 3002). Operation 3002 may be implemented using command queue manager 1726 in FIG. 17. The process receives a result from the query (operation 3004).

Thereafter, the process creates a command data structure containing the commands for the device (operation 3006). The process then returns the command data structure to the device (operation 3008), with the process terminating thereafter. In these examples, the command data structures are created upon a request by a device for commands. In other embodiments, the command data structures may be created and broadcast to many devices based on some event or on a period event, such as the expiration of a timer.

Figure 31:
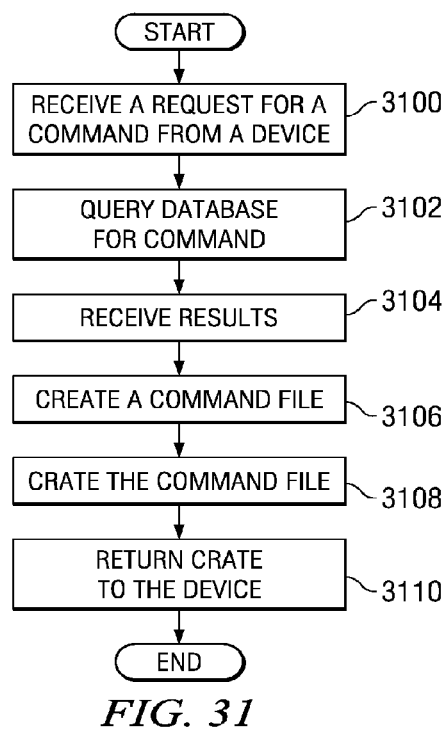
FIG. 31 is a flowchart of a process for dispatching command files in accordance with an advantageous embodiment.

Turning now to FIG. 31, a flowchart of a process for dispatching command files is depicted in accordance with an advantageous embodiment. The process illustrated in FIG. 31 is a more detailed description of operation 2902 in FIG. 29. The process illustrated in FIG. 31 may be implemented in a component, such as command dispatcher 1724 in FIG. 17.

At this point in the process, the device has received a command data structure for processing. The device may perform some processing of the command based on this command data structure. For example, the device may begin to establish a communications link with the aircraft. The command data structure provides sufficient information for the device to perform various processes. The propagation of the command to the aircraft, however, requires additional information in a command file.

The process begins by receiving a request for a command file from a device (operation 3100). The process queries the database for the command identified by the device (operation 3102). This query is made using a unique identifier previously sent in the command structure.

The process then receives results from the database (operation 3104). Operation 3102, in these examples, queries the database based on a command ID and retrieves all the information about the command which is used to create a crated version of the command in extensible markup language. Operation 3104 could be redundant. These results are used to create a command file (operation 3106). The process crates the command file (operation 3108). Thereafter, the process returns the crate to the device (operation 3110), with the process terminating thereafter.

With reference now to FIG. 32, a flowchart of a process for dispatching parts is depicted in accordance with an advantageous embodiment. The process illustrated in FIG. 32 is a more detailed description of operation 2904 in FIG. 29. The process in this example may be implemented using command dispatcher 1724 in FIG. 17.

The process begins by receiving a request for an aircraft software part from a device (operation 3200). The process queries the database for the aircraft software part (operation 3202). The process retrieves the crated aircraft software part from the file system (operation 3204), and retrieves metadata for the aircraft software part from the database (operation 3206). The process then performs an integrity check on the aircraft software part (operation 3208). The integrity check is performed to ensure that the aircraft software part has not been corrupted while being stored. This integrity check may be made using various error checking processes, including hashing.

A determination is made as to whether the aircraft software part is valid based on the integrity check (operation 3210). If the aircraft software part is valid, the crated aircraft software part is returned to the device (operation 3212), with the process terminating thereafter. On the other hand, if the aircraft software part is not valid, an error message is returned (operation 3214), with the process terminating thereafter.

Turning now to FIG. 33, a flowchart of a process for dequeuing commands is depicted in accordance with an advantageous embodiment. The process illustrated in FIG. 33 may be performed by command queue manager 1726 in FIG. 17. This process is used to remove commands from the queue in the database after the commands have been processed.

The process begins by receiving notification of a command execution (operation 3300). In this example, the notification is received from the device executing the command. The process looks up the command and its associated group (operation 3302). This lookup is performed using a unique identifier for the command. Additionally, other commands associated with the executed commands are redundant commands that may have been sent to different devices for the same aircraft.

The process marks and dequeues the command from the command queue in the database (operation 3304). The process also dequeues all other commands in the group (operation 3306). This dequeuing of other commands prevents redundant commands being dispatched to different devices in the future. Thereafter, the status is saved (operation 3308), with the process terminating thereafter.

Figure 34:
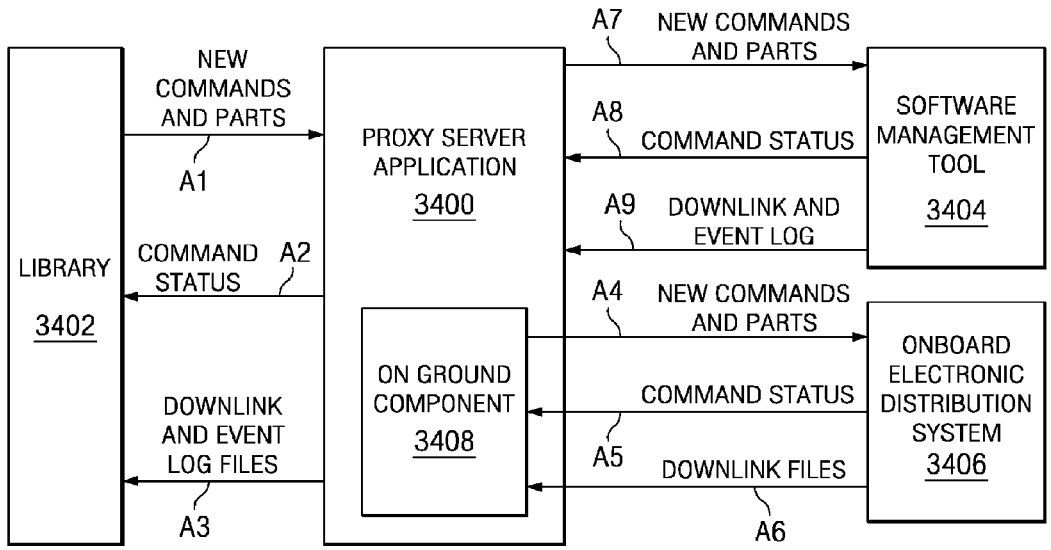
FIG. 34 is a diagram illustrating data flow in a proxy server application in accordance with an advantageous embodiment.

Turning now to FIG. 34, a diagram illustrating data flow in a proxy server application is depicted in accordance with an advantageous embodiment. Proxy server application 3400 interacts with components such as library 3402, software management tool 3404, and onboard electronic distribution system 3406. In these examples, on ground component 3408 provides for transfer of information between library 3402 and onboard electronic distribution system 3406.

Library 3402 may send new commands and aircraft software parts to proxy server application 3400 (message A1).

The results of the processing of those commands and parts may be returned to library 3402 by proxy server application 3400 as command status information (message A2). Additionally, proxy server application 3400 also may send downlink and event log files to library 3402 (message A3).

With respect to transferring information with onboard electronic distribution system 3406, on ground component 3408 and proxy server application 3400 may send new commands and aircraft software parts to onboard electronic distribution system 3406 (message A4). Command status information may be returned to on ground component 3408 identifying the status of commands and parts sent to onboard electronic distribution system 3406 (message A5). Additionally, onboard electronic distribution system 3406 may send downlink files to on ground component 3408 (message A6).

Proxy server application 3400 may send new commands and parts to software management tool 3404 (message A7). Software management tool 3404 may return command status after the processing of those files (message A8) and send downlink files or event logs (message A9). In these examples, software management tool 3404 may communicate with onboard electronic distribution system 3406. Software management tool 3404 provides an alternate route for exchanging information with onboard electronic distribution system 3406. Software management tool 3404 is located in a portable data processing system, which may be moved from a location associated with proxy server application 3400 to the aircraft in which onboard electronic distribution system 3406 is located. These details are described in more detail with respect to the description of software management tool 3404 below.

Although the different interactions have been described in a particular order, any of the different messages and interactions may occur simultaneously at any time.

For example, proxy server application 3400 may send commands and aircraft parts to onboard electronic distribution system 3406 at the same time onboard electronic distribution system 3406 downloads downlink data to proxy server 3400. Further, proxy server application 3400 may simultaneously service multiple aircraft clients, such as software management tool 3404 and onboard electronic distribution system 3406.

Figure 35:
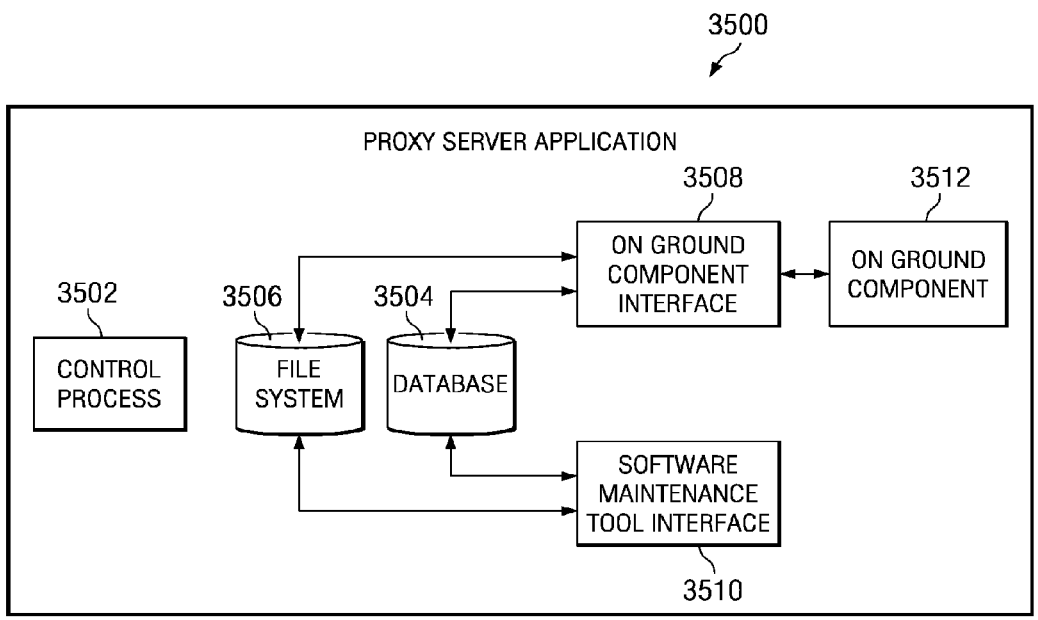
FIG. 35 is a diagram illustrating a proxy server application in accordance with an advantageous embodiment.

With reference now to FIG. 35, a diagram illustrating a proxy server application is depicted in accordance with an advantageous embodiment. Proxy server application 3500 is an example implementation of proxy server application 3400 in FIG. 34. In this example, proxy server application 3500 includes control process 3502, database 3504, file system 3506, on ground component interface 3508, software maintenance tool interface 3510, and on ground component 3512. These two interfaces may be implemented using application programming interface (API) calls in these examples.

Database 3504 contains commands processed by control process 3502. Each of the records in database 3504 may identify the status of a command. For example, a record may identify whether a command has been processed, as well as the target aircraft and target line replaceable unit on the aircraft. File system 3506 stores aircraft software parts and downlink data in these examples.

On ground component 3512 is a software component in proxy server application 3500 that communicates with the onboard electronic distribution system on the aircraft. On ground component interface 3508 has application programming interfaces that provide calls that may be used by control process 3502 to exchange information with on ground component 3512.

On ground component 3512 functions to allow any processes, such as control process 3502 in proxy server application 3500, to communicate with an onboard electronic distribution system without having to be specifically designed to communicate with the onboard electronic distribution system. As a result, control process 3502 may be changed or modified without having to include protocols used to communicate with the onboard electronic distribution system. Further, changes to an onboard electronic distribution system may occur without requiring changes to all of the processes in proxy server application 3500. Instead, modification or changes may be made to on ground component 3512.

Software maintenance tool interface 3510 has application programming interfaces that provide calls that may be used by control process 3502 to communicate with a software maintenance tool. The structure and organization of database 3504 and file system 3506 may be similar to that used in a library within the aircraft software part maintenance environment.

Turning to FIGS. 36-39, diagrams illustrating data structures used in database 3504 in FIG. 35 are depicted in accordance with an advantageous embodiment. Command result database table 3600 illustrates information and records for command results. Command result database table 3600 includes command result identifier 3602, command identifier 3604, ground status 3606, aircraft status 3608, date 3610, command type 3612, aircraft identifier 3614, and device name 3616.

Command result identifier 3602 uniquely identifies a specific command result record, and command identifier 3604 uniquely identifies a specific command record. Command identifier 3604 may be found in various tables to relate data in the tables to a specific command record. Ground status 3606 identifies the origination of the command status messages, which may be from an on ground component or an onboard electronic distribution system in these examples. Aircraft status 3608 is a command status message that can originate from an on ground component or an onboard electronic distribution system. The ground status identifies the status of the uplink or downlink of the file being uplinked or downlinked.

This information provides the percentage completeness of the actual uplink or downlink of the file. Each percentage may be reported as a separate status. Using an uplink as an example, a status message of one-quarter done, followed by a one-half done status message, then a three-quarters done message, and finally a done status message would all be sent as the contents of the file were being sent to the onboard electronic distribution system. The reporting of each message would be an indication that the appropriate amount of the file contents had been successfully delivered. The same may occur with file contents being written to the ground component during a downlink operation.

Date 3610 identifies the date that the particular device sent the command result. Command type 3612 identifies the type of command, such as uplink, downlink, or delete. Aircraft identifier 3614 is a unique value identifying a specific aircraft within an airline's fleet of aircraft. Device name 3616 identifies the name of the device sending the command result to the proxy server application.

Turning now to FIG. 37, a diagram of a downlink file database table is depicted in accordance with an advantageous embodiment. In this example, downlink file database table 3700 illustrates information in a downlink file database table. Downlink file database table 3700 includes downlink file identifier 3702, airplane identifier 3704, device 3706, date 3708, file name 3710, file universal resource locator 3712, and file status 3714.

With reference now to FIG. 38, command and command resource database tables are depicted in accordance with an advantageous embodiment. In this example, command database table 3800 represents commands, while command resources database table 3802 represents command resources. Command database table 3800 includes command identifier 3804, airplane identifier 3806, application name 3808, command type 3810, device name 3812, system name 3814, date 3816, servicing status 3818, priority 3820, command group 3822, crated command 3824, and crated command path 3826.

Command resources database table 3802 includes command resource identifier 3828, data type 3830, application standard 3832, part expiration date 3834, owner 3836, name 3838, production status 3840, release date 3842, supplier 3844, path 3846, crate expiration date 3848, and command identifier 3850. Command resources identified in command resources database table 3802 are aircraft software parts in crates for uplink commands, file or configuration reports for downlink commands, and files or aircraft software part files for delete commands.

Command identifier 3804 uniquely identifies this specific command result record. Airplane identifier 3806 identifies a particular aircraft. Application name 3808 identifies the line replaceable unit and the aircraft. For example, application name 3808 may identify a particular line replaceable unit. Device name 3812 identifies the different devices for which the command is dispatched to an aircraft. The device name identifies, for example, a particular proxy server application or software maintenance tool.

In these examples, the name may be a specific name for the particular proxy server application or software maintenance tool. System name 3814 identifies the name of the system on which the application is present. Date 3816 identifies the date that the command was created by the command dispatcher in the library.

Servicing status 3818 is used to identify the status of a command. This field may identify commands that have been successfully sent to the onboard electronic distribution system and to identify commands that a software maintenance tool has reported as being successfully uplinked to an onboard electronic distribution system.

Priority 3820 is a value used to order commands within queues for distribution to an onboard electronic distribution system. Command group 3822 may be used to group commands. Crated command 3824 is the name of the file containing the crated format of the command. Crated command path 3826 is a path identifying the location of where the crated command is stored.

In command resources database table 3802, command resource identifier 3828 uniquely identifies the command resource record. Data type 3830 identifies the type of data for the resource. Application standard 3832 identifies a standard applicable to the aircraft software part. Part expiration date 3834 indicates when the aircraft software part expires and/or is no longer usable. For example, the data type may be an aircraft software part or a file. Owner 3836 identifies the intellectual property owner of the aircraft software part. Name 3838 is the name of the file or the aircraft software part in these examples.

Production status 3840 identifies the production status of the aircraft software part within a crate. This status may be, for example, red label, blue label, or black label. A red label part is a non-deliverable, production quality hardware or software part under engineering development. A blue label part is controlled and maintained and is restricted for use in a laboratory environment only. A black label part is considered production ready and can be delivered to an airline customer.

Release date 3842 identifies the date that the aircraft software part in the crate was released. Supplier 3844 identifies the supplier of the aircraft software part. Path 3846, in these examples, identifies the location of the aircraft software part. For example, a universal resource locator string may be used for retrieving the part. Crate expiration date 3848 is the date that the certificate used to sign the crate expires. Command identifier 3850 identifies the specific aircraft command record.

Crated command files may be associated with records in the command table by storing the file name in the crated command field in combination with the file path string. Aircraft software part crate files may be associated to records in the command resource table in command resources database table 3802 by storing the file name in name 3838 in combination with a file path string.

Figure 39:
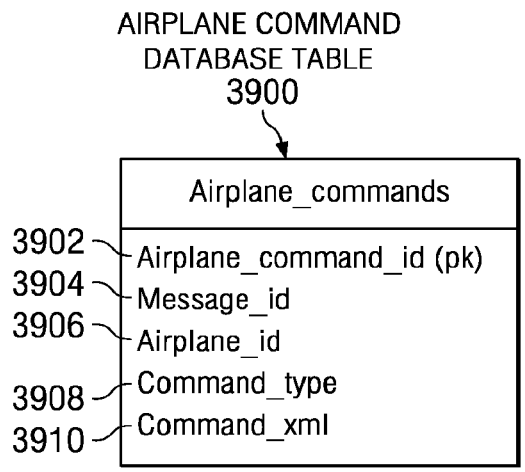

In FIG. 39, a diagram illustrating an airplane command database table is depicted in accordance with an advantageous embodiment. In this example, airplane command database table 3900 provides an example of information found for airplane commands. Airplane command database table 3900 includes airplane command identifier 3902, message identifier 3904, airplane identifier 3906, command type 3908, and command XML 3910.

Airplane command identifier 3902 is used to uniquely identify the particular aircraft command record. Message identifier 3904 is an identifier for partial downlinks related to a particular downlink command. This identifier is generated for downlink files that are not the result of a downlink command sent to the onboard electronic distribution system. Command XML 3910 identifies the extensible markup language document file format of the particular downlink command that the onboard electronic distribution system sent that will be retrieved when the onboard electronic distribution system requests a partial downlink file.

In these examples, the different tables may be related to each other through the command identifier. The different database table definitions are for different data elements handled by the proxy server application. Different processes may use one or more of these tables to indicate when a record is inserted, updated, or deleted.

Figure 40:
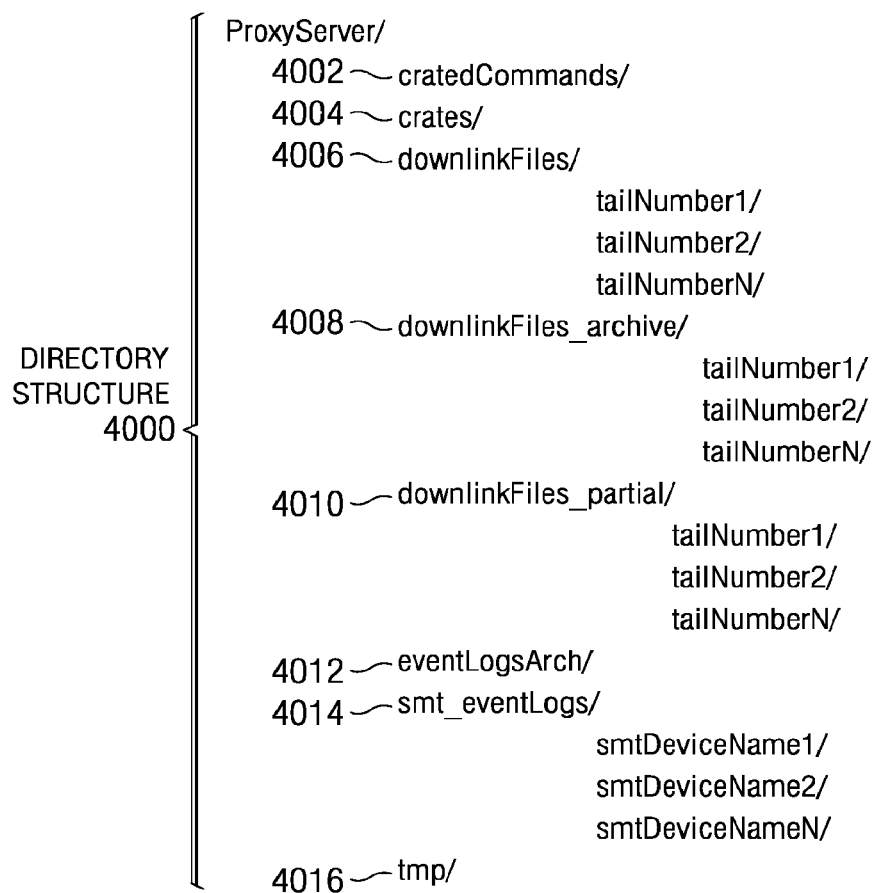
FIG. 40 is a diagram of a proxy server file system directory structure in accordance with an advantageous embodiment.

Turning now to FIG. 40, a diagram of a proxy server file system directory structure is depicted in accordance with an advantageous embodiment. In this example, directory structure 4000 represents a file system directory structure. Directory structure 4000 is an example of one type of directory structure that may be implemented in file system 3506 in FIG. 35. Directory structure 4000 may identify different types of files stored within a file system on a proxy server application.

In these examples, directory structure 4000 includes crated commands 4002, crate 4004, downlink files 4006, downlink files archive 4008, downlink files partial 4010, archived event file logs 4012, event log 4014, and temporary files 4016. This type of directory structure is used to store files in the file system, as well as to identify or locate files within the file system in these illustrative examples.

Figure 41:
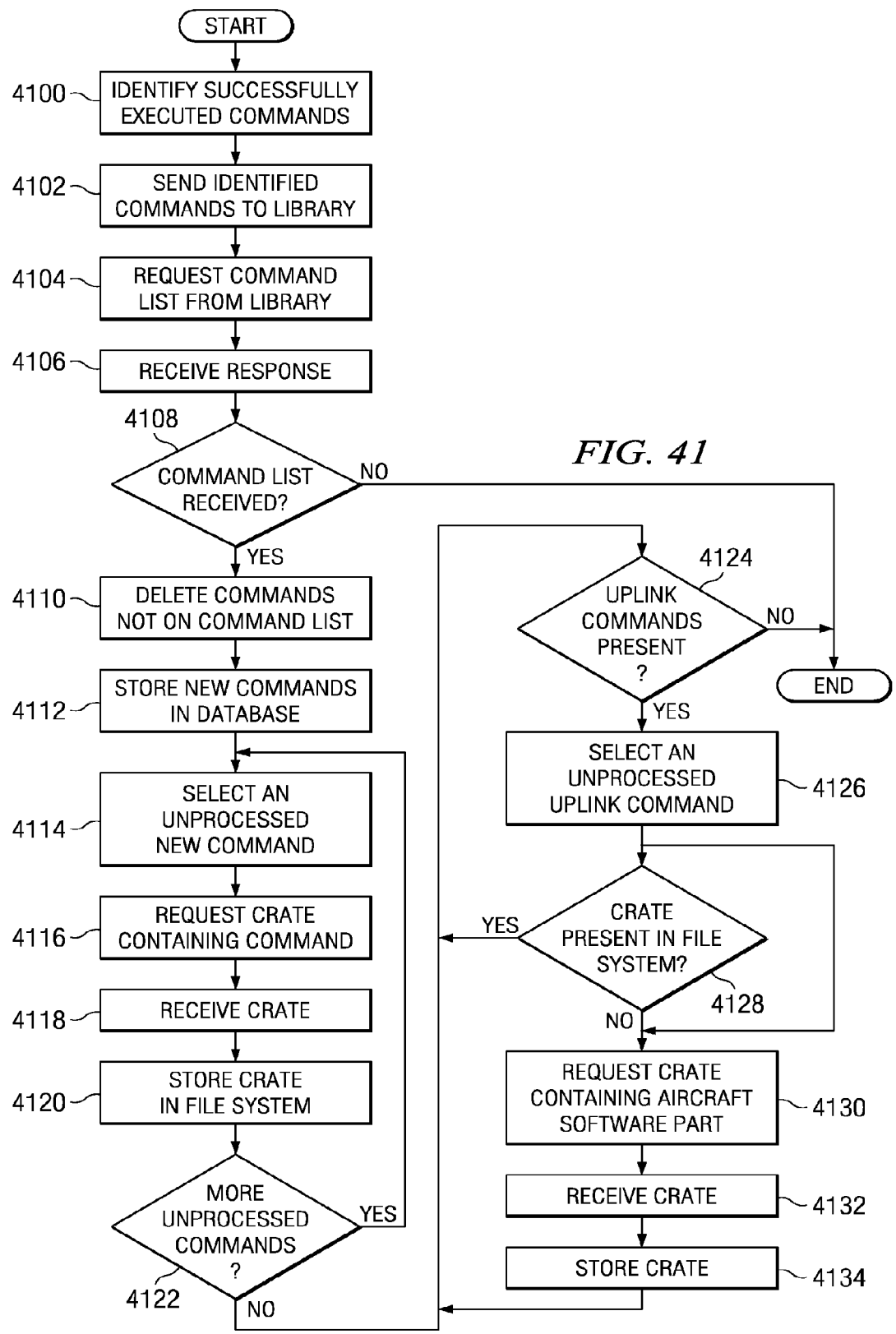
FIG. 41 is a flowchart of a process for receiving information from a library in accordance with an advantageous embodiment.

Turning now to FIG. 41, a flowchart of a process for receiving information from a library is depicted in accordance with an advantageous embodiment. In this example, the process illustrated in FIG. 41 may be implemented in control process 3502 in FIG. 35. This process is used to receive commands and parts from a library in the aircraft software part maintenance environment. This process may be initiated in response to an event. For example, the event may be the expiration of a timer. In other embodiments, the event may be caused by other sources. For example, the event may be initiated by a user input.

The process begins by identifying successfully executed commands (operation 4100). These commands are ones that the proxy server application sent to a set of aircraft in which the processing of the commands occurred successfully. The commands may be, for example, to delete a software aircraft file, load a software aircraft file, or downlink data from a line replaceable unit on the aircraft.

These commands may be identified from a database within the proxy server application, such as database 3504 in FIG. 35. The particular commands may be identified from command identifiers in a command result database table, such as command result database table 3600 in FIG. 36. The identification of these commands forms a list of commands that is sent to the library (operation 4102). Operations 4100 and 4102 are used to send command status information to the library.

Next, the process requests a command list from the library (operation 4104). Operation 4104 is performed to initiate processing of new commands for distribution to a set of aircraft. The process receives a response from the request (operation 4106). A determination is made as to whether a command list is received in the response (operation 4108). If a command list is not received, the process terminates with no new command present to process. Otherwise, the process deletes commands stored within the database that are not found on the new command list received from the library (operation 4110).

In operation 4110, the commands that are present in the database with the proxy server application that are not included in the list of commands retrieved from the library are considered to be unnecessary for the proxy server application to process or handle. This feature makes the library the authoritative source for commands that are supposed to be processed and found on different proxy server applications in these examples.

If the proxy server application receives a command and the command is canceled by a user before processing, the command dispatcher in the library deletes the command for the device. As a result, the proxy server application will not receive the command in the list of commands during a future cycle in which commands are requested. In this manner, a user may remove all the commands for a particular proxy server application by deleting pending commands for that proxy server application from a command queue screen.

Thereafter, the process stores new commands in the database (operation 4112). In these examples, the command list may be in the form of a command data structure. The proxy server application will selectively request the actual commands themselves either immediately or at some other point in time.

The process then selects an unprocessed new command for the process (operation 4114). The process requests a crate containing the command (operation 4116). In response to the request, the process receives the crate (operation 4118). The received crate is then stored in the file system (operation 4120). The process then determines whether any unprocessed new commands are still present (operation 4122). If additional unprocessed new commands are present, the process returns to operation 4114 to select another unprocessed new command for processing.

Otherwise, in operation 4122, the process determines whether uplink commands are present in the new commands received (operation 4124). If uplink commands are present, an unprocessed uplink command is selected for processing (operation 4126). The process then determines whether a crate containing an aircraft software part is already present in the file system (operation 4128). If a crate is present, the process returns to operation 4124 as described above.

If a crate is not present, the process requests the crate containing the aircraft software part corresponding to the command from the library (operation 4130). Thereafter, the process receives the crate (operation 4132) and stores the crate in the file system (operation 4134).

The process then returns to operation 4124 to determine whether additional unprocessed uplink commands are present. If additional unprocessed uplink commands are not present, the process terminates. Otherwise, the process returns to operation 4126 to select another unprocessed uplink command as described above.

During execution of the process in FIG. 41, three types of event log messages are created and recorded. A record indicating that the proxy server application successfully connected to the library is one event recorded in the log. An event indicating that a list of received commands has been received from the library is another event that is recorded. An event is also recorded for each command that is placed into a queue for an aircraft identified by the command. The list of successful commands sent to the library may be used in aiding an airline with planning maintenance operations.

Figure 42:
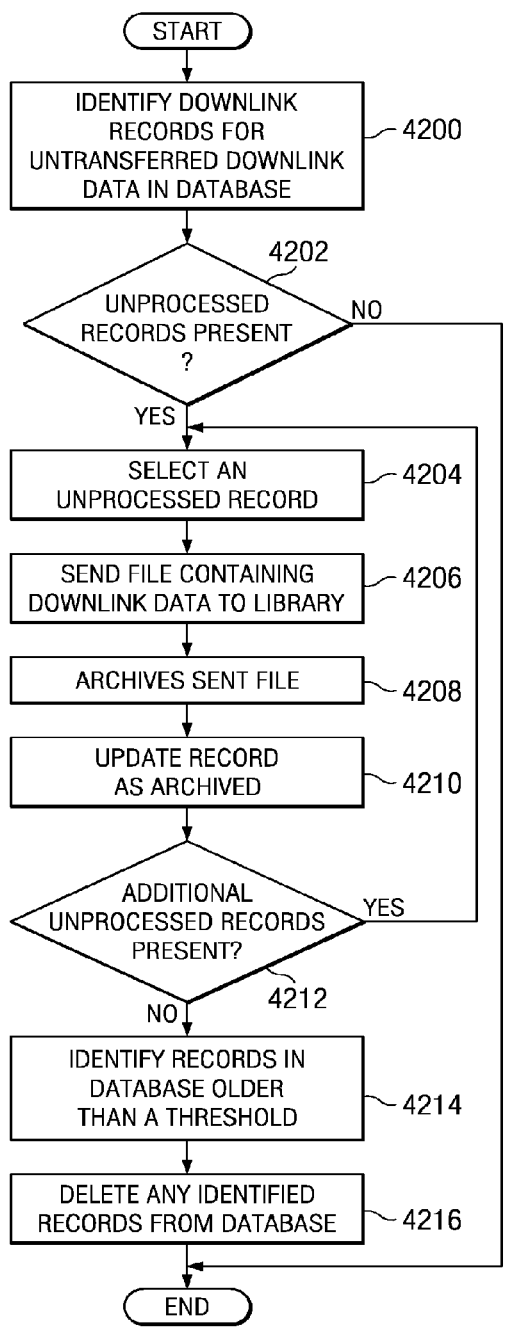
FIG. 42 is a flowchart of a process for sending downlink files to a library in accordance with an advantageous embodiment.

Turning now to FIG. 42, a flowchart of a process for sending downlink files to a library is depicted in accordance with an advantageous embodiment. The process illustrated in FIG. 42 may be implemented in a control process, such as control process 3502 in FIG. 35. This process illustrates the different operations that occur when a proxy server application sends a downlink file received from an onboard electronic distribution system to a library. This process may be initiated by an event, such as a timer. This process may be initiated at a different time from the process for handling commands that is illustrated in FIG. 41 to help spread out a traffic network and reduce congestion.

The process begins by identifying downlink records for untransferred downlink data in the database (operation 4200). A determination is made as to whether unprocessed records are present in the database (operation 4202). If unprocessed records are present, an unprocessed record for a downlink file is selected for processing (operation 4204). The process sends the file containing the downlink data to the library (operation 4206).

Thereafter, the process archives the file sent to the library (operation 4208). The process then updates the database record for the file as being archived (operation 4210). A determination is then made as to whether additional unprocessed records are present (operation 4212). If additional unprocessed records are present, the process returns to operation 4204.

Otherwise, the process identifies records in the database that are older than some selected threshold (operation 4214). This threshold may be, for example, some selected number of hours since the date and/or time in the timestamp indicating when the downlink file was received. The process deletes any identified records from the database (operation 4216), with the process terminating thereafter. With reference again to operation 4202, if unprocessed records are not present, the process also terminates.

Figure 43:
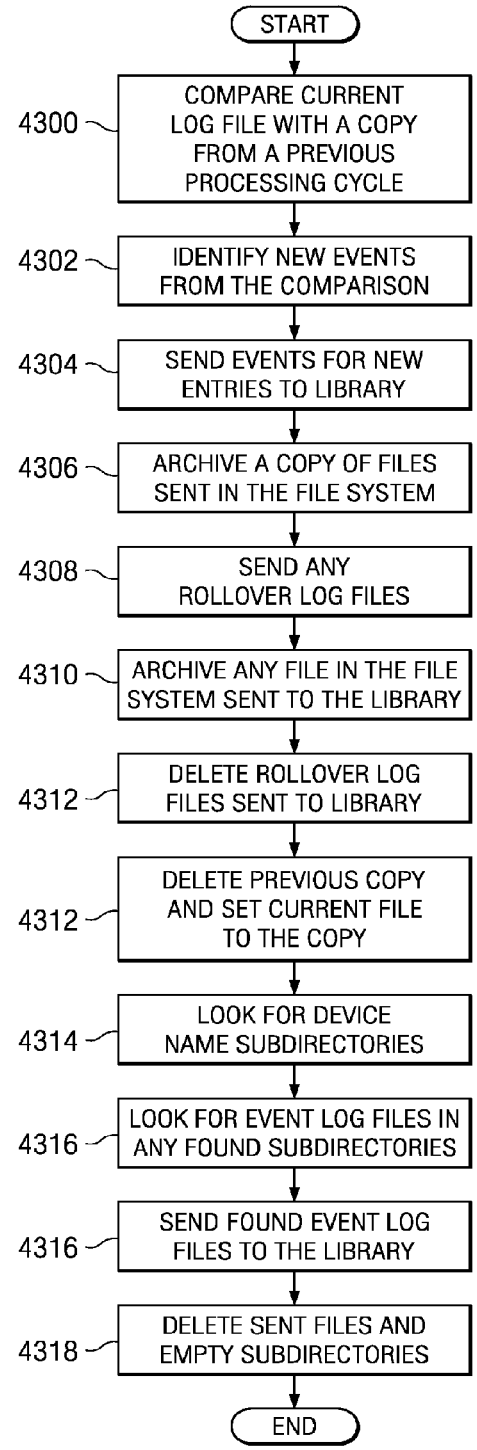
FIG. 43 is a flowchart of a process for sending event files to a library in accordance with an advantageous embodiment.

Turning now to FIG. 43, a flowchart of a process for sending event files to a library is depicted in accordance with an advantageous embodiment. The process illustrated in FIG. 43 may be implemented in a proxy server application component, such as control process 3502 in FIG. 35. As with the other processes, the process illustrated in FIG. 43 may be initiated in response to an event, such as a timer.

The process in this figure supports sending event logs back to the library for analysis for use in planning operations, such as maintenance operations. The event log sent to the library in FIG. 43 captures event messages that are the result of user interaction with an application user interface system and/or interface interaction between application components. This type of information may be used during business processes of an airline for reporting during an audit to ensure that various processes are followed for specific operations.

The process begins by comparing a current log file with a copy of the log file from a previous processing cycle (operation 4300). The process identifies any new events that have occurred from the comparison of the two log files (operation 4302). The process then sends events for new entries found in comparison to the library (operation 4304). A copy of the files sent to the file system is archived (operation 4306). The process then sends any rollover log files to the library (operation 4308). Rollover log files are files present from a previous period of time, such as a previous date.

The process archives a copy of any file in the file system sent to the library (operation 4310). The process then deletes the rollover log files sent to the library (operation 4312). Next, the previous copy of the log file is deleted and the current log file is set as the copy for use in the next comparison (operation 4312). The process then looks for device name subdirectories within the event logs direction (operation 4314). In operation 4314, subdirectories with a device name are created when a proxy server application writes event log files for received files from a software maintenance tool into the file system.

The process looks for event log files in any found subdirectories (operation 4316). Afterwards, the process sends any event log files found in the subdirectories to the library (operation 4316). The process then deletes all of the sent files and empties the subdirectories (operation 4318). The process then terminates.

Figure 44:
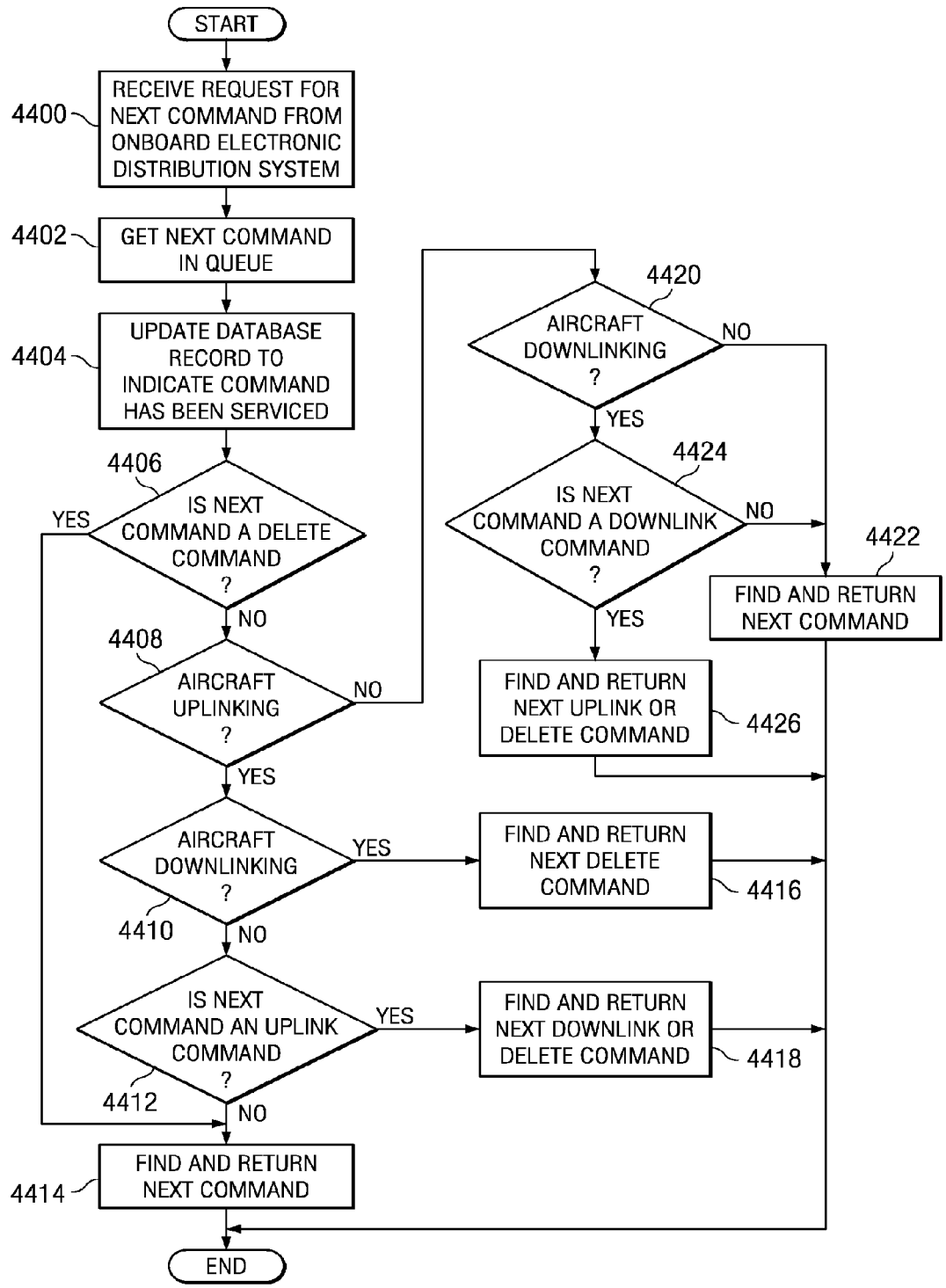
FIG. 44 is a flowchart of a process for sending information to an aircraft in accordance with an advantageous embodiment.

Turning now to FIG. 44, a flowchart of a process for sending information to an aircraft is depicted in accordance with an advantageous embodiment. In these examples, the process illustrated in FIG. 44 may be implemented in a software component, such as control process 3502 within proxy server application 3500 in FIG. 35. In these examples, the information takes the form of commands and aircraft software parts sent to an onboard electronic distribution system on the aircraft.

The process begins by receiving a request for a next command from the onboard electronic distribution system (operation 4400). Thereafter, the process obtains the next command requested by the onboard electronic distribution system (operation 4402). In these examples, the actual file for the command is located in the file system of the proxy server application. The record in the database contains the metadata about the command in the file system.

The process then updates the database record for the command to indicate that the command has been serviced (operation 4404). The process makes a determination as to whether the next command is a delete command (operation 4406). If the next command to be processed is not a delete command, the process then makes a determination as to whether the aircraft is currently uplinking information (operation 4408).

If the aircraft is currently uplinking information, the process determines whether the aircraft is also downlinking information (operation 4410). If the process is not downlinking information, a determination is made as to whether the next command is an uplink command (operation 4412). If the next command is not an uplink command, the process finds the next command and returns that command to the onboard electronic distribution system (operation 4414), with the process terminating thereafter.

With reference again to step 4406, if the next command to be processed is a delete command, the process proceeds to step 4414 as described above. With reference again to operation 4412, if the next command is an uplink command, the process finds and returns the next downlink command or delete command for the aircraft (operation 4418), with the process terminating thereafter. With reference again to operation 4410, if the aircraft is downlinking, the process finds and returns the next delete command in the queue for the aircraft (operation 4416), with the process terminating thereafter.

With reference back to operation 4408, if the aircraft is not uplinking, a determination is made as to whether the aircraft is downlinking (operation 4420). If the aircraft is not downlinking in operation 4420, the process finds and returns the next command for the aircraft (operation 4422), with the process terminating thereafter. If the aircraft is downlinking in operation 4420, a determination is made as to whether the next command for the aircraft is a downlink command (operation 4424).

If the next command is not a downlink command, the process proceeds to operation 4422 as described above. Otherwise, the process finds and returns the next uplink command or delete command (operation 4426), with the process terminating thereafter.

In these examples, the different decisions in determining which command to send to the aircraft is performed to avoid sending too many uplink and/or downlink commands to the same aircraft at the same time. This type of processing is employed to improve or optimize the use of bandwidth while the aircraft is communicating with the proxy server application. An event log message is written to a log file during this process that reports when the aircraft software part was uplinked to an aircraft. In other advantageous embodiments, other types of decisions may be used to implement other policies that may be desired. For example, certain types of commands may be given preference over other types of commands. Selected types of aircraft may be given priority over others.

Figure 45:
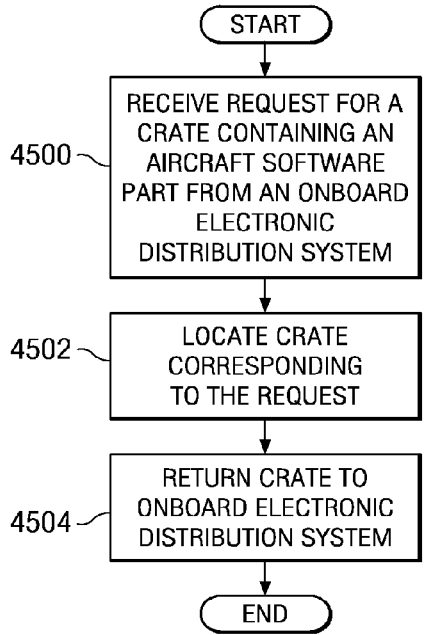
FIG. 45 is a flowchart of a process for receiving aircraft software parts in accordance with an advantageous embodiment.

With reference next to FIG. 45, a flowchart of a process for receiving aircraft software parts is depicted in accordance with an advantageous embodiment. The process illustrated in FIG. 45 may be implemented in a software component, such as control process 3502 in FIG. 35. The process illustrated in this example is used to obtain aircraft software parts from a proxy server application.

The process begins by receiving a request for a crate containing an aircraft software part from an onboard electronic distribution system (operation 4500). The process locates the crate corresponding to the request (operation 4502). The process then returns the crate to the onboard electronic distribution system (operation 4504), with the process terminating thereafter.

Figure 46:
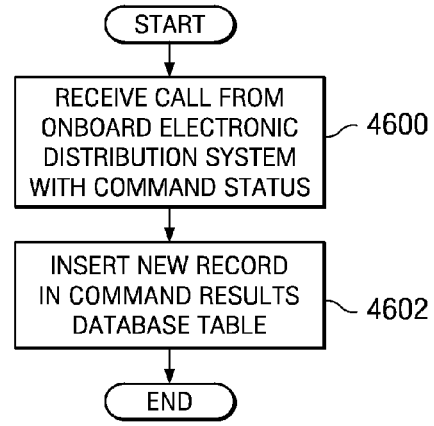
FIG. 46 is a flowchart of a process for receiving command status information from an aircraft in accordance with an advantageous embodiment.

Turning now to FIG. 46, a flowchart of a process for receiving command status information from an aircraft is depicted in accordance with an advantageous embodiment. The process illustrated in FIG. 46 may be implemented in a software component, such as control process 3502 in FIG. 35. This process is used to receive status information from an onboard electronic distribution system on an aircraft.

The process in FIG. 46 is employed to obtain status information regarding the processing of commands on an aircraft. The status information may indicate whether the sending of the command was successful with respect to the particular line replaceable unit. Further, with uplink commands, the status also will indicate whether the aircraft software part is stored on the aircraft and ready for installation. In these examples, the installation of the aircraft software part on the line replaceable unit is one initiated by a mechanic or technician. In other embodiments, this type of installation may be automatic.

The process begins by receiving a call from the onboard electronic distribution system with a command status (operation 4600). The process inserts a new record in the command results database table with the information from the command status (operation 4602), with the process terminating thereafter.

With this information, the proxy server application may send the status information back to the library as to whether the command was successful. This information allows an identification of when aircraft software parts are present on an aircraft and ready for installation on a line replaceable unit. In these examples, three event log messages are created. A message indicates whether the specific command was successful. Messages also are sent back indicating which deleted files within a command were successfully deleted. Additionally, the identification of commands that failed also is logged in the status messages.

Figure 47:
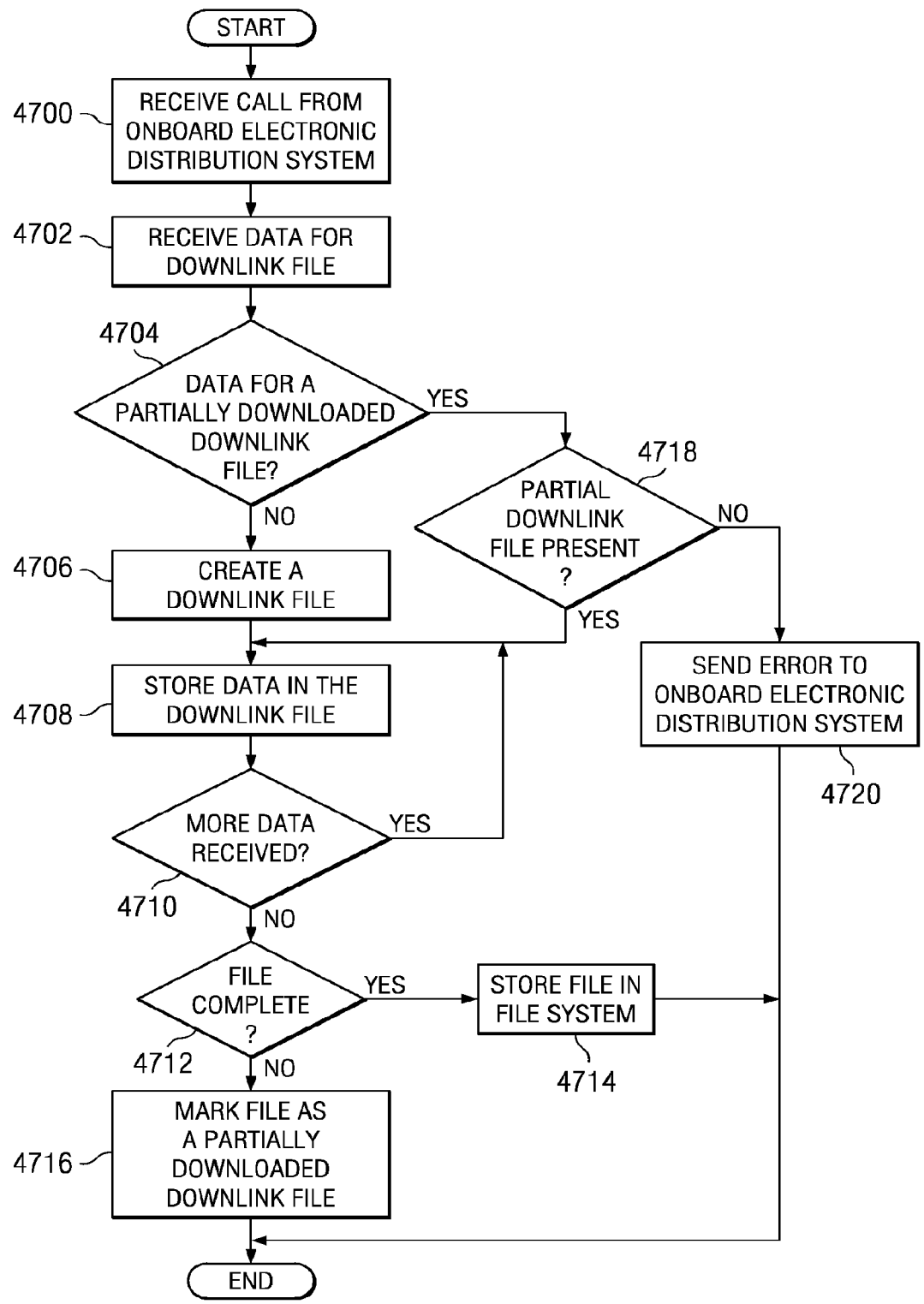
FIG. 47 is a flowchart of a process for receiving downlink files in accordance with an advantageous embodiment.

Turning now to FIG. 47, a flowchart of a process for receiving downlink files is depicted in accordance with an advantageous embodiment. The process illustrated in FIG. 47 may be implemented in a software component, such as control process 3502 in FIG. 35. This flowchart illustrates the processes that occur when a downlink file is sent to a proxy server application from an onboard electronic distribution system.

The process begins by receiving a call from the onboard electronic distribution system to download downlink data (operation 4700). In these examples, the on ground component identifies a partial downlink when a file writing operation was previously interrupted and the entire contents of the file were not written into the file. If the file writing operation completed successfully, the downlink is a completed downlink. If the call is to send additional data for the downlink, then the information received is added onto the file previously stored for the downlink on the file system with the proxy server application.

The process then receives data for the downlink file (operation 4702). Next, the process determines whether the data is for a partially downloaded downlink file (operation 4704). If the data is for a new downlink file, the process creates a downlink file (operation 4706). Thereafter, the data is stored in the downlink file (operation 4708). A determination is then made as to whether additional data is received for the downlink file (operation 4710). If additional data is received, the process returns to operation 4708. Otherwise, the process determines whether the file is complete (operation 4712). If the file is complete, the file is stored in the file system on the proxy server (operation 4714), with the process terminating thereafter.

With reference again to operation 4712, if the file is not complete, the process marks the file as a partially downloaded downlink file (operation 4716), with the process terminating thereafter. With reference again to operation 4704, if the data to be downloaded is for a partially downloaded downlink file, the process determines whether a partial downlink file is present for the data (operation 4718).

If the downlink file is present, the process proceeds to operation 4708 as described above. Otherwise, the process sends an error to the onboard electronic distribution system (operation 4720), with the process terminating thereafter. This area indicates that a partial downlink file for the data to be sent by the onboard electronic distribution system is not present on the proxy server. In this situation, the onboard electronic distribution system may resend the entire file in another data transfer.

In these examples, the onboard electronic distribution system may send downlink files to the proxy server application at the same time that the onboard electronic distribution system is receiving commands from the proxy server application. This process takes into account that interruptions may occur during the downlinking of data to the proxy server application. If the sending of downlink data is interrupted, the successful written part is saved for later when the rest of the data can be written. In this manner, rewriting of earlier data is not necessary. In these examples, an event log message may be recorded that indicates that the downlink data was received from the proxy server application from a specific aircraft.

Figure 48:
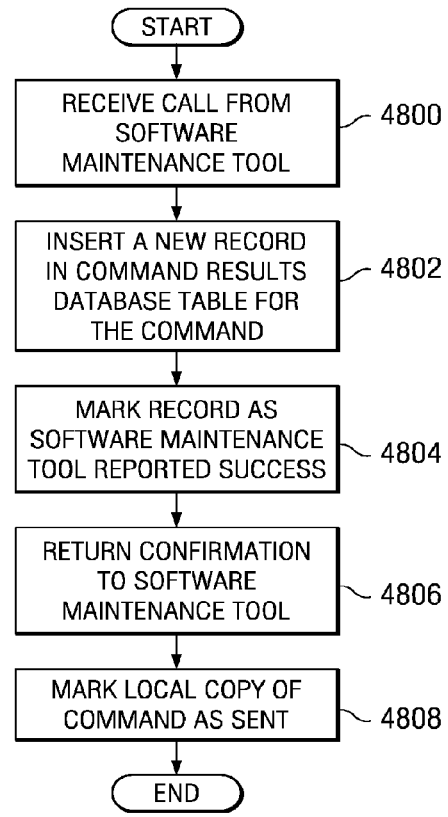
FIG. 48 is a flowchart of a process for receiving status information from a software maintenance tool in accordance with an advantageous embodiment.

With reference now to FIG. 48, a flowchart of a process for receiving status information from a software maintenance tool is depicted in accordance with an advantageous embodiment. The process illustrated in FIG. 48 may be implemented in control process 3502 in FIG. 35. This process illustrates the different operations that occur in receiving status messages from a software maintenance tool.

The process begins by receiving a call from a software maintenance tool with command status information for a command (operation 4800). Thereafter, the process inserts a new record in the command results database table for the command identified in the call (operation 4802). The process marks the record as software maintenance tool reported success (operation 4804).

The process returns a confirmation to the software maintenance tool (operation 4806). These different messages may be collected with other messages to transfer back to the library. The process then marks the local copy of the command as sent to the aircraft (operation 4808), with the process terminating thereafter. This process prevents the proxy server application from resending the command back to the software maintenance tool.

Figure 49:
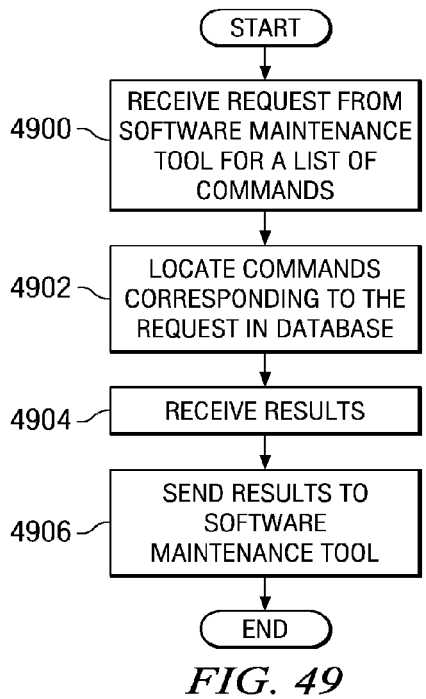
FIG. 49 is a flowchart of a process for sending information to a software maintenance tool in accordance with an advantageous embodiment.

Turning now to FIG. 49, a flowchart of a process for sending information to a software maintenance tool is depicted in accordance with an advantageous embodiment. The process illustrated in FIG. 49 may be implemented in control process 3502 in FIG. 35. The process sends information in the form of uplink commands and aircraft software parts to the software maintenance tool.

The process begins by receiving requests from the software maintenance tool for a list of commands (operation 4900). This operation may be for various types of commands. For example, the request may be for any commands that have been designated for the particular software maintenance tool. The request may obtain commands for a particular aircraft, a particular line replaceable unit on the aircraft, or some identifier.

In response to receiving this request, the process locates commands corresponding to the request in the database (operation 4902). The process then receives a result from the database (operation 4904). The process sends the results back to the software maintenance tool (operation 4906), with the process terminating thereafter. The software maintenance tool may request the crates containing the aircraft software parts using a process similar to the one illustrated in FIG. 45 for sending aircraft software parts to an onboard electronic distribution system.

Figure 50:
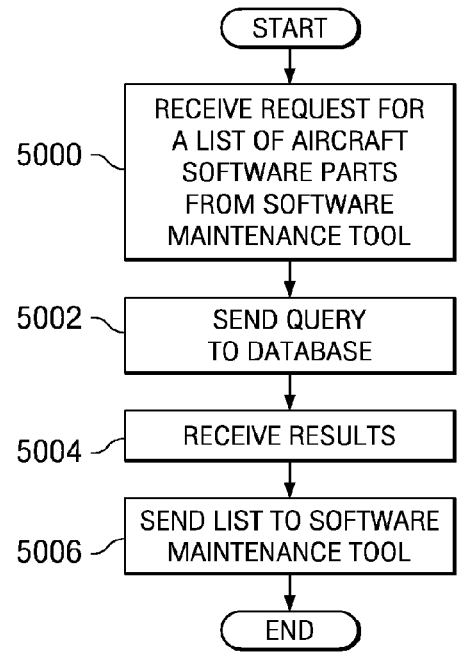
FIG. 50 is a flowchart of a process for sending lists of aircraft software parts to a software maintenance tool in accordance with an advantageous embodiment.

Turning now to FIG. 50, a flowchart of a process for sending lists of aircraft software parts to a software maintenance tool is depicted in accordance with an advantageous embodiment. This process may be implemented in a software component, such as control process 3502 in FIG. 35. This process may be used to identify what aircraft software parts are available on the proxy server application.

The process begins by receiving a request for a list of aircraft software parts from the software maintenance tool (operation 5000). The process then sends a query to the database to identify the aircraft software parts stored in the file system (operation 5002). Results are received from the database (operation 5004). The list of aircraft software parts are sent to the software maintenance tool (operation 5006), with the process terminating thereafter.

In these examples, the lists returned in operation 5006 may contain unique aircraft software part names that are in the inventory of the proxy server application even if the aircraft software part is on the proxy server application only to support a command that was dispatched specifically to that proxy server application and not for other devices.

Figure 51:
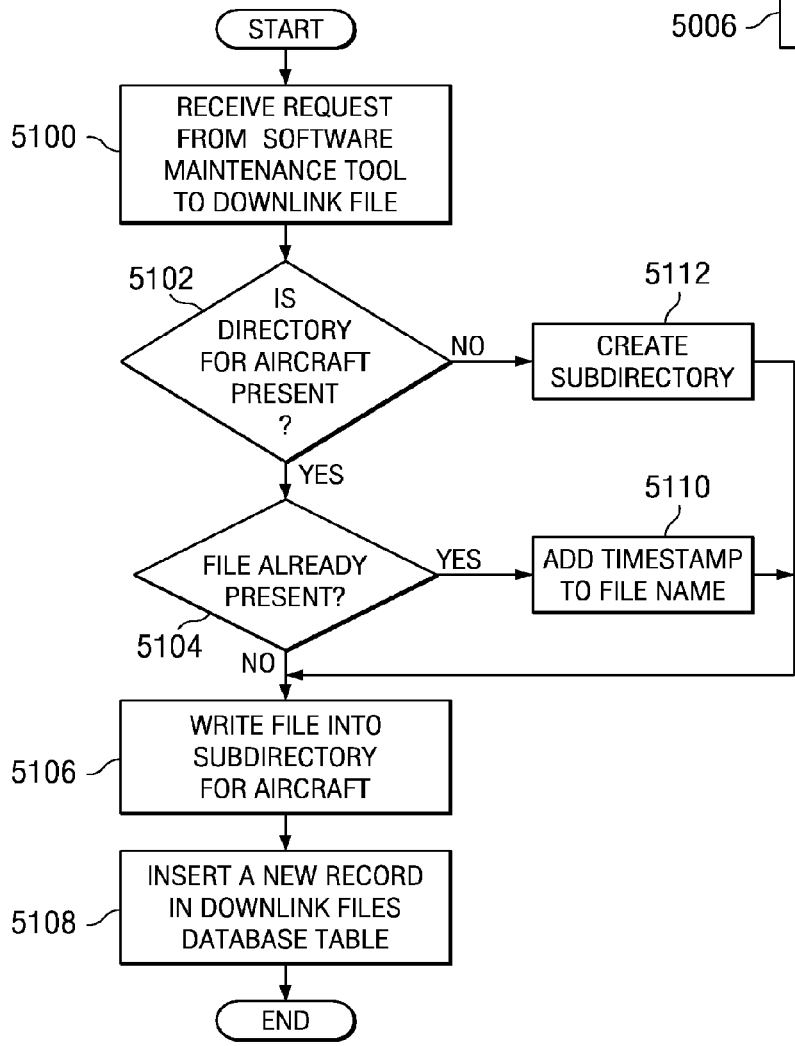
FIG. 51 is a flowchart of a process for receiving downlink files from a software maintenance tool in accordance with an advantageous embodiment.

With reference now to FIG. 51, a flowchart of a process for receiving downlink files from a software maintenance tool is depicted in accordance with an advantageous embodiment. The process illustrated in this example may be implemented in a proxy server application component, such as control process 3502 in FIG. 35.

The process begins by receiving a request from a software maintenance tool to downlink a file (operation 5100). In operation 5100, this request may be made as a hypertext transport protocol request. A determination is made as to whether a directory is present for the aircraft (operation 5102). If a directory is present, a determination is made as to whether the file is already present in the directory (operation 5104).

If the file is not present in the directory, the file is written into the subdirectory for the aircraft (operation 5106). Thereafter, the process inserts a new record in a downlink files database table for the downloaded file (operation 5108), with the process terminating thereafter.

With reference again to operation 5104, if the file is already present in the subdirectory, a timestamp is added to the file name (operation 5110), with the process then proceeding to operation 5106 as described above.

In operation 5110, a timestamp is added to the file name to allow an additional copy of the same file to be written without overriding or losing the original file. As a result, the original file name is present along with an additional file having a file name that is similar except for the addition of the timestamp. The contents of the files may be identical in some cases. With reference again to operation 5102, if the directory for the aircraft is not present, the process creates a subdirectory for the aircraft (operation 5112). The process then proceeds to operation 5106 as described above.

Figure 52:
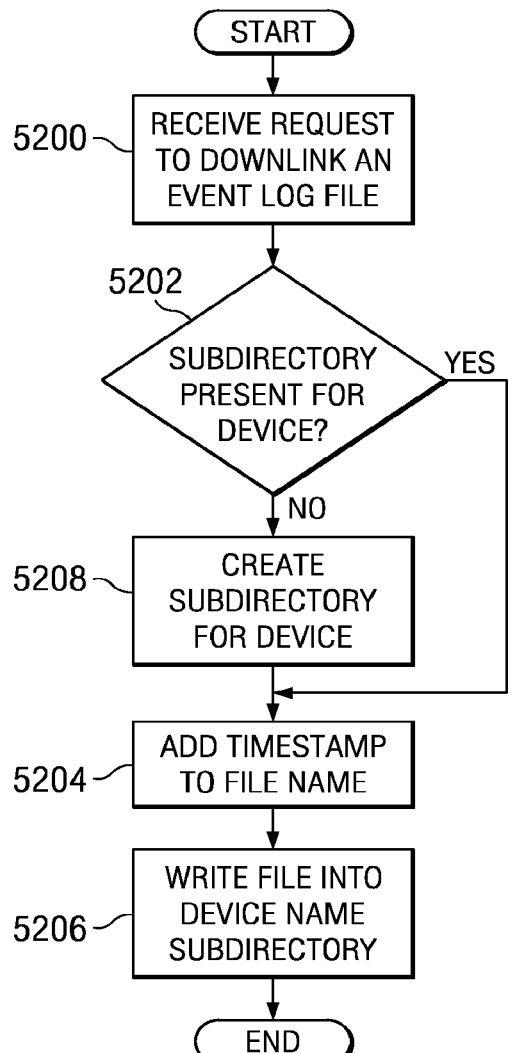
FIG. 52 is a flowchart of a process for receiving event log files from a software maintenance tool in accordance with an advantageous embodiment.

In FIG. 52, a flowchart of a process for receiving event log files from a software maintenance tool is depicted in accordance with an advantageous embodiment. The process illustrated in FIG. 52 may be implemented in control process 3502 within proxy server application 3500 in FIG. 35.

The process begins by receiving a request from a software maintenance tool to downlink an event log file to the proxy server application (operation 5200). The process then determines whether a subdirectory is present for the device (operation 5202). In this example, the device is a software maintenance tool. If a subdirectory is present for the device, a timestamp is added to the file name of the file received from the software maintenance tool (operation 5204). The process then writes the file into the device name subdirectory (operation 5206), with the process terminating thereafter.

With reference again to operation 5202, if a subdirectory is not present for the device, the process creates a subdirectory for that device (operation 5208). The process then proceeds to operation 5204 as described above.

Within aircraft software part management apparatus 300 in FIG. 3, the different advantageous embodiments provide a computer implemented method, apparatus, and computer program product for managing aircraft software parts. The different advantageous embodiments provide a software maintenance tool located on a portable data processing system that may be used to establish connection to a source through a ground network. A set of uplink commands may be retrieved from the source through this connection. A set of aircraft software parts corresponding to the uplink commands are retrieved from the source through the established connection to form a set of retrieved aircraft software parts. The set of aircraft software parts is stored in the portable data processing system.

This portable data processing system may then be disconnected from the ground network and connected to an aircraft network in an aircraft. An uplink command is issued from the set of uplink commands to the aircraft network through an on ground component located in the portable data processing system. The stored aircraft software part corresponding to the uplink command may then be sent to the aircraft network through the on ground component.

This software maintenance tool may be utilized in situations in which an aircraft network is unable to establish a connection with a ground network. For example, at some airports, the aircraft network may be incompatible with the particular ground network that is present. In other examples, a failure or error in the ground network may prevent the aircraft network from communicating with the ground network to receive commands and aircraft software parts.

Further, the software maintenance tool on the portable data processing system also may be employed to receive data from the aircraft. This data may be, for example, a downlink file.

Figure 53:
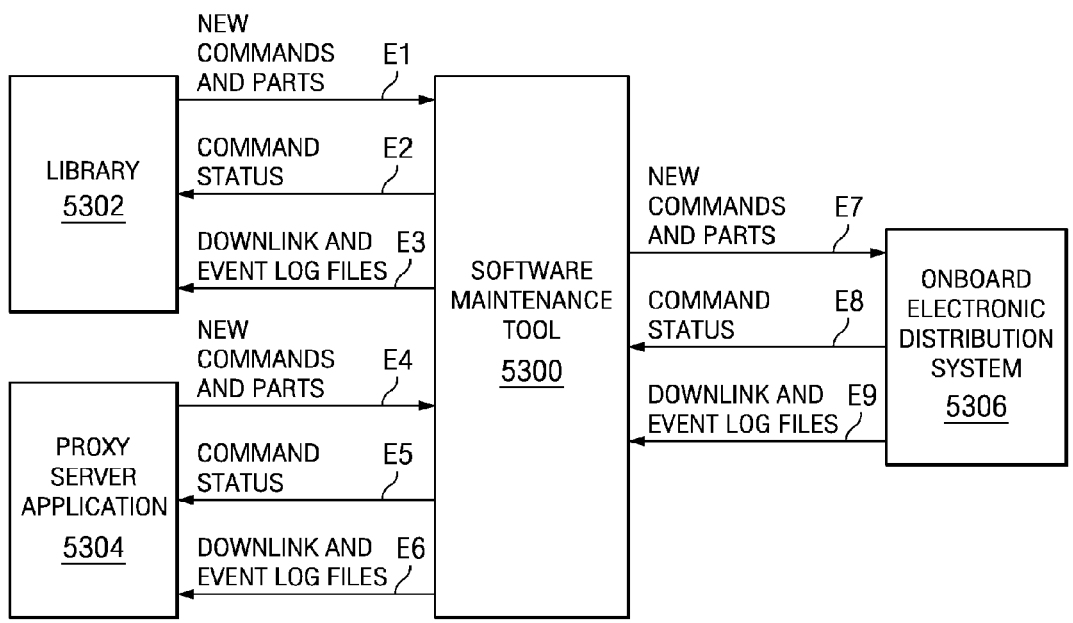
FIG. 53 is a diagram illustrating data flow and a software maintenance tool in accordance with an advantageous embodiment.

With reference next to FIG. 53, a diagram illustrating data flow and a software maintenance tool is depicted in accordance with an advantageous embodiment. Software maintenance tool 5300 interacts with components, such as library 5302, proxy server application 5304, and onboard electronic distribution system 5306. These components also are referred to as sources. In these examples, software maintenance tool 5300 provides for the transfer of information between library 5302 and/or proxy server application 5304 and onboard electronic distribution system 5306.

Library 5302 may be, for example, library 304 in FIG. 3, while proxy server application 5304 may be proxy server application 306 in FIG. 3. Onboard electronic distribution system 5306 may be, for example, onboard electronic distribution system 310 in FIG. 3.

Library 5302 sends new commands and parts to software maintenance tool 5300 (message E1). The results of processing these commands in parts may be returned to library 5302 by software maintenance tool 5300 (message E2). Additionally, software maintenance tool 5300 also may return downlink and event log files (message E3).

Depending on the particular implementation or use, software maintenance tool 5300 may receive new commands and parts indirectly from library 5302 through proxy server application 5304 (message E4). In a similar fashion, software maintenance tool 5300 may return command status (message E5) and downlink and event log files (message E6) to proxy server application 5304, which in turn sends this information to library 5302.

With respect to transferring information with onboard electronic distribution system 5306, software maintenance tool 5300 may send new commands and aircraft software parts to onboard electronic distribution system 5306 (message E7). Software maintenance tool 5300 may receive a command status from onboard electronic distribution system 5306 (message E8). The command status also may include the status of software directory parts sent to onboard electronic distribution system 5306. Onboard electronic distribution system 5306 may send downlink and event log files to software maintenance tool 5300 for transfer to library 5302 (message E9).

Examples of these types of transfers are described in more detail below. Further, these steps and interactions may occur in a particular order, and any of the different messages and interactions may occur simultaneously at any time. For example, software maintenance tool 5300 may send new commands and aircraft software parts to onboard electronic distribution system 5306 at the same time software maintenance tool 5300 receives downlink files from onboard electronic distribution system 5306. In these examples, software maintenance tool 5300 executes on a portable data processing system, such as a laptop computer. Data processing system 200 in FIG. 2 is an example of the data processing system that may be used to implement a laptop computer.

Software maintenance tool 5300 may be transported from one location to another location to distribute aircraft software parts and to download information, such as download data or files from line replaceable units on an aircraft. In the different advantageous embodiments, software maintenance tool 5300 establishes a direct connection with onboard electronic distribution system 5306. In these examples, a direct connection may be a wire connection or a wireless connection. This type of connection is made without a network connecting the data processing system or systems on the aircraft to the data processing system on which software maintenance tool 5300 is located.

Figure 54:
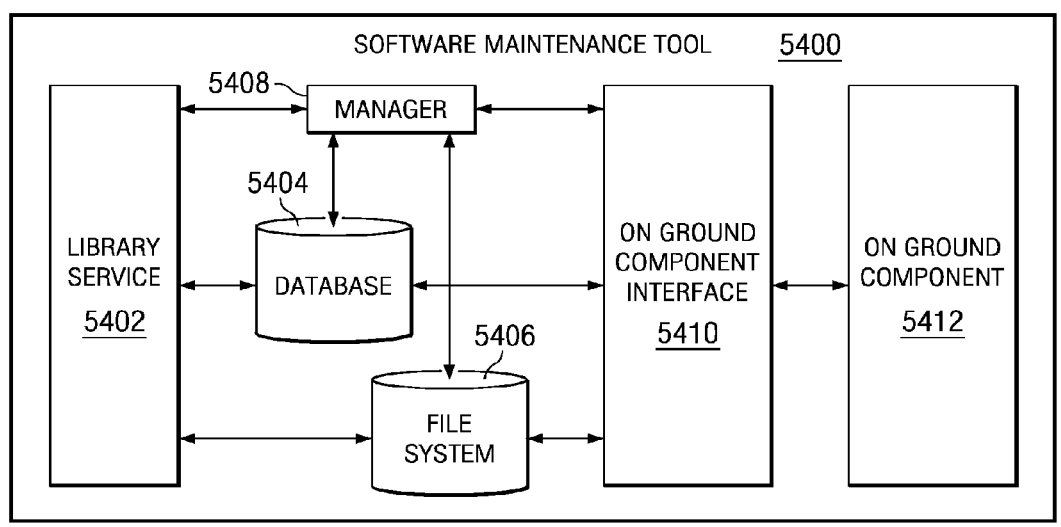
FIG. 54 is a block diagram of a software maintenance tool in accordance with an advantageous embodiment.

Turning now to FIG. 54, a block diagram of a software maintenance tool is depicted in accordance with an advantageous embodiment. In this example, software maintenance tool 5400 includes library service 5402, database 5404, file system 5406, manager 5408, on ground component interface 5410, and on ground component 5412.

Library service 5402 provides an interface to communicate with other components within an aircraft software part management apparatus. Library service 5402 provides software maintenance tool 5400 an interface to communicate with components such as, for example, a library and a proxy server application. Database 5404 contains information, such as metadata about commands in aircraft software parts or parts in file system 5406.

Additionally, database 5404 also may contain information about downlink information. This information is stored in the form of tables and records within database 5404. Further, database 5404 may store commands received from a proxy server application for execution by an onboard electronic distribution system on an aircraft data processing system in the aircraft.

File system 5406 stores files, such as commands, aircraft software parts, and downlink files. The different files may be stored within crates in file system 5406, depending upon the particular implementation. Manager 5408 includes processes for managing the operation of software maintenance tool 5400. In these examples, manager 5408 may incorporate processes for presenting user interface views to a user. These views may provide a user an interface to initiate operations and to view information.

On ground component interface 5410 provides an interface to on ground component 5412. On ground component interface 5410 may be implemented using application programming interface calls in these examples. On ground component 5412 communicates with the aircraft. In these examples, on ground component 5412 may communicate with an onboard electronic distribution system located on the aircraft data processing system in the aircraft. By having an interface to on ground component 5412, on ground component 5412 may be changed or modified for particular aircraft or types of aircraft without affecting the other components within software maintenance tool 5400.

Figure 55:
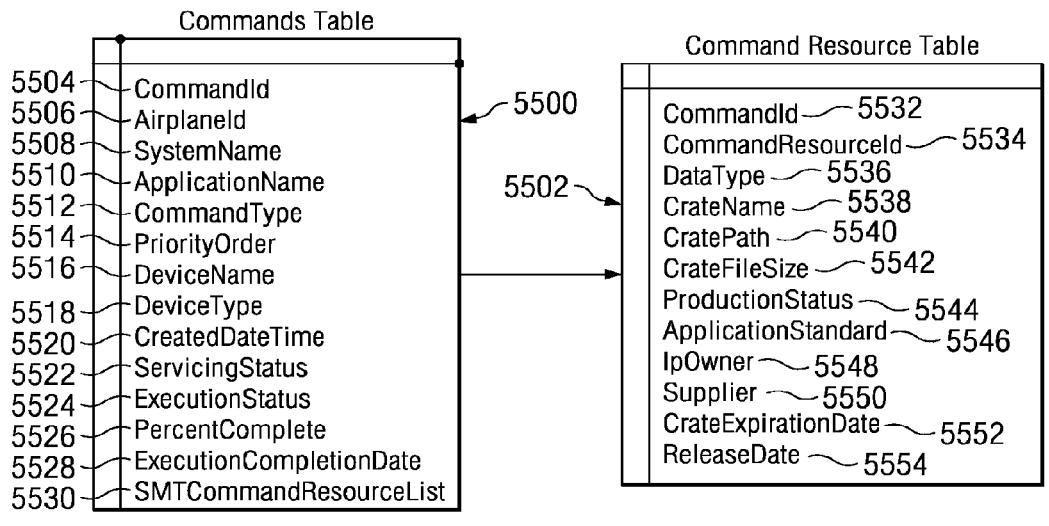
FIG. 55 is a diagram of commands and command resource tables in accordance with an advantageous embodiment.

Turning now to FIG. 55, a diagram of commands and command resource tables is depicted in accordance with an advantageous embodiment. In this example, commands table 5500 represents commands, while command resource table 5502 represents command resources. These tables are examples of tables that may be found in database 5404 in software maintenance tool 5400 in FIG. 54.

Commands table 5500 includes command identifier 5504, airplane identifier 5506, system name 5508, application name 5510, command type 5512, priority order 5514, device name 5516, device type 5518, date 5520, servicing status 5522, execution status 5524, percent complete 5526, execution completion date 5528, and command resource list 5530. Command resource table 5502 includes command identifier 5532, command resource identifier 5534, data type 5536, crate name 5538, crate path 5540, crate file size 5542, production status 5544, application standard 5546, owner 5548, supplier 5550, crate expiration date 5552, and release date 5554.

The different fields illustrated for commands table 5500 and command resource table 5502 represent fields that may be found in tables within a software maintenance tool database. In commands table 5500, command identifier 5504 uniquely identifies the particular record. Command identifier 5504 may be found in various tables to point to a specific command record. Airplane identifier 5506 identifies a specific aircraft. In these examples, the identifier may identify an aircraft uniquely within a fleet of aircraft for a particular airline. System name 5508 identifies the name of the line replaceable unit on which the aircraft software part is located. System name 5508 includes routing information to identify the line replaceable unit. Data type 5510 identifies the application generating the command. Command type 5512 identifies the type of command. Priority order 5513 indicates whether and what a priority may be for a command file. Device name 5516 identifies a particular device. Device type 5518 identifies the type of device. Date 5520 identifies the date and time that a command was created in the library. Servicing status 5522 identifies commands that have been successfully sent to the onboard electronic distribution system and identifies commands that have been reported to the library as having been successfully uplinked or executed on the onboard electronic distribution system.

Execution status 5524 provides a notification of whether the command has been executed on the aircraft. In particular, this command provides information as to whether the onboard electronic distribution system on the aircraft has executed the command. Percent complete 5526 indicates the progress of the uplinking of an aircraft software part in a crate by the onboard electronic distribution system in these examples. Execution completion date 5528 identifies when the command execution is complete. Command resource list 5530 identifies a data structure containing information about the crate, such as command resource table 5502 in FIG. 55.

In command resource table 5502, command identifier 5532 is similar to command identifier 5504 in commands table 5500 and provides an identification of a specific command record. Command resource identifier 5534 is used to identify specific command resource records in the database. Data type 5536 identifies the type of data for the resource. For example, the resource may be an aircraft software part or a file. In these examples, each command allows different types of information to be associated with the particular command.

Crate name 5538 identifies the name of the crate in which the aircraft software part is located. Crate path 5540 identifies the location of the crate containing the aircraft software part. Crate file size 5542 identifies the size of the crate. Production status 5544 indicates the production status of the particular aircraft software part contained within the crate. These values may be, for example, red label, blue label, or black label.

Application standard 5546 identifies the applicable standard for the aircraft software part in these examples. Owner 5548 identifies the owner of any intellectual property of the aircraft software part contained within the crate. Release date 5554 identifies the release date of the aircraft software part.

Figure 56:
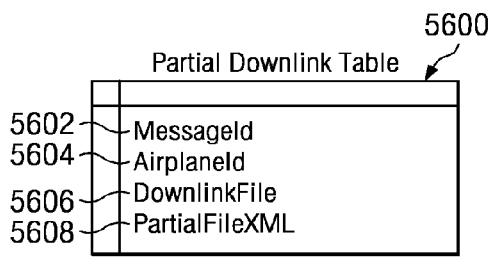
FIG. 56 is a diagram of partial downlink data in accordance with an advantageous embodiment.

With reference now to FIG. 56, a diagram of partial downlink data is depicted in accordance with an advantageous embodiment. In this example, partial downlink table 5600 is an example of a table that may be found in a database within a software maintenance tool, such as database 5404 in FIG. 54. As depicted, partial downlink table 5600 contains message identifier 5602, airplane identifier 5604, downlink file 5606, and partial file XML 5608.

Message identifier 5602 is a command identifier for partial downlinks related to a downlink command sent to an onboard electronic distribution system. This identifier is generated by the onboard electronic distribution system on an aircraft for downlink files and is not the result of the downlink command sent to the onboard electronic distribution system by the library through a proxy server application or the software maintenance tool. Airplane identifier 5604 identifies the particular aircraft within a set of aircraft.

Downlink file 5606 specifies the full directory path to the partially downlinked file. When an onboard electronic distribution system requests a downlink file for which an attempt has already been made to downlink the file at a prior time, the software management tool returns the path to the partially downlinked file.

Partial file XML 5608 contains information about the partially downlinked file. This information may be used by the onboard electronic distribution system to resume downlinking of the downlinked file from where the downlinking was previously interrupted. In this manner, the downlinking of the file may begin from where it was interrupted to avoid having to resend the entire file.

Figure 57:
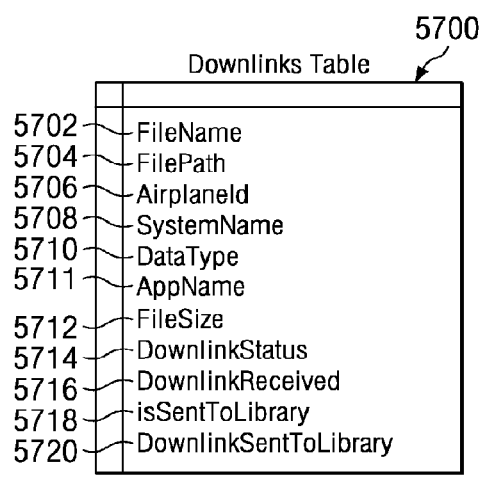
FIG. 57 is a diagram of a downlinks table in accordance with an advantageous embodiment.

Turning next to FIG. 57, a diagram of a downlinks table is depicted in accordance with an advantageous embodiment. Downlinks table 5700 is an example of a table in a database in a software maintenance tool, such as database 5404 in FIG. 54. Downlinks table 5700 stores information about each downlinked file sent by an onboard electronic distribution system in these examples. Downlinks table 5700 includes file name 5702, file path 5704, airplane identifier 5706, system name 5708, data type 5710, AppName 5711, file size 5712, downlink status 5714, downlink received 5716, is sent to library 5718, and downlink sent to library 5720.

File name 5702 identifies the name of the file containing the downlink information. File path 5704, in these examples, identifies the location of the file containing the downlink information. Airplane identifier 5706 identifies the aircraft from which the downlink file was received. This identifier is a unique identifier for a set of aircraft, such as aircraft for a particular airline. This identifier may be a tail part number. System name 5708 identifies the name of the line replaceable unit on which the aircraft software part is located. Data type 5710 identifies the type of data. In the case of downlink information, the data is identified as a file. AppName 5711 identifies an application on the aircraft data processing system that is responsible for obtaining the aircraft software part.

File size 5712 identifies the size of the file containing the downlink data. Downlink status 5714 indicates the status of the downlink operation. In these examples, downlink status 5714 shows successful downlinks. In some embodiments, partial downlinks may be identified by downlink status 5714. Library 5718 indicates the time when the file was downlinked to the software and maintenance tool. Downlink sent to library 5720 indicates the time when the downlinked file is sent to the library or proxy server application. This information is used to determine when to delete the downlinked file from the software maintenance tool. Downlinked files may be deleted after a configurable amount of time past the time the downlinked file was sent to ensure that the downlinked file was backed up on the library or proxy server application to which the downlinked file was sent.

Turning now to FIG. 58, a diagram of a software maintenance tool file system directory structure is depicted in accordance with an advantageous embodiment. In this example, directory structure 5800 represents a file system directory structure that may be used in a file system, such as in file system 5406 in FIG. 54. Directory structure 5800 identifies different types of files to work within the file system on a software maintenance tool. In these examples, directory structure 5800 includes parts 5802, downlinks 5804, downlinks unpacked dir 5806, route 5808, application 5810, logs 5812, and conf 5814.

Parts 5802 identifies a directory that stores crates received from a library, directly from the library or through a proxy server application. In these examples, the crates may include commands and/or aircraft software parts. Further, the crates also may be loaded from media, such as a flash memory or hard drive attached to the laptop in which the software maintenance tool is located. The crates in this directory may be sent to the onboard electronic distribution system on an aircraft.

Downlinks 5804 are a directory used to store downlink files and partial downlink files received from an onboard electronic distribution system. In these examples, the downlink files may be organized by the tail number of the aircraft from which the files originated. Downlinks 5804 may include subdirectories named by the aircraft tail numbers in these examples. The downlink files are stored in crated form in these examples. Downlink files that have already been sent to the library are not automatically deleted from downlinks 5804. Instead, these files may be deleted after some selected amount of time from when they are sent to the library or proxy server application.

DownlinksUnpackDir 5806 identifies a directory used by the software maintenance tool to unpack the contents of crates. These crates are unpacked to extract information about a downlink file. The file, in uncrated form, may be stored in a directory within downlinks unpacked dir 5806 using the name of the file.

Route 5808 identifies the directory that contains a SMT-route info.xml file. This file contains a list of systems, applications, and commands sorted by each of the applications. The contents of these files are used by the software maintenance tool and indirectly by the library to ensure that uplink commands are sent to the appropriate aircraft systems.

App 5810 identifies the directory in which the different processes for the software maintenance tool are installed. Additionally, logs related to the software maintenance tool also may be stored in this directory. These logs include, for example, events that may be recorded during the operation of the software maintenance tool.

Logs 5812 is a subdirectory within app 5810 and contains the event logger.xml file last sent to the library and/or proxy server application in these examples. Conf 5814 is a subdirectory within app 5810 and contains property files to define the operation or behavior of the software maintenance tool as to define the behavior of various components within the software maintenance tool.

Turning now to FIG. 59, a diagram illustrating interface components implemented in a software maintenance tool is depicted in accordance with an advantageous embodiment. In this example, user interface components 5900 are examples of user interface components that may be implemented in manager 5408 within software maintenance tool 5400 in FIG. 54. User interface components 5900 include connection view 5902, uplink command queue view 5904, uplink local inventory view 5906, downlinked files view 5908, events console view 5910, and retrieve from library view 5912.

Connection view 5902 is a user interface component that provides an area to display functionality tabs. In these examples, the user interface provides device identification information as well as a dropdown box allowing a user to select between various components, such as an onboard electronic distribution system, a library, a proxy server application, or other devices. Further, this interface component also may provide a control to connect the software maintenance tool to the particular device selected from the dropdown box.

Uplink command queue view 5904 provides an interface to view the progress of uplinking commands and parts. This view also has a control to delete commands and aircraft software parts. Uplink local inventory view 5906 provides a user interface to allow an operator of the software maintenance tool to load or import aircraft software parts from a media. This view allows a user to create uplink commands without being connected to a ground network. The user may select aircraft software parts for uplinking to specific line replaceable units on specific aircraft. This media may be, for example, a portable media, such as a flash memory, a portable hard drive, a compact disc, or a digital versatile disc. Downlinked files view 5908 provides a user interface to view downlink files received from the onboard electronic distribution system. A user also may use this view to delete downlink files as well as issue downlink control commands.

Events console view 5910 allows a user to view different events that have occurred during the execution of various processes of the software maintenance tool. For example, events console view 5910 may present a different action that occurred in sending an aircraft software part to an onboard electronic distribution system. These events may include, for example, connection to the aircraft, sending of the file, and identification of a successful loading of the file.

Retrieve from library view 5912 is a user interface that may be used to initiate processes for obtaining commands and aircraft software parts from a library or proxy server application. Commands table 5500 in FIG. 55 identifies fields that may be found in commands table 5500. This view also sends back successfully uplinked commands, downlink files, and event logs.

Figure 60:
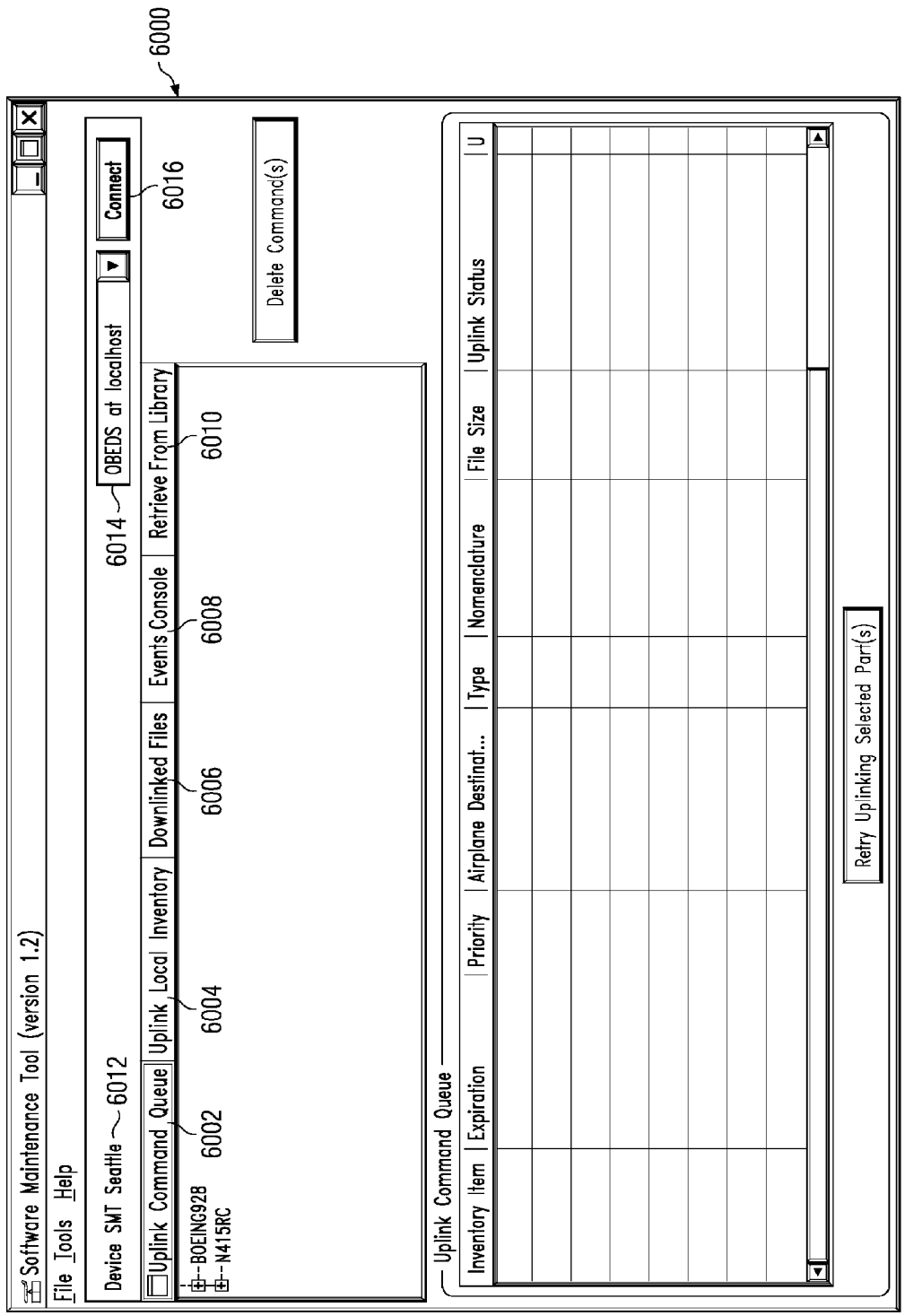
FIGS. 60-65 are example implementations of user interfaces for user interface components in accordance with an advantageous embodiment.

With reference next to FIGS. 60-65, example implementations of user interfaces for user interface components 5900 in FIG. 59 are depicted. With reference first to FIG. 60, window 6000 illustrates a main screen or interface that may be presented in user interface components 5900 in FIG. 59. In particular, window 6000 is an example of connection view 5902 in FIG. 59. Window 6000 includes tabs 6002, 6004, 6006, 6008 and 6010. These tabs may be selected to present controls and information for various functions and processes within a software maintenance tool.

Section 6012 displays information about the software maintenance tool. In this example, section 6012 indicates that the software maintenance tool is connected to an aircraft identified by the tail number. List 6014 provides a list of other components to which a software maintenance tool may establish connections. Control 6016 allows a user to initiate a connection to another component. In these examples, a user may select various components, such as an onboard electronic distribution system, a library, or a proxy server application from a set of proxy servers.

Figure 61:
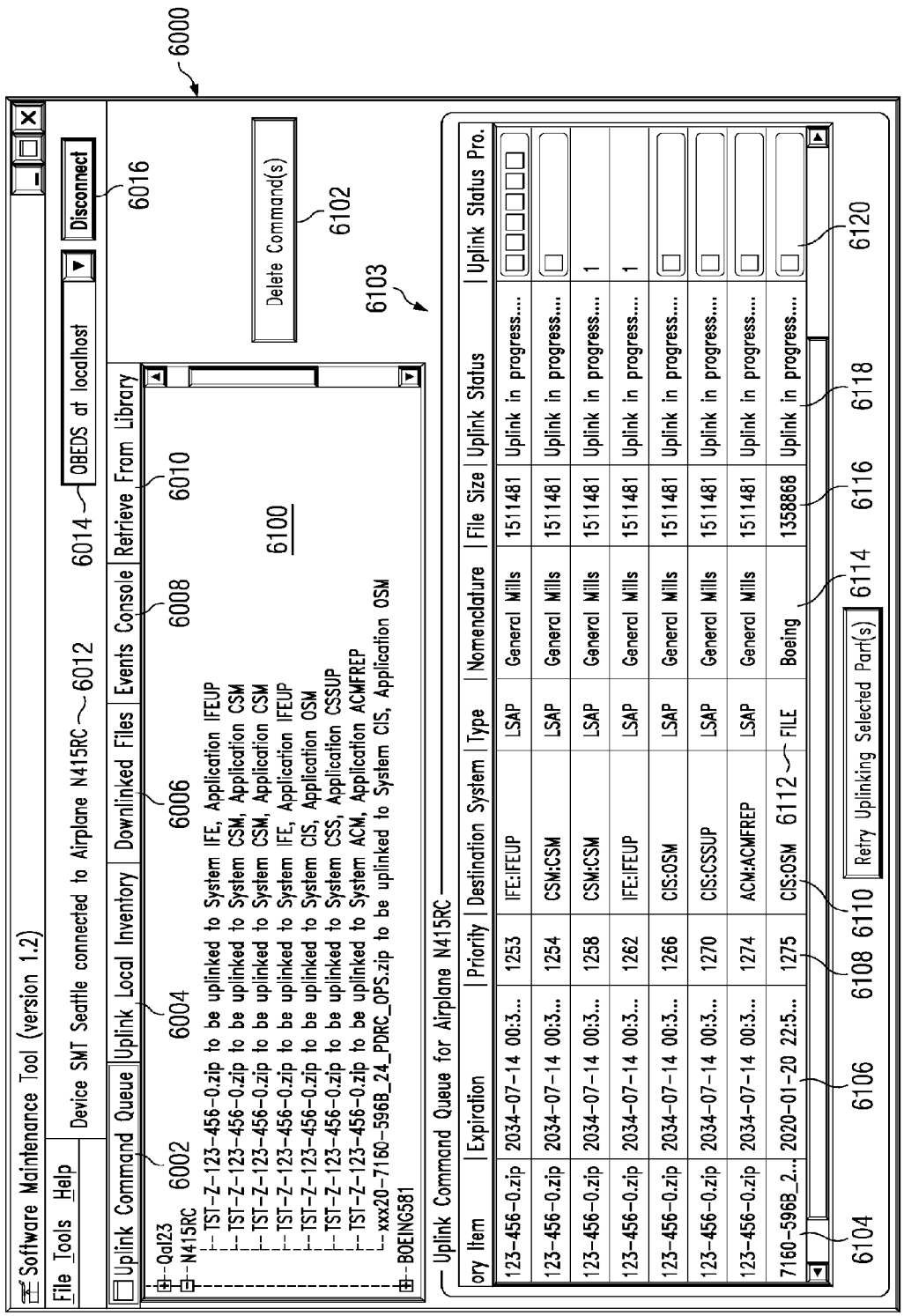

With reference now to FIG. 61, a selection of tab 6002 initiates an uplink command queue view in window 6000. In this example, this uplink command queue view is an example of the user interface presented by uplink command queue view 5904 in FIG. 59. In this example, section 6100 displays commands for a particular aircraft in a tree queue. A user may delete a set of commands from section 6100 by selecting those commands and pressing delete command 6102. The status information about commands is presented in section 6103.

Information that may be displayed includes, for example, item 6104, expiration 6106, priority 6108, destination system 6110, file type 6112, nomenclature 6114, file size 6116, uplink status 6118, and uplink status progress 6120. Item 6104 identifies the particular item, such as an aircraft software part name. Expiration 6106 is an expiration date for a particular command. Priority 6108 identifies the order in which commands are to be uplinked to the destination system on the aircraft. Destination system 6110 identifies the particular line replaceable unit in an application on the aircraft in which parts are to be sent. Type 6112 identifies the type of item contained in the crate, such as a file or an aircraft software part.

Nomenclature 6114 provides a short identification or description of the part. File size 6116 identifies the size of the crate containing the particular item. Uplink status 6118 provides a status as to the process, success, or failure of a command. Uplink status progress 6120 provides a graphical progress bar showing the percent complete for a particular command.

Figure 62:
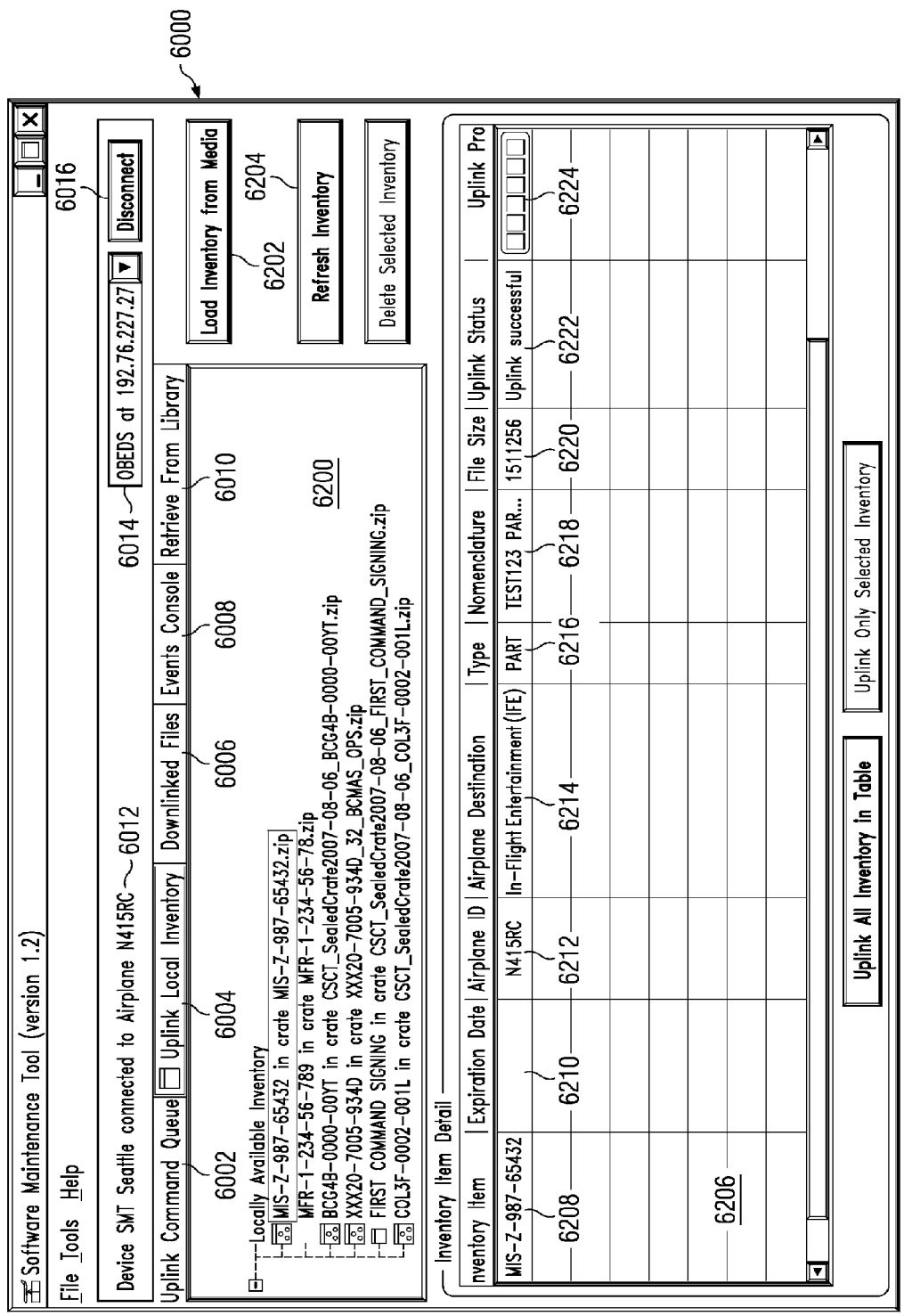

With reference now to FIG. 62, a diagram illustrating a user interface for an uplink local inventory view is depicted in accordance with an advantageous embodiment. In this example, tab 6004 has been selected, and a user interface for uplink local inventory view 5906 in FIG. 59 is presented. This particular view allows a user to load crates or aircraft software parts from a local source. This type of functionality allows a user to load an aircraft software part from another source in the event that access to a library or proxy server application may be unavailable or interrupted. Additionally, new parts that may not be found in the library or proxy server application or updated versions of aircraft software parts also may be loaded in this manner. A local inventory of aircraft software parts or other items may be found on storage devices, such as a hard drive, a flash memory, a compact disc, or a digital versatile disc.

Section 6200 illustrates an identification of local inventory that may be loaded onto the software maintenance tool. These items may include aircraft software parts and commands. A particular item may be loaded by selecting that item in section 6200 and pressing load inventory from media button 6202. The current inventory found on a particular storage device may be refreshed by pressing refresh inventory 6204.

Details about selected items in section 6200 may be displayed in section 6206. In these examples, the information may include, for example, inventory item 6208, expiration date 6210, airplane identifier 6212, airplane destination 6214, type 6216, nomenclature 6218, file size 6220, uplink status 6222, and uplink status progress 6224. This information is similar to the information displayed for aircraft software parts received from a library proxy server application as displayed in window 6000 in FIG. 61.

Figure 63:
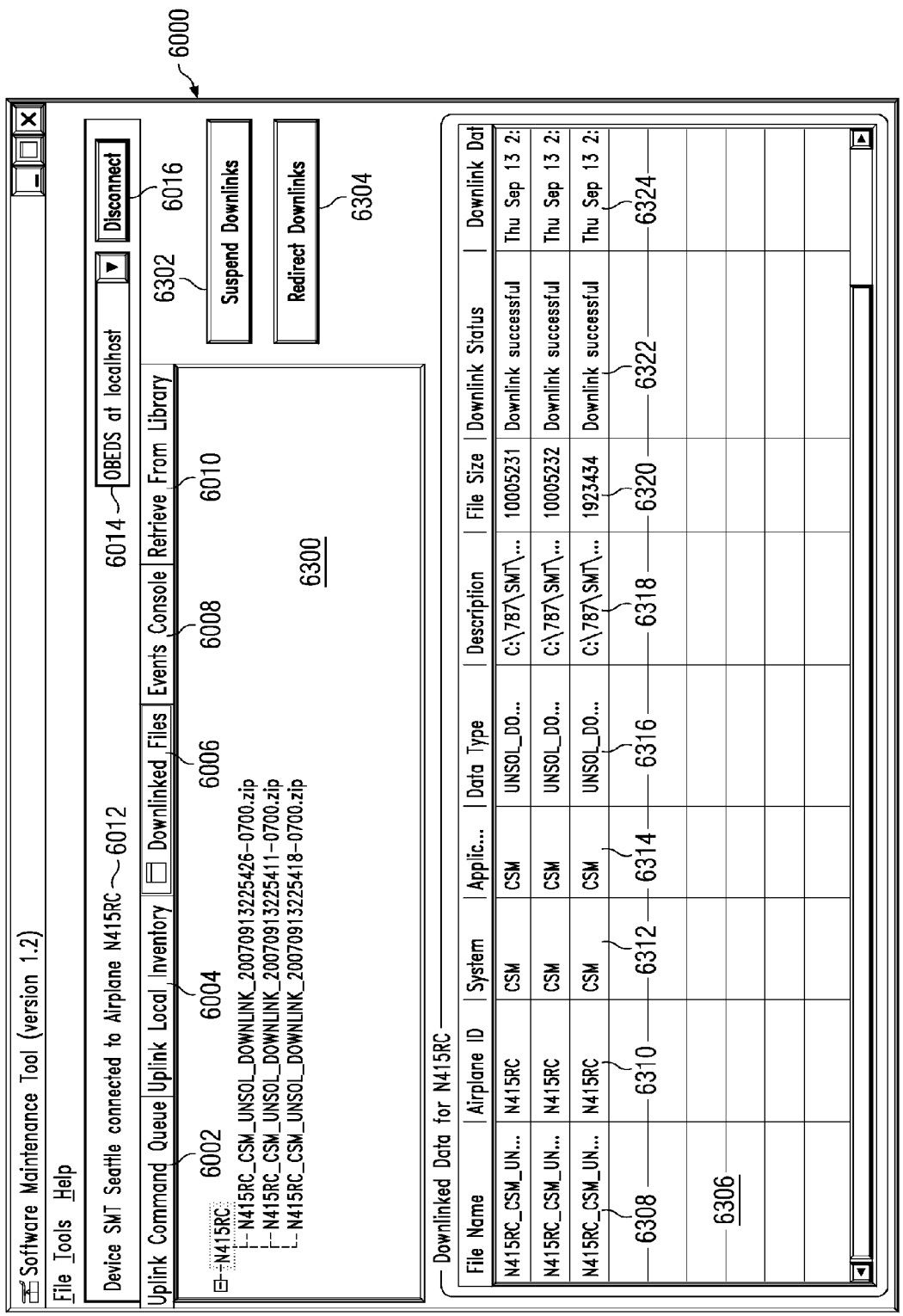

With reference now to FIG. 63, a diagram of a user interface for a downlinked files view is depicted in accordance with an advantageous embodiment. In this example, window 6000 displays a user interface for a user interface component, such as downlinked files view 5908 in FIG. 59. This view is presented in response to a selection of tab 6006. In this user interface, information about data downlinked from different aircraft is displayed in section 6300.

A user may suspend or stop downlinks from an onboard electronic distribution system on an aircraft by selecting suspend downlinks button 6302. When this button is selected, a software maintenance tool does not receive any additional downlinks or information from the aircraft to which the connection is present. Downlinks may be resumed by pressing a resume button that is displayed.

Further, a user may redirect downlinks destined for a proxy server application to the software maintenance tool by selecting redirect downlinks button 6304. Selection of this button causes the onboard electronic distribution system to reroute all downlink information destined for a proxy server application to be sent to the software maintenance tool. If the software maintenance tool is disconnected from the onboard electronic distribution system, the downlinks are then automatically sent to the original destination.

Section 6306 displays additional information for downlink data presented in section 6300. Further, a user may view or delete downlink files in section 6306. Deletions may be made by selecting a particular downlink file and initiating the delete command.

Information presented about downlinked files in section 6306 include, for example, file name 6308, airplane identifier 6310, system 6312, application 6314, data type 6316, description 6318, file size 6320, downlink status 6322, and downlink date and time 6324. File name 6308 identifies the name of the file downlinked or received from the aircraft. Airplane identifier 6310 identifies the aircraft from which the data is received. System 6312 identifies the line replaceable unit from which the data is received. Application 6314 identifies the aircraft software part on the line replaceable unit associated with the data.

Data type 6316 identifies the type of data generated by the application. The software maintenance tool receives downlinked files with a data type to represent an unsolicited downlink in these examples. Description 6318 identifies the name of the file downlinked in this example. File size 6320 identifies the size of the downlinked file. Downlink status 6322 identifies whether the data was successfully downlinked to the software maintenance tool. Downlink date and time 6324 identifies when the downlink is completed. This completion may be a successful completion, a failure, or a partial downlink, depending upon the particular situation.

Figure 64:
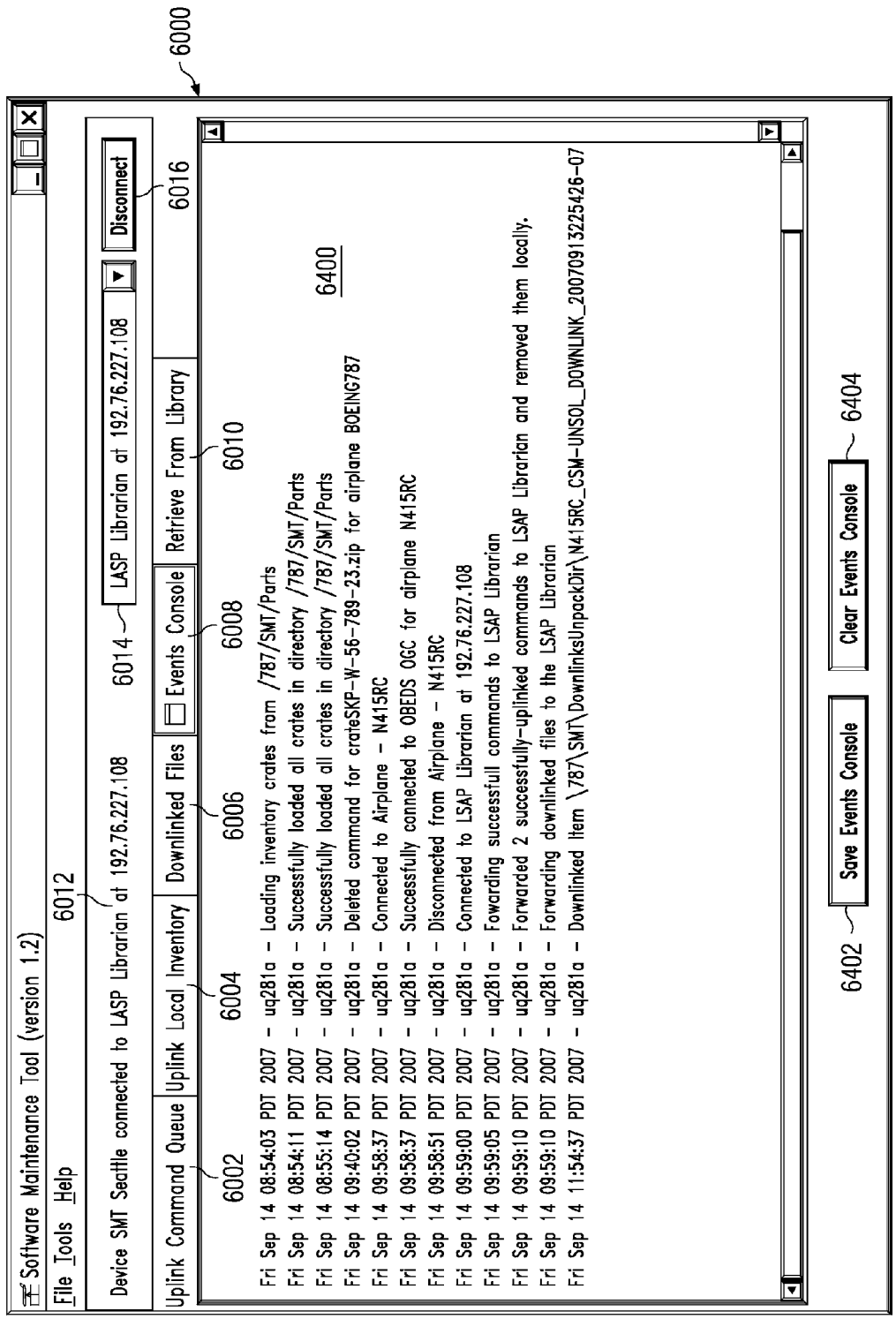

Turning now to FIG. 64, a diagram illustrating a user interface for an event console is depicted in accordance with an advantageous embodiment. In this diagram, window 6000 displays a user interface for a user interface component, such as events console view 5910 in FIG. 59. In the depicted example, this particular view is presented in window 6000 in response to selecting tab 6008. Section 6400 presents activity that occurs with a particular software maintenance tool session. In these examples, a software maintenance tool session is a period of time during which the software maintenance tool is operating. The events illustrated in section 6400 may be presented in real time.

In these examples, these events may be saved by selecting save events console button 6402. Events may be cleared from display in section 6400 by selecting clear events console button 6404. Additionally, the software maintenance tool may automatically save events without user intervention. In these examples, each entry displayed in section 6400 includes a date and time stamp, a user identifier of the user performing a particular action, and a message identifying the action that has been performed.

Figure 65:
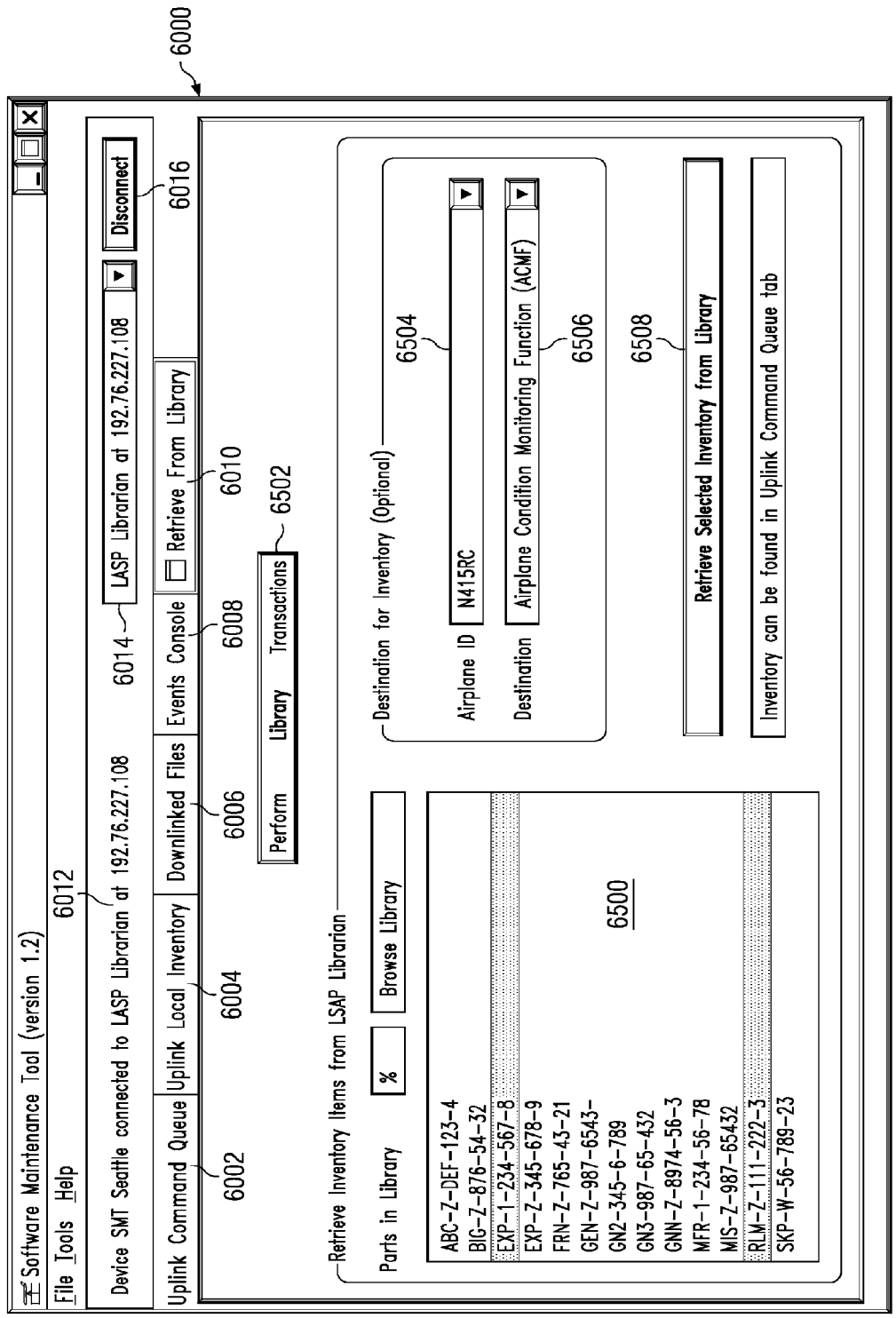

Turning now to FIG. 65, a diagram illustrating a user interface for a retrieve from library view is depicted in accordance with an advantageous embodiment. In this example, window 6000 displays a user interface for retrieve from library view 5912 in FIG. 59. This user interface is presented in response to a selection of tab 6010. This user interface may be used to retrieve commands from a library or a proxy server application as well as browsing or looking at the various aircraft software parts. Additionally, this is when the loss may be used to create commands to uplink aircraft software parts to an onboard electronic distribution system.

Parts that are available in the library are displayed in section 6500. Particular aircraft software parts designated for the software maintenance tool may be retrieved by pressing perform library transactions button 6502. A user also may create commands to uplink aircraft software parts to an onboard electronic distribution system using this interface. A user may also select an aircraft software part from section 6500 and designate a particular aircraft and line replaceable unit using list 6504 and list 6506. List 6504 provides identifications of aircraft. List 6506 identifies a particular line replaceable unit on the aircraft for the aircraft software part.

After these identifications have been made, the aircraft software part may be retrieved from the library by pressing retrieve selected inventory from library button 6508. Selection of this button causes the aircraft software part to be retrieved and a command to be created to uplink the aircraft software part to the aircraft.

Figure 66:
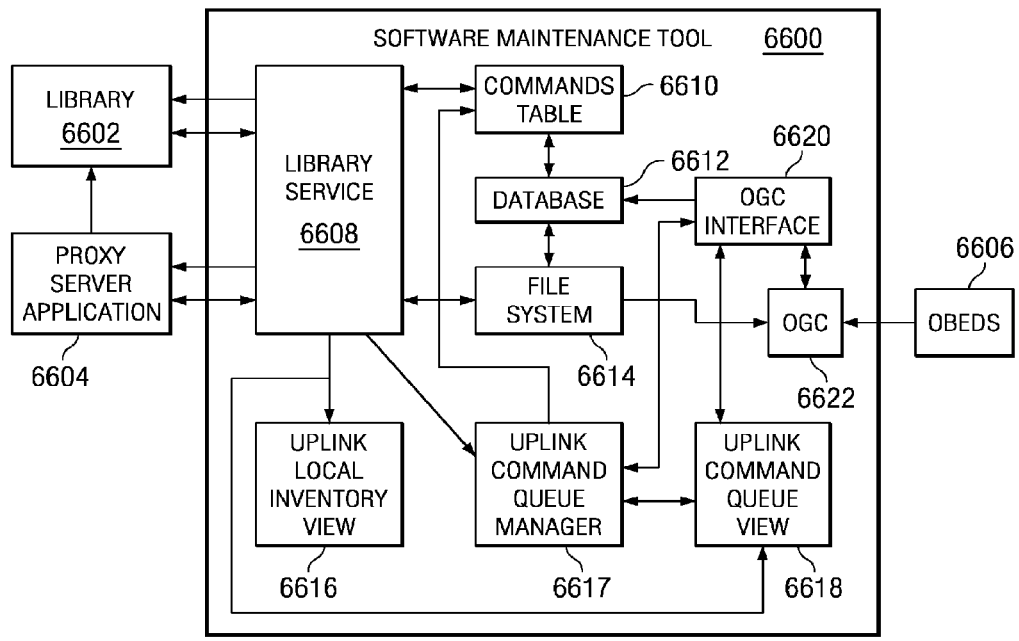
FIG. 66 is a diagram illustrating data flow through a software maintenance tool in sending commands and aircraft software parts to an aircraft in accordance with an advantageous embodiment.

Turning now to FIG. 66, a diagram illustrating data flow through a software maintenance tool in sending commands and aircraft software parts to an aircraft is depicted in accordance with an advantageous embodiment. In this example, data sending flow is shown for software maintenance tool 6600 to the sending of commands and aircraft software parts from library 6602 or proxy server application 6604 to onboard electronic distribution system (OBEDS) 6606 on an aircraft. Each of the different steps and the results of those steps performed by software maintenance tool 6600 may be logged as events for downloading to library 6602 or proxy server application 6604.

In this example, the process begins when a user initiates a transactions process with library 6602 or proxy server application 6604 using a user interface from a user interface component, such as retrieve from library view 5912 in FIG. 59. Library service 6608 retrieves a list of uplink commands that have been successfully uplinked to onboard electronic distribution system 6606. Library service 6608 then makes a call to either library 6602 or proxy server application 6604 and passes a list of the command identifiers for commands that were successfully uplinked to onboard electronic distribution system 6606. Library service 6608 retrieves a list of uplink commands that have been successfully uplinked from commands table 6610. Commands table 6610 is an example of a table found in database 6612. Commands table 5500 in FIG. 55 identifies fields that may be found in commands table 6610.

For every command identifier sent to library 6602 or proxy server application 6604, the corresponding command is deleted from commands table 6610 in database 6612. Additionally, library service 6608 also may send downlink files and event logs from file system 6614.

Thereafter, library service 6608 may make a call to library 6602 or proxy server application 6604 to obtain a list of commands. These commands are compared with commands that should be in queues for distribution to different aircraft. If commands are present in commands table 6610 that are not in the list of commands received from library 6602 or proxy server application 6604, those commands are deleted from this table. However, commands generated by an operator of software maintenance tool 6600 will be retained. The deletion of commands, in these examples, occurs for commands previously sent from library 6602 or proxy server application 6604.

For each new command received, library service 6608 determines whether a crate already exists for the aircraft software part within file system 6614. If the crate for the aircraft software part is not present for the command, then library service 6608 retrieves a crate containing the aircraft software part from library 6602 or proxy server application 6604. Any retrieved crates are stored in file system 6614. If the crate is successfully retrieved or a crate already exists, the new command is placed into commands table 6610 in database 6612. If the crate is successfully retrieved or the crate already exists, the new command is added to a queue in uplink command queue manager 6617. Uplink command queue view 6618 may show information for commands managed by uplink command queue manager 6617.

Thereafter, uplink local inventory view 6616 is updated or refreshed. In this example, uplink local inventory view 6616 is a user interface component, such as uplink local inventory view 6004 as displayed in window 6000 in FIG. 62. This view allows an operator to see the different aircraft software parts that are stored within the software maintenance tool. By knowing what aircraft software parts are present in file system 6614, an operator may create new commands to uplink those aircraft software parts using the software maintenance tool. Thereafter, uplink command queue view 6618 is updated. This view may be, for example, uplink command queue view 6002 as displayed in window 6000 in FIG. 61.

Thereafter, the operator may disconnect software maintenance tool 6600 from library 6602 or proxy server application 6604. Software maintenance tool 6600 may then be transported to the aircraft and connected to onboard electronic distribution system 6606. When this connection is established, uplink command queue view 6618 automatically uplinks all commands that have not been successfully uplinked for the particular aircraft to onboard electronic distribution system 6606 through on ground connection (OGC) interface 6620.

On ground connection interface 6620 creates a command for on ground component (OGC) 6622 and adds this command to a list of commands for on ground component 6622 to retrieve one at a time. These commands are identified in uplink command queue manager 6617.

When on ground component 6622 calls on ground component interface 6620, on ground component interface 6620 determines whether the aircraft is already uplinking data. If the aircraft is already uplinking data, a null value is returned to on ground component 6622, and commands are not changed in the command list. In these examples, on ground component 6622 communicates with onboard electronic distribution system 6606 to determine whether the aircraft is uplinking data in these examples.

If the aircraft is not already uplinking, the oldest uplink command in the command queue is passed to on ground component 6622. In turn, on ground component 6622 communicates with onboard electronic distribution system 6606 to start uplinking the crate identified in the command. On ground component 6622 may obtain status information during uplinking of aircraft software parts. Further, on ground component interface 6620 may update uplink command queue view 6618 to show a progress bar, such as those illustrated in uplink status progress 6120 in FIG. 61.

When the command has been successfully executed, uplink command queue view 6618 updates the information in commands table 6610. Additionally, uplink command queue view 6618 also updates the execution status of the command field in commands table 6610.

Figure 67:
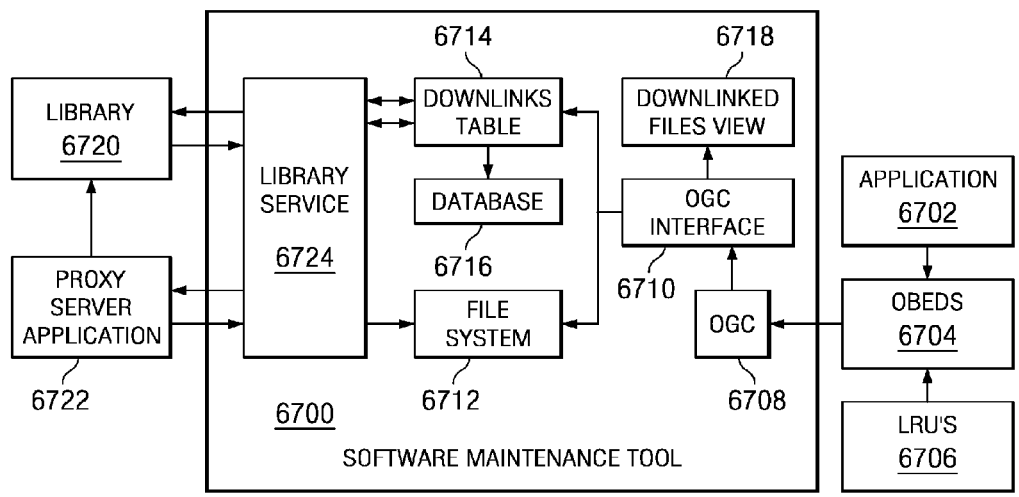
FIG. 67 is a diagram illustrating data flow in a software maintenance tool processing downlinked files in accordance with an advantageous embodiment.

Turning now to FIG. 67, a diagram illustrating data flow in a software maintenance tool processing downlinked files is depicted in accordance with an advantageous embodiment. In this example, software maintenance tool 6700 may receive downlinked files initiated by application 6702 executing on a laptop computer connected to onboard electronic distribution system (OBEDS) 6704. Additionally, unsolicited downlink files from line replaceable units (LRU's) 6706 also may be received by software maintenance tool 6700. When software maintenance tool 6700 establishes a connection to onboard electronic distribution system 6704, on ground component 6708 is the component that provides the communication with onboard electronic distribution system 6704.

On ground component (OGC) 6708 communicates through on ground component (OGC) interface 6710 with other components in software maintenance tool 6700. In this example, a downlink file is downlinked and stored in file system 6712. When the downlink file is transferred to file system 6712, on ground component interface 6710 inserts a new record in downlinks table 6714 in database 6716.

The different downlink files stored within file system 6712 may be viewed using downlinked files view 6718. This view is an example of a user interface component, such as downlinked files view 5908 in FIG. 59. This view may be used to identify what downlink files have been received as well as manipulate downlink files. Downlinks table 5700 in FIG. 57 shows examples of fields that may be found in downlinks table 6714.

Thereafter, software maintenance tool 6700 may be moved and establish a connection with library 6720 or proxy server application 6722. When this connection is established, library service 6724 identifies downlink files that have not yet been sent to library 6720 or proxy server application 6722. The identification of these files may be found in downlinks table 6714.

In these examples, partially downlink files are not sent to library 6720 or proxy server application 6722. For each of the downlink files identified in downlinks table 6714, library service 6724 confirms that these files are still stored in file system 6712. Library service 6724 then forwards all of the located downlinked files to library 6720 or proxy server application 6722. Any files sent to proxy server application 6722 are eventually sent to library 6720 by proxy server application 6722.

In some cases, files may be only partially downlinked to the software maintenance tool because of an interruption. The different advantageous embodiments provide a mechanism through which partially downlinked files are saved by the software maintenance tool within file system 6712. These partial downlinked files are saved, and additional or remaining portions of the downlink may be retrieved at a later time and added to these partial downlinked files to form a complete downlink file. In this manner, if an interruption occurs, the downlinking of data may pick up where it left off without having to downlink the entire file again.

Figure 68:
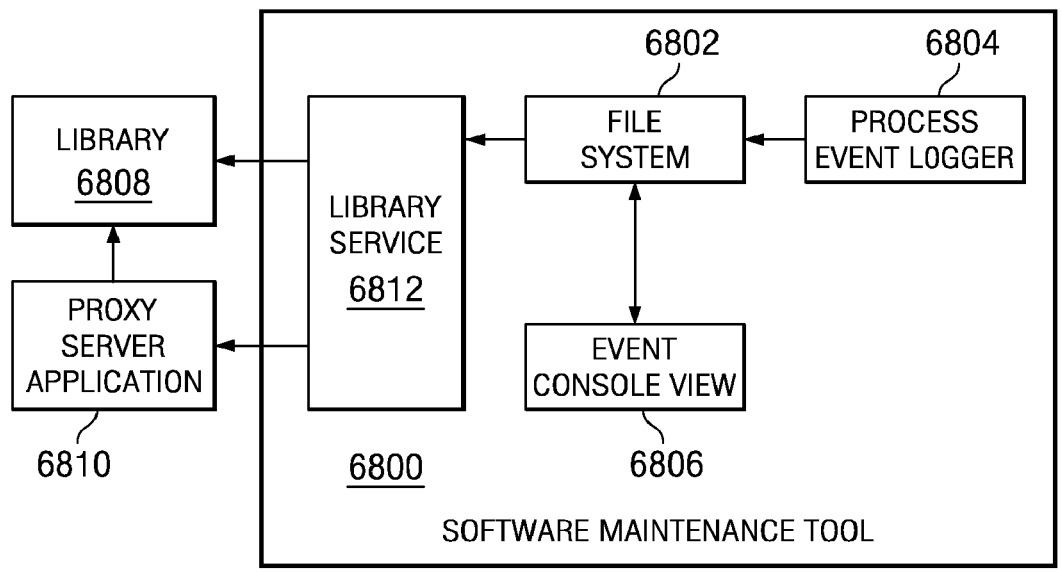
FIG. 68 is a diagram illustrating data flow and logging importing events by a software maintenance tool in accordance with an advantageous embodiment.

Turning now to FIG. 68, a diagram illustrating data flow and logging importing events by a software maintenance tool is depicted in accordance with an advantageous embodiment. In this example, software maintenance tool 6800 logs events in file system 6802 using process event logger 6804. Process event logger 6804 is an example of a process that may be found in manager 5408 in FIG. 54.

In these examples, process event logger 6804 may log all of the different steps and results of those steps performed by software maintenance tool 6800 in uplinking and downlinking data. This type of information may be displayed in event console view 6806, which is an example of a user interface component in user interface components 5900 in FIG. 59. An example user interface is window 6000 in FIG. 64. When software maintenance tool 6800 connects to library 6808 or proxy server application 6810 through library service 6812, a user input is received to transfer data and log files stored in file system 6802 and are forwarded on to library 6808 and proxy server application 6810. If the event logs are successfully sent, the event log files are renamed for archival purposes.

Figure 69:
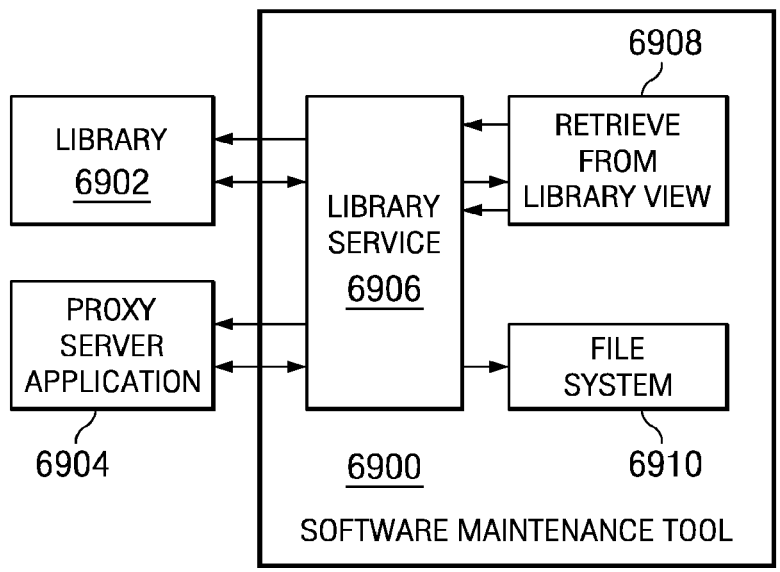
FIG. 69 is a diagram illustrating data flow in a software maintenance tool retrieving parts from a library in accordance with an advantageous embodiment.

Turning now to FIG. 69, a diagram illustrating data flow in a software maintenance tool retrieving parts from a library is depicted in accordance with an advantageous embodiment. In this example, software maintenance tool 6900 may connect to library 6902 or proxy server application 6904 through library service 6906. A user may retrieve from library view 6908 to identify parts stored on library 6902 and/or proxy server application 6904.

Retrieve from library view 6908 is an example of retrieve from library view 5912 in FIG. 59 within user interface components 5900 in FIG. 59. Window 6000 in FIG. 65 is an example of a user interface for this particular view. The parts may be displayed and retrieved from retrieve from library view 6908. A user may select a set of parts and retrieve those parts from library 6902 and/or proxy server application 6904 and store the aircraft software parts in file system 6910. The parts are then displayed for users to create uplink command(s).

Figure 70:
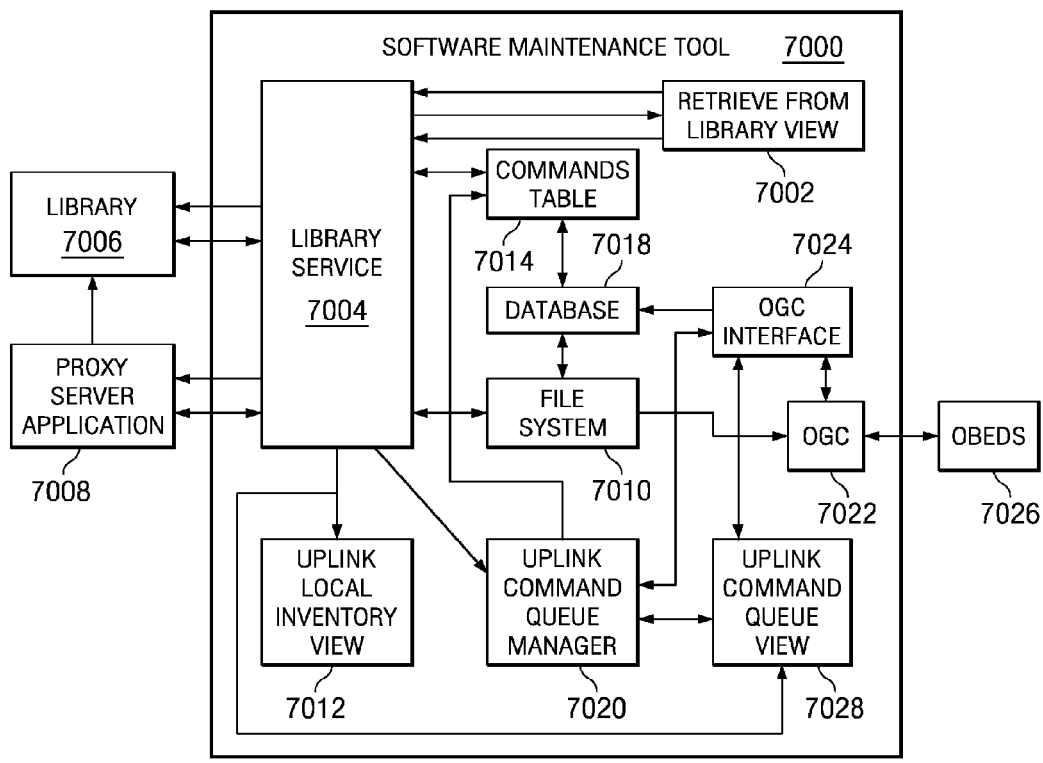
FIG. 70 is a diagram illustrating data flow in a software maintenance tool during retrieving and creating of commands in accordance with an advantageous embodiment.

Turning now to FIG. 70, a diagram illustrating data flow in a software maintenance tool during retrieving and creating of commands is depicted in accordance with an advantageous embodiment. In this example, software maintenance tool 7000 may retrieve parts and create commands using retrieve from library view 7002. Retrieve from library view 7002 is an example of a user interface component, such as retrieve from library view 5912 in FIG. 59 as presented in window 6000 in FIG. 65.

When library service 7004 is connected to library 7006 or proxy server application 7008, a user may view a list of parts retrieved from retrieve from library view 7002. A user may select parts through this view and initiate downlinking of those parts by library service 7004. The parts retrieved by library service 7004 are stored in file system 7010. In these examples, the aircraft software parts are stored as crates. Uplink local inventory view 7012 may be refreshed.

With retrieve from library view 7002, a user may create commands that are stored in commands table 7014 in database 7018. These commands may be added to uplink command queue manager 7020 for execution by on ground component (OGC) 7022 through on ground component (OGC) interface 7024 to onboard electronic distribution system (OBEDS) 7026. Uplink command queue manager 7020 is an example of a component within manager 5408 in software maintenance tool 5400 in FIG. 54. The status of this process may be viewed through uplink command queue view 7028.

Figure 71:
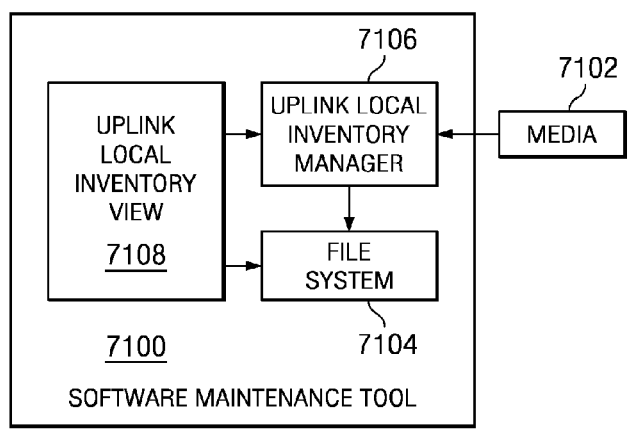
FIG. 71 is a diagram illustrating uploading of aircraft software parts from alternative sources in accordance with an advantageous embodiment.

With reference now to FIG. 71, a diagram illustrating uploading of aircraft software parts from alternative sources is depicted in accordance with an advantageous embodiment. In this example, software maintenance tool 7100 may upload aircraft software parts from media 7102 into file system 7104 through uplink local inventory manager 7106. This view is an example of uplink local inventory view 5906 in FIG. 59. This view uses a graphical user interface, such as window 6000 in FIG. 62.

The control of this uploading or uplinking process from media 7102 may be performed using uplink local inventory view 7108. Aircraft software parts may be uploaded into software maintenance tool 7100 from other sources other than a library or a software proxy server application. By allowing for this type of flexibility, software maintenance tool 7100 may allow for last minute parts or new parts not yet available from normal sources to be uploaded to an aircraft or if a connection to the library or proxy server application is unavailable.

Figure 72:
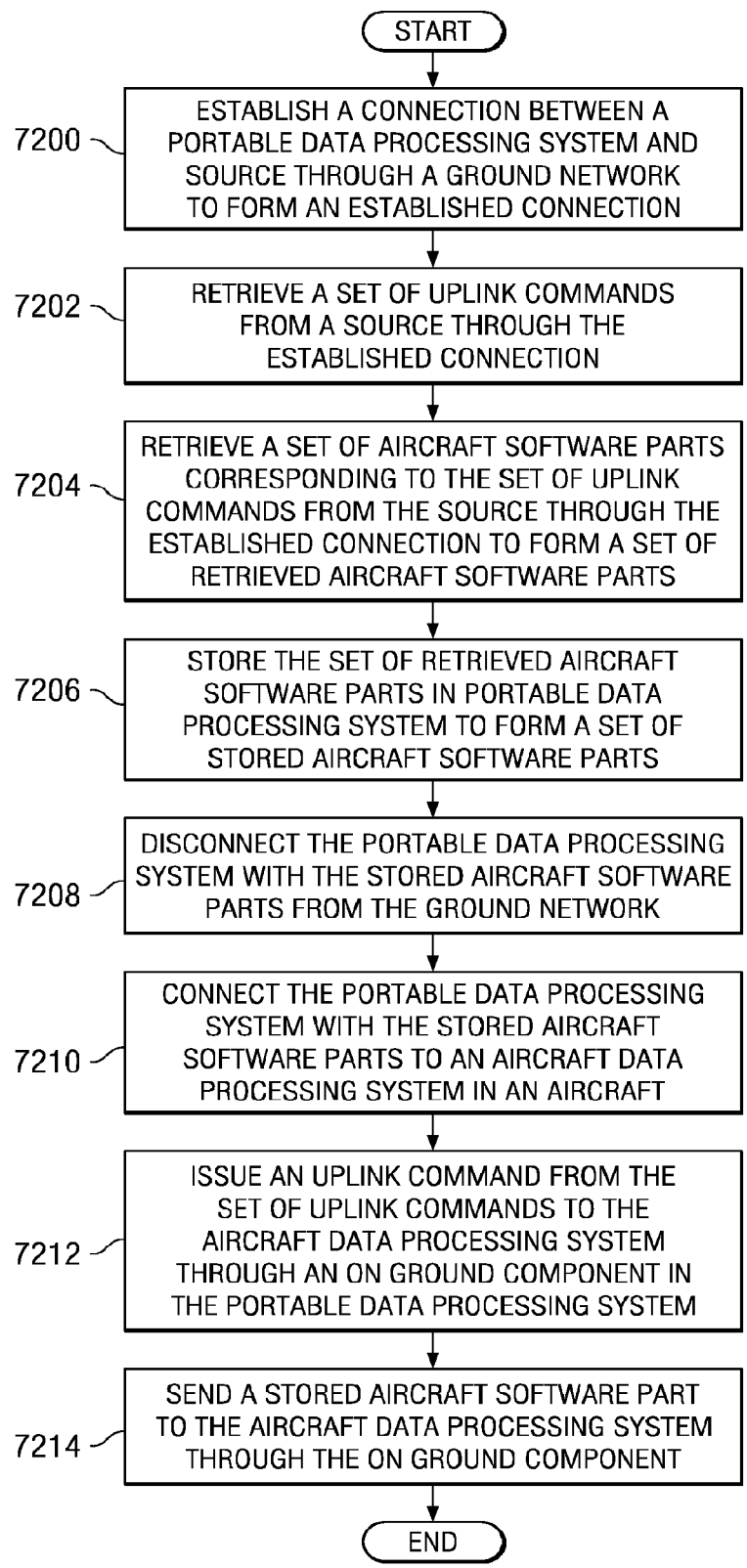
FIG. 72 is a high level flowchart of a process for managing aircraft software parts in accordance with an advantageous embodiment.

Turning next to FIG. 72, a high level flowchart of a process for managing aircraft software parts is depicted in accordance with an advantageous embodiment. The process illustrating in FIG. 72 may be implemented in a software maintenance tool, such as software maintenance tool 5400 in FIG. 54.

The process begins by establishing a connection between a portable data processing system and a source through a ground network to form an established connection (operation 7200). Thereafter, the process retrieves a set of uplink commands from a source through the established connection (operation 7202). The source may be for example, a proxy server application, a library, or even a local storage device.

The process then retrieves a set of aircraft software parts corresponding to the set of uplink commands from the source through the established connection to form a set of retrieved aircraft software parts (operation 7204). The process stores the set of retrieved aircraft software parts in the portable data processing system to form a set of stored aircraft software parts (operation 7206).

The process then disconnects the portable data processing system with the stored aircraft software parts from the ground network (operation 7208). In these examples, the portable data processing system is moved to a location to allow the portable data processor to connect to an aircraft network on an aircraft. Next, the process connects the portable data processing system with the stored aircraft software parts to an aircraft data processing system in an aircraft (operation 7210).

The process then issues an uplink command from the set of uplink commands to the aircraft data processing system through an on ground component in the portable data processing system (operation 7212). The process sends a stored aircraft software part corresponding to the uplink command in the set of stored aircraft software parts to the aircraft data processing system through the on ground component (operation 7214), with the process terminating thereafter.

Figure 73:
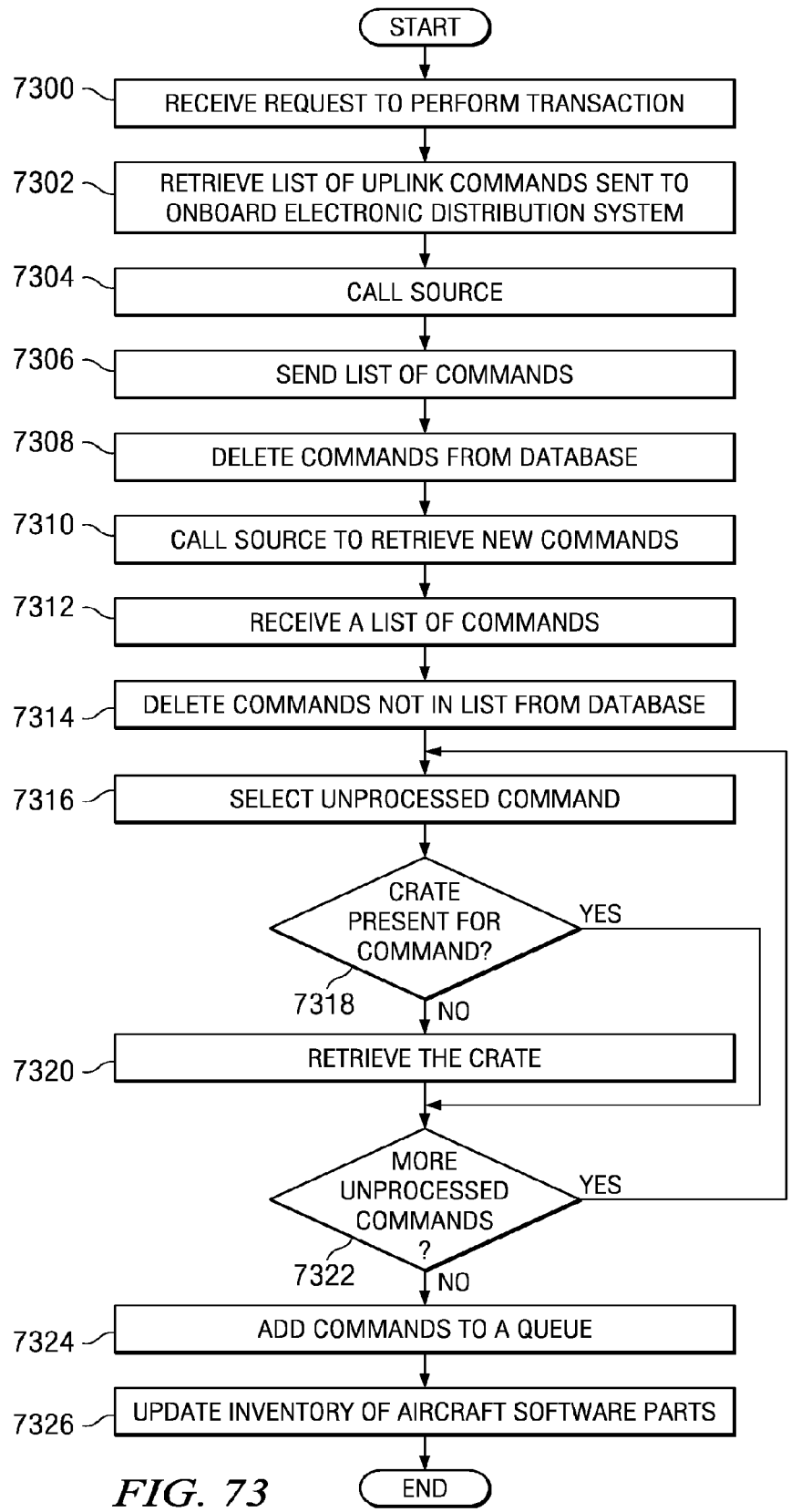
FIG. 73 is a more detailed flowchart of a process for managing aircraft software parts in accordance with an advantageous embodiment.

Turning now to FIG. 73, a more detailed flowchart of a process for managing aircraft software parts is depicted in accordance with an advantageous embodiment. The process illustrated in FIG. 73 may be implemented in a software maintenance tool, such as software maintenance tool 5400 in FIG. 54. The process in this figure illustrates the different steps that occur in a software maintenance tool when connected to a source, such as a library or a proxy server application.

The process begins by receiving a request to perform transactions (operation 7300). In this example, the process to perform transactions may be initiated by a user through a user interface within user interface components 5900 in FIG. 59. In particular, the process may be initiated by a user entering user input into retrieve from library view 5912 in FIG. 59 with a user interface, such as window 6000 as illustrated in FIG. 65.

The process then retrieves a list of uplink commands sent to an onboard electronic distribution system (operation 7302). In this example, the list of uplink commands are ones in which the aircraft software parts identified by the uplink command has been successfully sent to the onboard electronic distribution system. These different commands may be stored in a table in a database, such as commands table 5500 in FIG. 55. Each of the records within commands table 5500 in FIG. 55 may include an indication as to whether a command was successfully sent.

Thereafter, the process calls a source (operation 7304). The source may be, for example, a library or a proxy server application. The process sends these lists of commands to the source (operation 7306). The commands sent to the source are then deleted from the database and the software maintenance tool (operation 7308).

The process then calls the source to retrieve new commands (operation 7310). A list of commands is received from the source (operation 7312). In operation 7312, the commands are received in an uncrated form unlike the manner in which a proxy server or application receives commands from a library. The process then deletes commands not in the list from the database (operation 7314). As a result, the source is the authority or provides an override as to what commands are to be executed by the software maintenance tool.

If a user desires to remove commands or delete commands for execution on an aircraft, these commands may be deleted at the source. The list of commands sent to the software maintenance tool results in any commands not in the list being deleted. As a result, this type of process allows for updating commands to be executed on the software maintenance tool.

The process selects an unprocessed command for processing (operation 7316). A determination is made as to whether a crate containing an aircraft software part is present for the command (operation 7318). In operation 7318, the process checks the file system on the software maintenance tool to determine whether a crate containing the aircraft software part is already stored in the file system. If a crate is not present, then the process retrieves the crate (operation 7320).

Next, a determination is made as to whether additional unprocessed commands are present (operation 7322). If additional unprocessed commands are present, the process returns to operation 7316. The process proceeds to operation 7322 from operation 7318 if a crate is present for the command. The process then adds the commands to a queue (operation 7324). The process then updates the inventory of aircraft software parts (operation 7326), with the process terminating thereafter.

Figure 74:
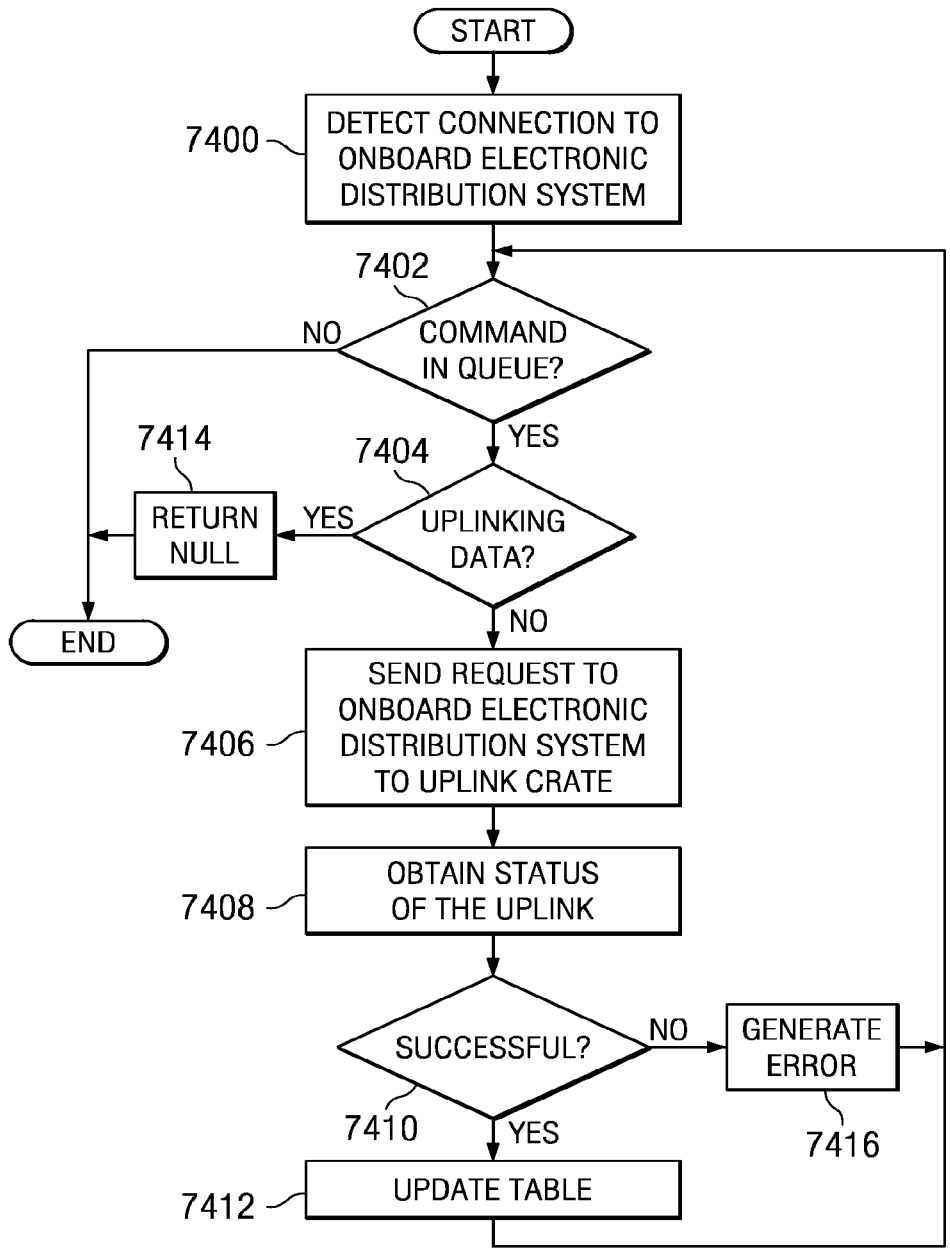
FIG. 74 is a flowchart of a process for sending aircraft software parts from a software maintenance tool to an onboard electronic distribution system in accordance with an advantageous embodiment.

FIG. 74 illustrates operations that occur in a software maintenance tool when a portable data processing system, on which the software maintenance tool is located, is connected to an aircraft network.

In these examples, the software maintenance tool may be used to send aircraft software parts to an onboard electronic distribution system executing on an aircraft data processing system in the aircraft network. In these examples, the queue may be, for example, a queue in uplink command queue manager 6617 in FIG. 66. The process then updates an inventory of aircraft software parts (operation 7326), with the process terminating thereafter.

Turning now to FIG. 74, a flowchart of a process for sending aircraft software parts from a software maintenance tool to an onboard electronic distribution system is depicted in accordance with an advantageous embodiment. In this example, the process may be implemented in a software maintenance tool, such as software maintenance tool 5400 in FIG. 54. The process begins by detecting a connection to the onboard electronic distribution system on the aircraft data processing system (operation 7400).

The process determines whether a command is present in the command queue (operation 7402). If a command is present, the process determines whether the aircraft is currently uplinking data (operation 7404). If the aircraft is not currently uplinking data, the process sends a request to the onboard electronic distribution system to uplink the crate containing the aircraft software part (operation 7406). The process then obtains the status of the uplink (operation 7408). The status may be displayed on a user interface, such as window 6000 in FIG. 61. Operation 7408 occurs while uplinking of the crate continues.

After uplinking completes, a determination is made as to whether the uplinking of the crate with the aircraft software part has been successful (operation 7410). If the uplinking of the crate was successful, the command table is updated (operation 7412). The table, in these examples, is a commands table, such as commands table 5500 in FIG. 55. The process then returns to operation 7402 to determine whether additional commands are present in the queue for processing.

With reference again to operation 7410, if the uplinking of the aircraft software part was not successful, an error is generated (operation 7416), and the process returns to operation 7402 as described above. With reference again to operation 7404, if the aircraft is uplinking data, a null value is returned (operation 7414), with the process terminating thereafter.

Figure 75:
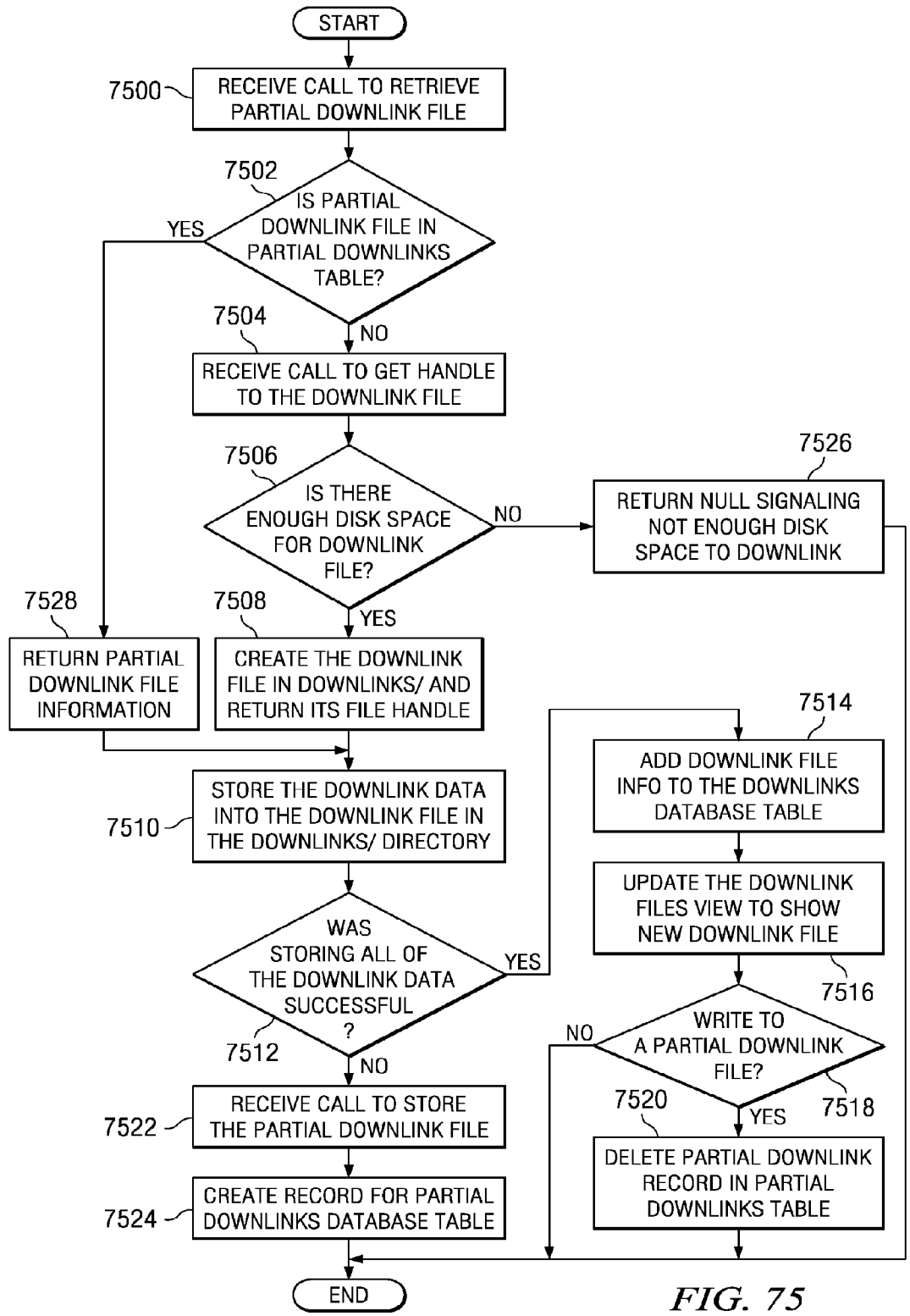
FIG. 75 is a flowchart of a process for receiving downlink data in accordance with an advantageous embodiment.

With reference now to FIG. 75, a flowchart of a process for receiving downlink data is depicted in accordance with an advantageous embodiment. The process illustrated in FIG. 75 may be implemented in a data software maintenance tool, such as software maintenance tool 5400 in FIG. 54.

The process in FIG. 75 begins by receiving a call from the onboard electronic distribution system to retrieve a partial downlink file (operation 7500). A determination is made as to whether the partial downlink file is contained in a partial downlinks table (operation 7502). This partial downlink table may be a table such as, for example, partial downlink table 5600 in FIG. 56. If the partial downlink file is not found in the table, the process receives a call to obtain a handle to the downlink file from the onboard electronic distribution system (operation 7504).

Next, a determination is made as to whether enough disk space is present to store the downlink file (operation 7506). If sufficient space is present, the downlink file is created in a directory called "downlinks/", and a file handle is returned to the onboard electronic distribution system (operation 7508). The process then stores the downlink data into the downlink file in the "downlinks/" directory (operation 7510).

A determination is then made as to whether the downlink file was successfully stored (operation 7512). If all of the downlink data was successfully stored, the process adds the downlink file to the downlinks database table (operation 7514). This table may be a table such as, for example, downlinks table 5700 in FIG. 57. The process then updates the downlink files view to show the new file (operation 7516).

This view is a view, such as downlinked files view 6006 as presented in window 6000 in FIG. 63.

The process then determines whether the data is written to a partial downlink file (operation 7518). If the data is not written to a partial downlink file, the process terminates. Otherwise, the partial downlink record in the partial downlinks table is deleted (operation 7520), with the process terminating thereafter. In this case, the partial downlink file is completed with the rest of the downlink data, and the identification of the partial downlink file is no longer needed.

With reference again operation 7512, if the storing of all of the data for the downlink file was not successful, the process receives a call from the onboard electronic distribution system to store the partial downlink file (operation 7522). In this case, the onboard electronic distribution system may have interrupted the downlinking data for a number of different reasons. For example, the amount of bandwidth available is insufficient to downlink data and uplink other information. The process then creates a record in the partial downlinks database table (operation 7524), with the process terminating thereafter.

With reference again to operation 7506, if insufficient space is present for the downlink file, a null is returned to the onboard electronic distribution system to indicate that insufficient disk space is present for the downlink data (operation 7526). With reference back to operation 7502, if a partial downlink file is present in the partial downlinks table, the process returns partial downlink file information to the onboard electronic distribution system (operation 7528). This information includes a starting point or offset to send the rest of the downlink data for the downlink file. The process then proceeds to operation 7510 as described above.

Thus, the software maintenance tool described in these different advantageous embodiments provides an additional feature for transferring aircraft software parts from a library to an aircraft data processing system. In the different advantageous embodiments, the software maintenance tool may connect either to the library or to a proxy server application on a ground network to receive commands and aircraft software parts. The software maintenance tool may then be disconnected from the ground network and physically moved to a location for connection to an aircraft network. At this location, the software maintenance tool connects to the aircraft network and transfers aircraft software parts and commands to the onboard electronic distribution system executing on a data processing system on the aircraft network in the aircraft.

Additionally, the software maintenance tool allows for an operator to create commands independently from the library using graphical user interfaces presented by view components in the software maintenance tool. The software maintenance tool also includes features that allow this component to receive aircraft software parts from other sources other than a library or proxy server application.

The different advantageous embodiments also provide a computer implemented method, apparatus, and computer program product for transferring information with an aircraft. In one advantageous embodiment, a computer implemented method is used for transferring information with the aircraft. A connection is established between an onboard electronic distribution system executing in an aircraft data processing system in the aircraft and an on ground component.

The on ground component may be located in a ground network in a software application, such as a software maintenance tool or a proxy server application, in these examples. In response to a request for a command from the onboard electronic distribution system made through the connection, the command for execution by the onboard electronic distribution system is identified. This identified command is sent to the onboard electronic distribution system from the on ground component. A transaction identifier is assigned to the command.

A status of the transaction associated with the command is maintained on the onboard electronic distribution system and on the on ground component using the transaction identifier. An uplink is initiated by the onboard electronic distribution system. An aircraft software part is then sent to the onboard electronic distribution system from the on ground component to perform the uplink. The status of this transfer is stored.

Figure 76:
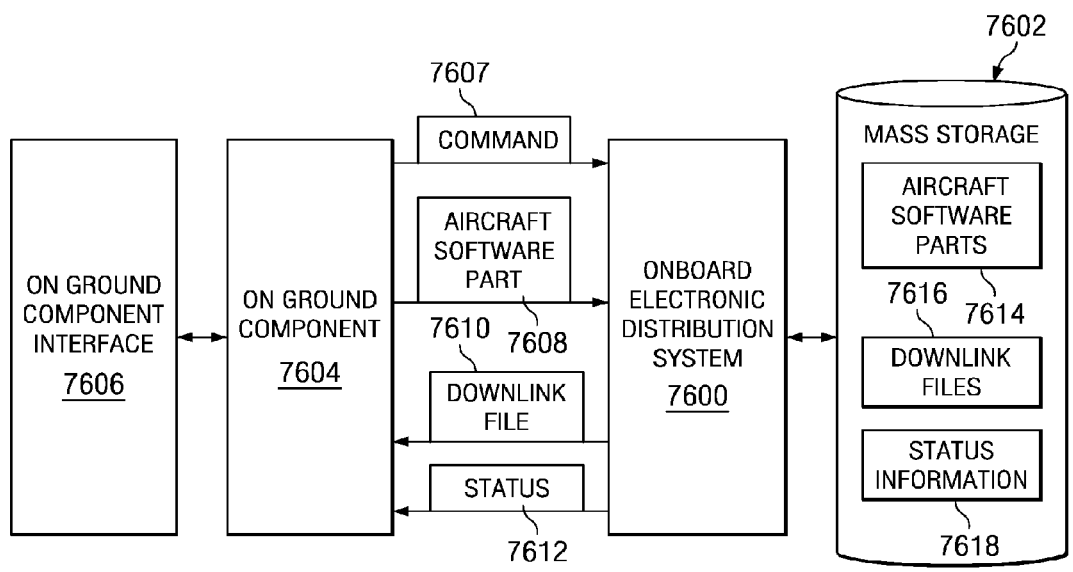
FIG. 76 is a diagram of components used to transfer information with an aircraft in accordance with an advantageous embodiment.

Turning now to FIG. 76, a diagram of components used to transfer information with an aircraft is depicted in accordance with an advantageous embodiment. Onboard electronic distribution system 7600 is an example of an onboard electronic distribution system, such as onboard electronic distribution system 310 in aircraft software part management apparatus 300 in FIG. 3.

In this illustrative example, onboard electronic distribution system 7600 and mass storage 7602 are components located on an aircraft data processing system in an aircraft network. Onboard electronic distribution system 7600 is an example of onboard electronic distribution system 146 in FIG. 1. Mass storage 7602 is an example of storage device 148 in FIG. 1. These components are part of an aircraft data processing system, such as aircraft data processing system 144 in aircraft network 101.

On ground component 7604 and on ground component interface 7606 are examples of components that may be found in a proxy server application or a software maintenance tool, such as proxy server application 3500 in FIG. 35 or software maintenance tool 5400 in FIG. 54. In these examples, on ground component 7604 and onboard electronic distribution system 7600 may exchange information. Command 7607, aircraft software part 7608, downlink file 7610, and status 7612 are examples of information that may be transferred with onboard electronic distribution system 7600.

In these examples, on ground component 7604 may send command 7607 to onboard electronic distribution system 7600. Onboard electronic distribution system 7600 may execute this command to perform a transaction. This transaction may be, for example, an uplink or a downlink of data. An uplink includes sending aircraft software part 7608 to onboard electronic distribution system 7600. A downlink includes sending downlink file 7610 to on ground component 7604.

Additionally, the status of the different transactions is maintained by both on ground component 7604 and onboard electronic distribution system 7600 in these examples. Status 7612 is sent by onboard electronic distribution system 7600 to on ground component 7604 to provide the status of a particular transaction being performed through the execution of a command, such as command 7607. This status is associated with a particular command or transaction through a command identifier.

Aircraft software part 7608 may be sent to onboard electronic distribution system 7600 for storage with aircraft software parts 7614 in mass storage 7602. Downlink file 7610 may be a downlink file from downlink files 7616 in mass storage 7602.

Status information 7618 may be stored in mass storage 7602 and includes status information, such as status 7612. Status information 7618 may indicate that a particular aircraft software part has been successfully stored within aircraft software parts 7614 in mass storage 7602. Status information 7618 allows for the initiation of the loading of an aircraft software part from mass storage 7602 onto a line replaceable unit once that aircraft software part has been identified as being successfully uplinked by onboard electronic distribution system 7600 and stored within mass storage 7602.

Additionally, status information 7618 may identify whether a downlink file, such as downlink file 7610, has been successfully downlinked. If a partial downlink of downlink file 7610 occurs, status information 7618 provides the status of what information within downlink file 7610 has been transmitted. As a result, maintaining a status of how much information has been downlinked to on ground component 7604 may be used to downlink the remaining information for downlink file 7610 at a later point in time without restarting the entire transmission of downlink file 7610.

On ground component interface 7606 provides an interface with other components to on ground component 7604. In this manner, on ground component 7604 may be interchangeable or modified with other versions or configurations of on ground components to provide access to a particular onboard electronic distribution system that may have a different protocol for exchanging information or processing commands. In these examples, on ground component 7604 contains the processes needed to transfer information with onboard electronic distribution system 7600. If a different onboard electronic distribution system is employed that is not compatible with on ground component 7604, on ground component 7604 may be substituted with another on ground component.

As a result, other software components in the ground network do not have to be changed. For example, other components within a proxy server application and a software maintenance tool do not require modifications to be able to communicate with an onboard electronic distribution system.

Figure 77:
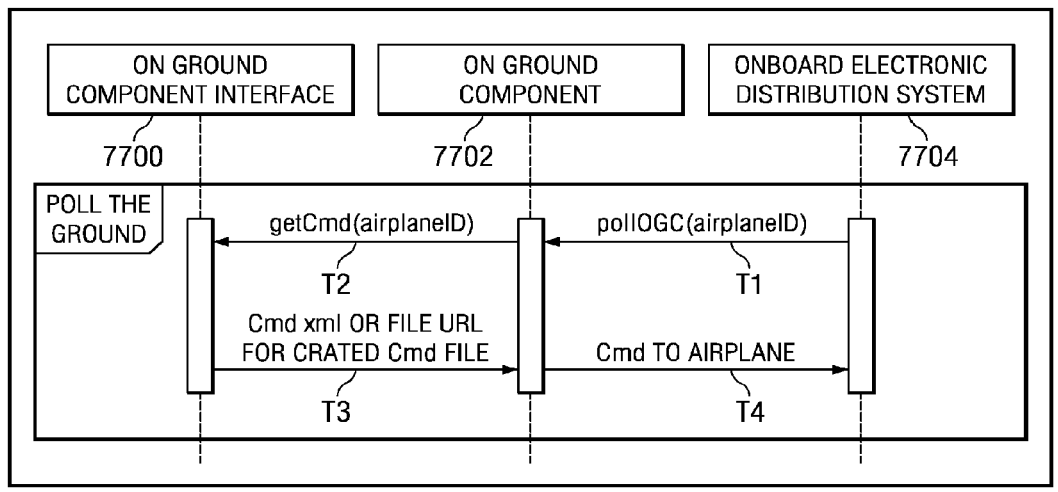
FIG. 77 is a message flow diagram illustrating message flow used to poll for a command in accordance with an advantageous embodiment.

Turning now to FIG. 77, a message flow diagram illustrating message flow used to poll for a command is depicted in accordance with an advantageous embodiment. In this example, the components involved in this message flow are on ground component (OGC) interface 7700, on ground component 7702, and onboard electronic distribution system 7704.

In this example, onboard electronic distribution system 7704 polls on ground component 7702 for a command (message T1). In response to being polled, on ground component 7702 sends a get command request to on ground component interface 7700 (message T2). This command is used by on ground component interface 7700 to identify commands that may be located in a proxy server application or a software maintenance tool for onboard electronic distribution system 7704.

In response, a command or a pointer to a crated command file is returned to on ground component 7702 (message T3). In these examples, a proxy server application returns a pointer, such as a universal resource locator, to a crated file containing the command. With a software maintenance tool, the actual command itself is returned in message T3. If a command is not present, then a null value or some other indicator is returned in message T3. The returned command is then sent to onboard electronic distribution system 7704 (message T4). Onboard electronic distribution system 7704 may then process and execute the command received in message T4.

Figure 78:
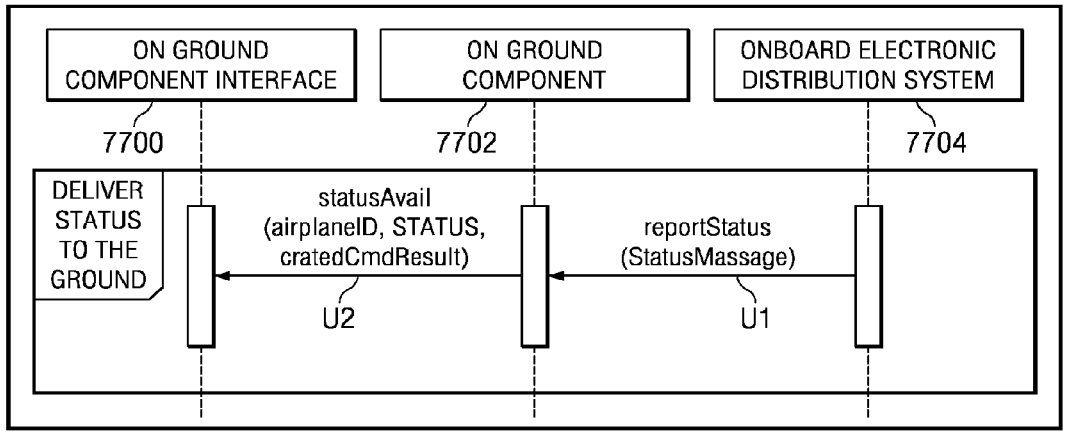
FIGS. 78-79 are message flow diagrams illustrating the sending of status information in accordance with an advantageous embodiment.

Turning now to FIG. 78, a message flow diagram illustrating the sending of status information is depicted in accordance with an advantageous embodiment. In this example, components in the message flow include on ground component interface 7700, on ground component 7702, and onboard electronic distribution system 7704. Onboard electronic distribution system 7704 provides status information for various operations and processes executed by onboard electronic distribution system 7704. This status information may include, for example, the status of an aircraft software part that has been uplinked, the status of a downlink file, and/or other suitable information.

Onboard electronic distribution system 7704 sends the status to on ground component 7702 (message U1). This status is relayed by on ground component 7702 to on ground component interface 7700 (message U2). This status information may then be processed by a proxy server application or a software maintenance tool in these examples.

Figure 79:
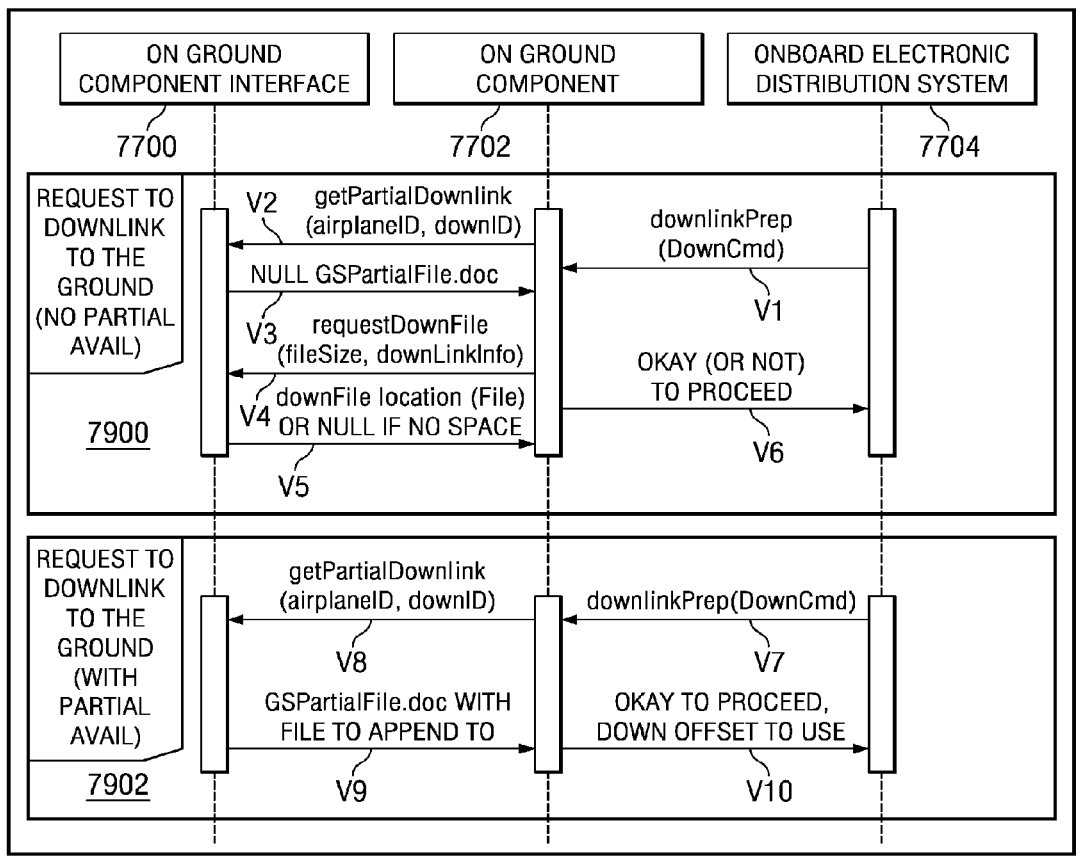
Figure 80:
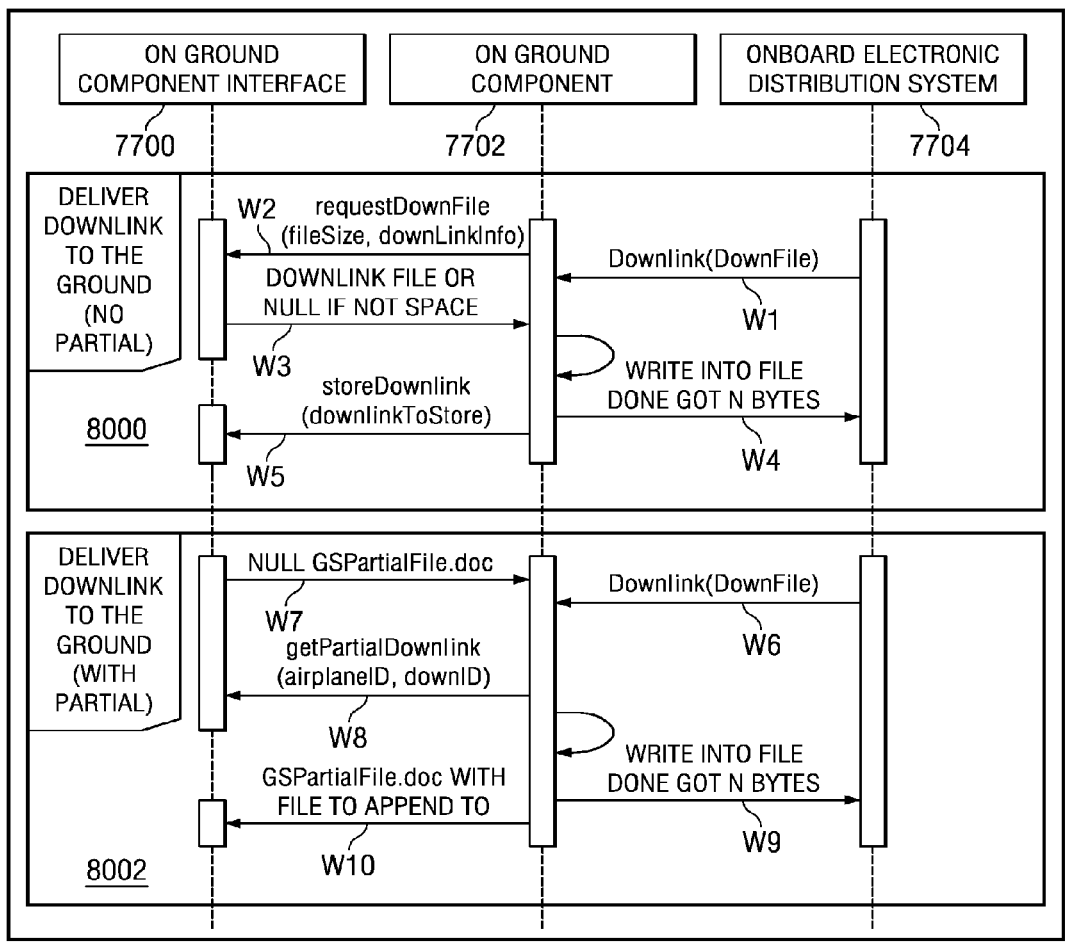
FIG. 80 is a message flow diagram for downlinking data in accordance with an advantageous embodiment.

Two phases are present for downlinking data. FIG. 79 illustrates a first phase in which a request for downlinking data is made, and FIG. 80 depicts a second phase in which the data is downlinked. With reference now to FIG. 79, a message flow diagram of a request to downlink data is depicted in accordance with an advantageous embodiment. The message flow in FIG. 79 shows the first phase in downlinking data. In these examples, FIG. 79 shows the request to downlink data. The second phase is for actually transmitting downlink data as described with respect to FIG. 80, below.

In this example, phase one has two cases. In case 7902, a request to downlink information is made with a partial downlink being available.

In case 7900, onboard electronic distribution system 7704 sends a request to downlink a file (message V1). In message V1, the request may be refused if no space is present to store the downlink file. In response, on ground component 7702 sends a request to determine whether a partial downlink record is present to on ground component interface 7700 (message V2). In response, on ground component interface 7700 sends a request to obtain a partial downlink associated with the request to send to message V1 (message V2). The request sent in message V2 includes an airplane identifier and a downlink identifier. This information is used by on ground component interface 7700 to determine whether a partial downlink file is present for this particular downlink file.

On ground component interface 7700 returns a null value to on ground component 7702 indicating that a partial downlink file is not present for the requested downlink (message V3). In response, on ground component 7702 makes a request to downlink the downlink file (message V4). The message in message V4 is a request to downlink the entire file in these examples. In these examples, the message includes information about the file size. If space is available, on ground component interface 7700 returns a location to downlink the file to on ground component 7702 (message V5). If no space is available, a null value is returned to message V5.

In response, on ground component 7702 returns a response to onboard electronic distribution system 7704 (message V6). This message is either an indication that is an okay to proceed downlinking or a denial of the request.

In case 7902 in the first phase, onboard electronic distribution system 7704 makes a request to downlink part of a file for a downlink file (message V7). In response, on ground component 7702 makes a request to determine whether a partial downlinked file is already present for the requested downlink (message V8).

In response to receiving this message, on ground component interface 7700 returns a document containing a reference to an existing partially downlinked file to on ground component 7702 (message V9). In these examples, the document is an extensible markup language (XML) document, and reference may be a pointer or universal resource locator (URL) depending on the particular implementation.

When the reference is returned, on ground component 7702 sends a response to the request to downlink a partial downlink file to onboard electronic distribution system 7704

(message V10). The response, in this example, includes an indication that it is okay to proceed with the downlink and an offset to use. The offset identifies where in the downlink file the downlinking of data should start. This offset is identified from the downlink information already received for the downlink file.

Turning now to FIG. 80, a message flow diagram for downlinking data is depicted in accordance with an advantageous embodiment. As with FIG. 79, this downlink process includes two cases, case 8000 and case 8002. Case 8000 involves downlinking data with no partial downlinks, and phase 8002 involves downlinking data with partial downlinks. In FIG. 79, case 7900 illustrates the case in which a partial downlink is not available, while case 7902 illustrates the case in which a partial downlink file is available on the on ground component.

In case 8000, the message flow begins with onboard electronic distribution system 7704 downlinking the downlink file to on ground component 7702 (message W1). On ground component 7702 makes a request to downlink the file from onboard electronic distribution system 7704 to on ground component interface 7700 (message W2). This message includes a file size as well as other suitable downlink information.

On ground component interface 7700 returns a response to on ground component 7702 (message W3). A null is returned if space is unavailable to downlink the downlink file. If the downlink file can be downlinked, on ground component 7702 writes the information into a file and returns a response to onboard electronic distribution system 7704 (message W4). Thereafter, on ground component 7702 makes a request to on ground component interface 7700 to store the file (message W5).

Next, in case 8002, onboard electronic distribution system 7704 downlinks a file to on ground component 7702 (message W6). Thereafter, on ground component 7702 requests the partial downlink file from on ground component interface 7700 (message W7). In this example, the file is returned to on ground component 7702 by on ground component interface 7700 (message W8).

At this time, on ground component 7702 writes information into the file to complete the downlink file and returns a response to onboard electronic distribution system 7704 (message W9). In this example, the number of bits written in the file is identified in the response. Thereafter, on ground component 7702 sends a request to on ground component interface 7700 to store the downlinked file (message W10).

In response to this message, on ground component interface 7700 may store the file within the file system of the ground component. The ground component may be a file stored in a proxy server application or a software maintenance tool.

Figure 81:
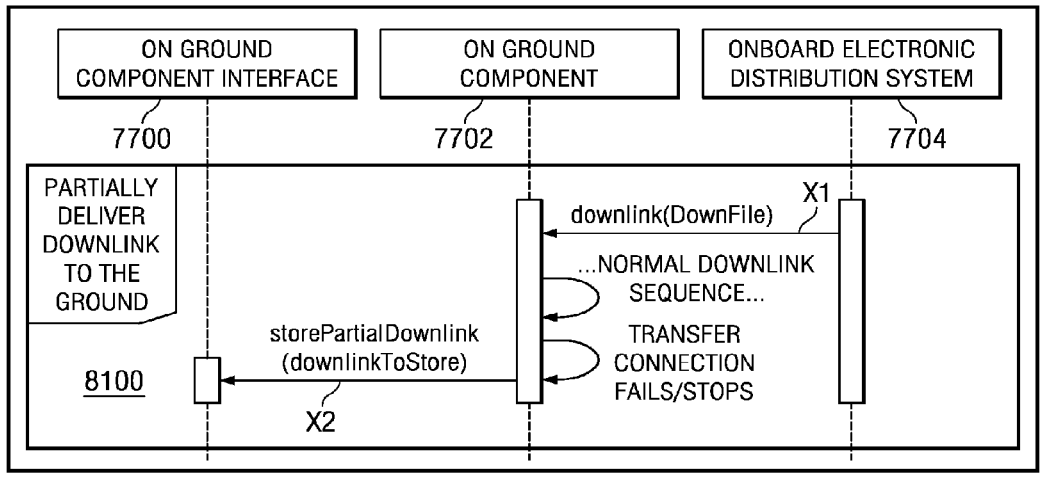
FIG. 81 is a diagram illustrating message flow when the file is only partially delivered in accordance with an advantageous embodiment.

With reference now to FIG. 81, a diagram illustrating message flow when the file is only partially delivered is depicted in accordance with an advantageous embodiment. In this example, onboard electronic distribution system 7704 downlinks a file using a normal downlink sequence in which the connection fails or stops (message X1). In response to only receiving part of the file, on ground component 7702 sends a request to on ground component interface 7700 to store the partial downlink file (message X2). In response to receiving this request, the partial downlink file is stored in a file system by on ground component interface 7700. This file system may be located in a proxy server application or a software maintenance tool.

Figure 82:
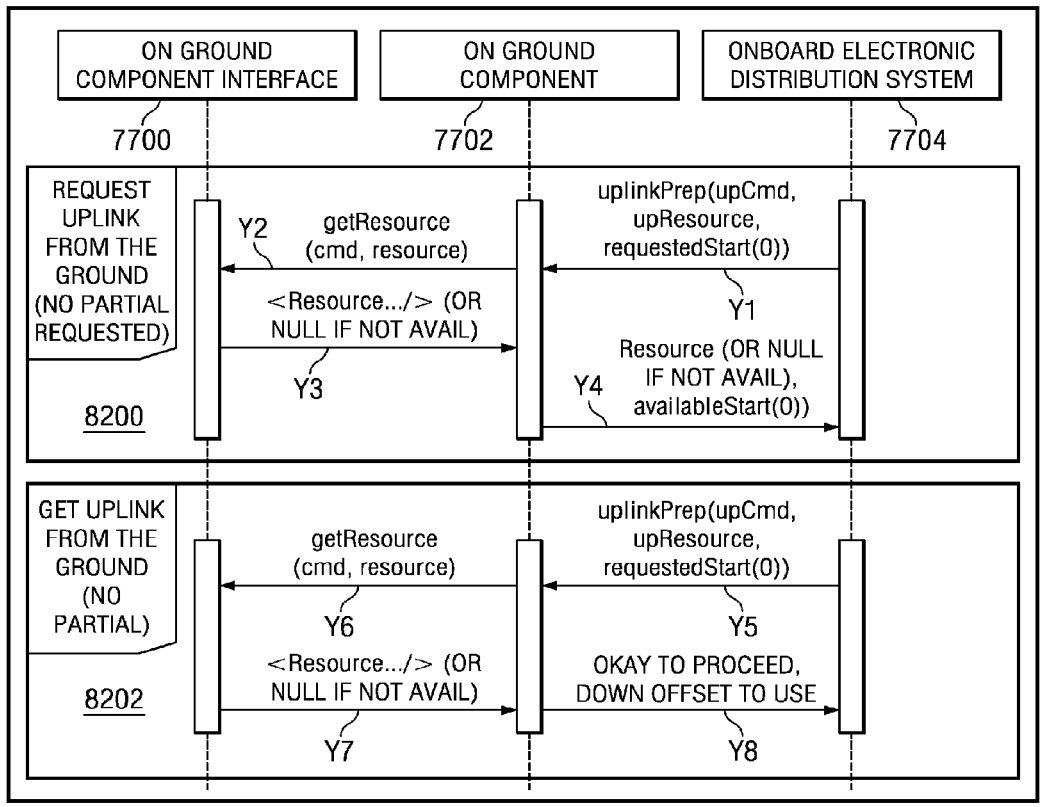
FIG. 82 is a message flow diagram illustrating an uplink process in accordance with an advantageous embodiment.

Turning now to FIG. 82, a message flow diagram illustrating an uplink process is depicted in accordance with an advantageous embodiment. Uplinking is performed in two phases in these examples. In phase 8200, information about the file to be uplinked is requested, and in phase 8202, the file itself is uplinked. In both phases, on ground component 7702 prompts the ground system for information about the resource. The ground system may be, for example, other components in a proxy server application or software maintenance tool.

As depicted, onboard electronic distribution system 7704 sends a message requesting the uplink of an aircraft software part (message Y1). In response to receiving this request, on ground component 7702 sends a call to obtain the particular aircraft software part to on ground component interface 7700 (message Y2). In response to this call, an identification of the aircraft software part is returned if the aircraft software part is present (message Y3).

If the part is not present, a null value is returned in these examples. In response to receiving this message, on ground component 7702 relays the message to onboard electronic distribution system 7704 (message Y4).

In phase 8202, onboard electronic distribution system 7704 requests the aircraft software part (message Y5). In response to receiving this request, on ground component 7702 requests the aircraft software part from on ground component interface 7700 (message Y6). On ground component interface 7700 returns the resource if it is available (message Y7). If the resource is not available, a null value is returned. On ground component 7702 then sends the aircraft software part to onboard electronic distribution system 7704 (message Y8). If the aircraft software part is not available, then an error is returned.

Figure 83:
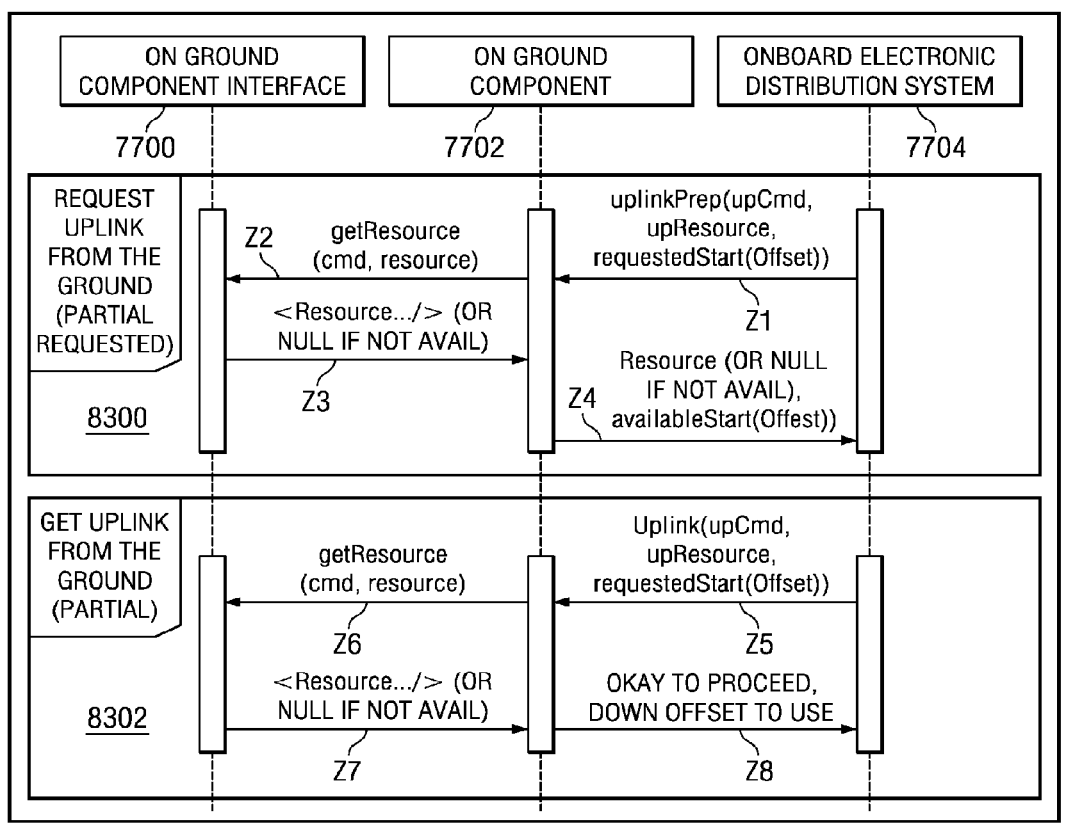
FIG. 83 is a diagram illustrating message flow in an uplink process in accordance with an advantageous embodiment.

Turning now to FIG. 83, a diagram illustrating message flow in an uplink process is depicted in accordance with an advantageous embodiment. In this example, two phases are present in the message flow, phase 8300 and phase 8302. In phase 8300, a request is made for a partial uplink of an aircraft software part, and in phase 8302, the uplink of the partial aircraft software part is performed. This partial uplinking of an aircraft software part may be performed if a previous transfer of the aircraft software part was interrupted.

In phase 8300, onboard electronic distribution system 7704 sends an uplink request to on ground component 7702. In this example, the request identifies the aircraft software part in an offset or start position from which the part should be uplinked (message Z1). In response to receiving this request, on ground component 7702 requests the aircraft software part (message Z2).

On ground component interface 7700 returns the aircraft software part if the part is present. Otherwise, a null value is returned (message Z3). In response to receiving the aircraft software part, on ground component 7702 returns a response indicating that the aircraft software part is available at the particular offset or starting point (message Z4).

Next, in phase 8302, onboard electronic distribution system 7704 requests the aircraft software part at the start or offset position (message Z5). On ground component 7702 requests the resource in response to receiving this request (message Z6).

In response to receiving the request, on ground component interface 7700 returns the aircraft software part, or a null value if the part is unavailable, to on ground component 7702 (message Z7). Responsive to receiving the response, on ground component 7702 begins uplinking the aircraft software part at the start point or offset identified (message Z8). If the part is unavailable, an error is returned to onboard electronic distribution system 7704.

Figure 84:
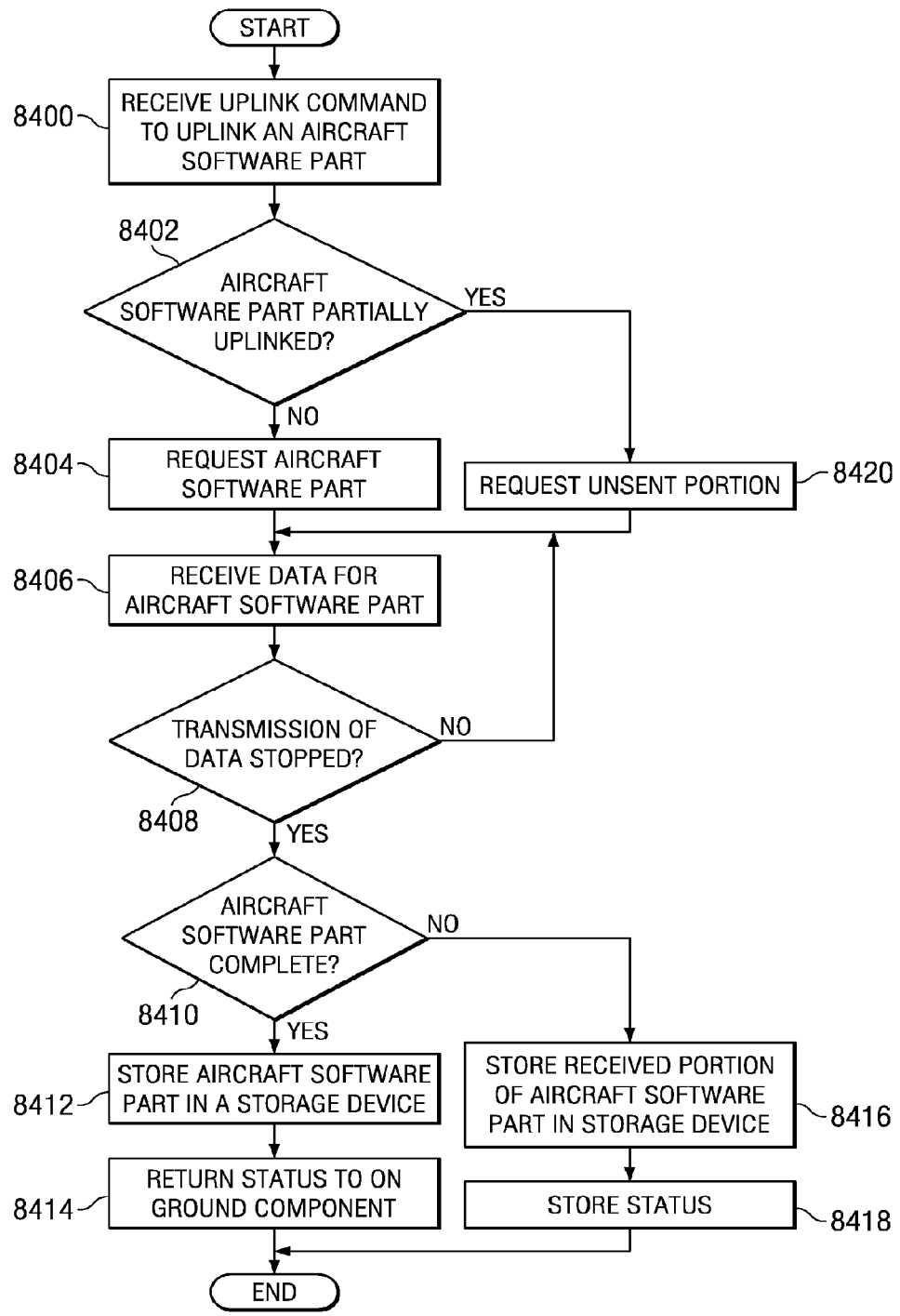
FIG. 84 is a flowchart of a process for uplinking data in accordance with an advantageous embodiment.

Turning now to FIG. 84, a flowchart of a process for uplinking data is depicted in accordance with an advantageous embodiment. The process illustrated in FIG. 84 may be implemented in an onboard electronic distribution system, such as onboard electronic distribution system 7600 in FIG. 76. In this example, the uplink data is for an aircraft software part.

The process begins by receiving an uplink command to uplink an aircraft software part (operation 8400). A determination is made as to whether the aircraft software part has already been partially uplinked (operation 8402). If the aircraft software part has not been partially uplinked, a request is made to receive the aircraft software part (operation 8404). The process then receives data for the aircraft software part (operation 8406).

A determination is made as to whether the transmission of the data has stopped (operation 8408). The transmission may stop for a number of reasons. For example, the transfer of an aircraft software part may have completed. In another example, an interruption may have occurred without completing the transfer of the aircraft software part.

The interruption may also occur due to various events. In one event, the communications link between the onboard electronic distribution system and the on ground component may have terminated unexpectedly. In another example, the event may be an operator terminating the transmission of the aircraft software part from a software maintenance tool.

If the transmission of data has not stopped, the process returns to operation 8406. Otherwise, a determination is made as to whether the aircraft software part is complete (operation 8410). If the aircraft software part is complete, the aircraft software part is stored in a storage device in the aircraft data processing system (operation 8412). In this example, the storage device may be mass storage 7602 in FIG. 76.

The process then returns a status to the on ground component (operation 8414), with the process terminating thereafter. In this example, the status indicates that the aircraft software part has been completely received.

With reference again to operation 8410, if the aircraft software part has not been completely received, the received portion of the aircraft software part is stored in a storage device (operation 8416). The process then stores the status (operation 8418), with the process terminating thereafter. In this illustrative example, the status may identify the aircraft software part and the portion of the aircraft software part that has actually been received. This information may be used at a later point to retransmit the remaining portion of the aircraft software part.

With reference again to operation 8402, if the aircraft software part has been partially uplinked, the process requests the unsent portion of the aircraft software part (operation 8420). The process then proceeds to operation 8406 to receive data from the aircraft software part. In operation 8420, the request may include an identification of the offset or start point for the aircraft software part data that has not yet been received.

Figure 85:
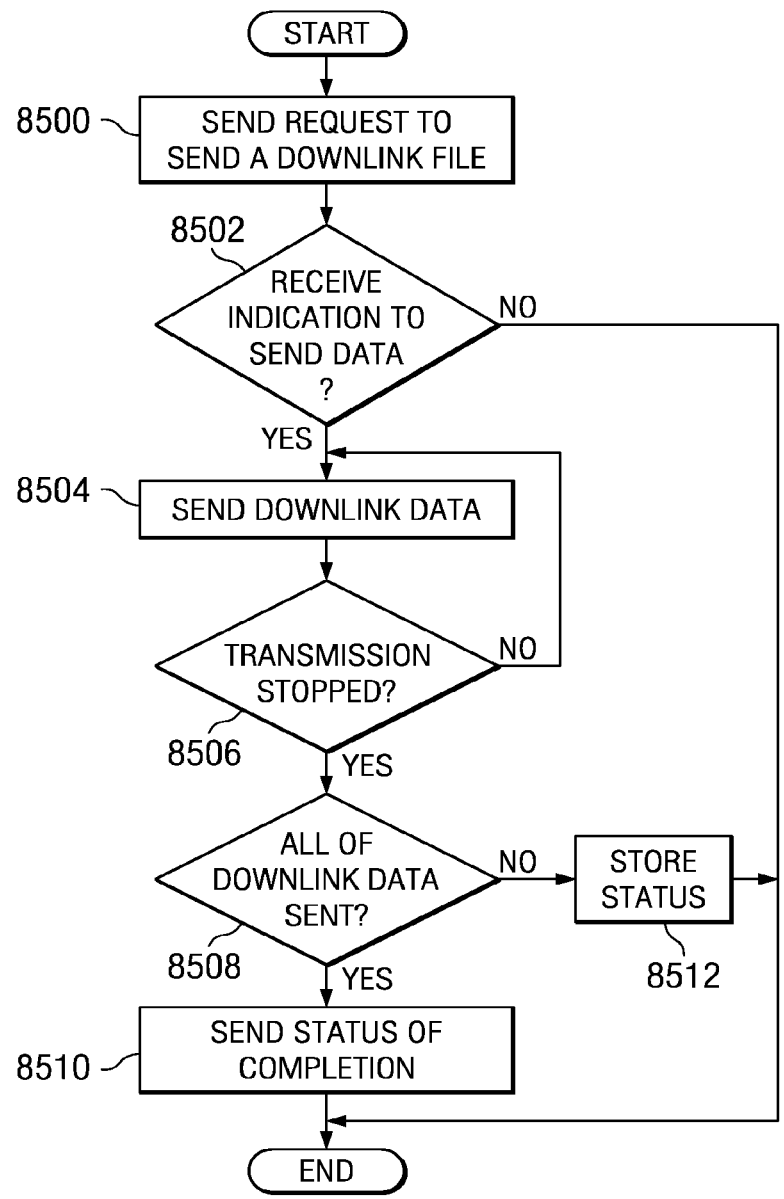
FIG. 85 is a flowchart of a process for downlinking data in accordance with an advantageous embodiment.

Turning now to FIG. 85, a flowchart of a process for downlinking data is depicted in accordance with an advantageous embodiment. The process illustrated in FIG. 85 may be implemented in an onboard electronic distribution system, such as onboard electronic distribution system 7600 in FIG. 76.

The process begins by sending a request to send a downlink file (operation 8500). A determination is made as to whether an indication is received to send the data for the downlink file (operation 8502). If an indication is received to send the data, the process sends the downlink data for the downlink file (operation 8504).

Next, a determination is made as to whether the transmission of the downlink data has stopped (operation 8506). The transmission may stop because all of the data has been sent. In other instances, for example, the transmission may stop due to a loss of a communications link or an interruption by an operator on the aircraft. If the transmission of the data has not stopped, the process returns to operation 8504 to continue to send downlink data.

If the transmission has stopped, a determination is made as to whether all of the downlink data has been sent from the downlink file (operation 8508). If all of the downlink data has been sent, the process sends a status of the completion (operation 8510), with the process terminating thereafter.

With reference again to operation 8508, if all of the downlink data has not been sent, a status of the transmission of the downlink data is stored (operation 8512). In these examples, the status may be stored as status information 7618 in FIG. 76. The status, in this example, may identify the downlink file and the amount of data that was sent.

This process also may be used to send a partial downlink file in which a portion of the downlink file has already been sent. With this type of downlinking, operation 8500 sends a request to downlink a portion of the downlink file rather than the entire file. With a partial downlink file, operation 8502 is a positive indication if the on ground component finds the partially downlinked data from a previous transmission. This indication also includes an offset or starting point to send the rest of the downlink file.

Aircraft software parts may be received from various sources. Aircraft software parts may be received from a manufacturer of the aircraft or some third party source, depending on the particular implementation. Further, an airline also may create aircraft software parts for use within its aircraft. These parts are distributed using crates in the different advantageous embodiments.

The different advantageous embodiments provide a computer implemented method, apparatus, and computer program product that promotes automation of the receipt and distribution processing digitalized content, computer program(s), or data in digital form that is sensible by a computer. One advantageous embodiment includes the replacement of the physical shipping crate and physical media with a computer sensible crate that facilitates automation. Another advantageous embodiment is the application of one or more digital signatures to the objects inside the crate and to the crate itself. Thus, in conjunction with a functioning Private Key Infrastructure, it provides authentication of the sender, non-repudiation, and assurance of integrity.

In another advantageous embodiment, a method is used for automated processing aircraft software parts. An incoming crate, which can be an electronic zip file, containing a signed aircraft software part is received from a source outside of an airline's part management system. A set of signatures is validated for the incoming crate and the aircraft software part. Responsive to the set of signatures being valid, the incoming crate is unpacked. The contents of the incoming crate may be displayed at the user's discretion. Responsive to a request to upload the unpacked aircraft software part to a library in an aircraft software part management system or apparatus, the unpacked aircraft software part is signed again with an approval signature to form a signed, approved aircraft software part. An advantageous embodiment is that this second approval digital signature also acts to transfer bailment from the provider of the part to the recipient of the part and provides non-repudiation of the consummation of the transaction.

In an advantageous embodiment, the crate containing the signed, recipient approved aircraft software part is signed to form a signed crate wherein signatures for the signed, approved aircraft software part and the signed crate are different from the set of signatures on the incoming crate. The signed crate may be sent to the recipient's library in the aircraft software part management system or apparatus.

In another advantageous embodiment, a computer implemented method is used for processing additional configuration items. A crate containing a configuration item is received to form a received crate. A determination is made as to whether a set of signatures for the crate and the configuration item are valid. Responsive to a determination that the set of signatures are valid, the configuration item is stored.

Figure 86:
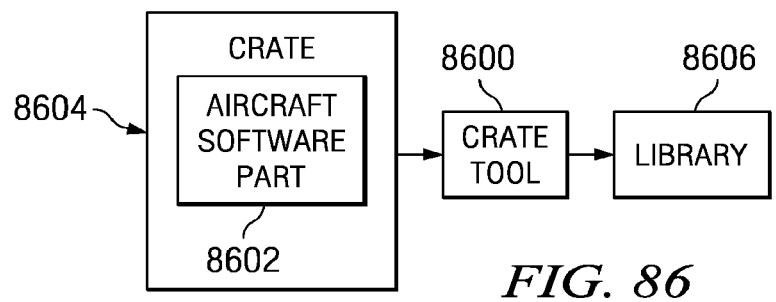
FIG. 86 is a diagram illustrating a crate tool in accordance with an advantageous embodiment.

Turning now to FIG. 86, a diagram illustrating a crate tool is depicted in accordance with an advantageous embodiment. Crate tool 8600 is used to receive and manage crates for use in an environment, such as aircraft software part management apparatus 300 in FIG. 3.

Additionally, crate tool 8600 may be implemented in other components for creating crates within aircraft software part management apparatus 300 in FIG. 3. For example, the functionality of crate tool 8600 may be implemented in a software maintenance tool, such as software maintenance tool 5400 in FIG. 54. As another example, these functions also may be implemented in aircraft network 101 in FIG. 1 to send information, such as downlink files in crates, back to a ground network.

In this example, crate tool 8600 may receive aircraft software part 8602 stored or wrapped within crate 8604. Although these examples illustrate aircraft software part 8602 as being the contents of crate 8604, any configuration item may be placed into crate 8604 for use within aircraft software part management apparatus 300 in FIG. 3, in these examples. For example, a configuration item also may take the form of a document, configuration information, or other suitable information.

Crate tool 8600 processes crate 8604 for uploading to library 8606. Library 8606 may be implemented using library 1700 in FIG. 17. This processing may include various functions, such as checking the integrity and a set of signatures within crate 8604. The checking of signatures may include both the signature for crate 8604 and aircraft software part 8602. Further, aircraft software part 8602 may be removed from crate 8604 and inspected. Crate tool 8600 also may repackage aircraft software part 8602 into another crate for uploading to library 8606.

Figure 87:
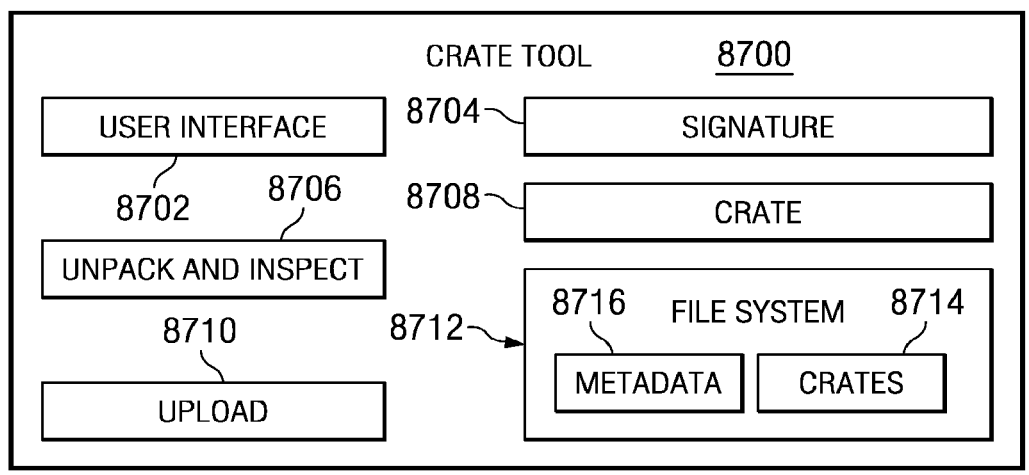
FIG. 87 is a diagram illustrating a crate tool in accordance with an advantageous embodiment.

Turning now to FIG. 87, a diagram illustrating a crate tool is depicted in accordance with an advantageous embodiment. Crate tool 8700 is a more detailed illustration of crate tool 8600 in FIG. 86. Crate tool 8700 includes user interface 8702, signature 8704, unpack and inspect 8706, crate 8708, and upload 8710. User interface 8702 provides a user interface for a user to operate crate tool 8700. Crate tool 8700 may be implemented in a data processing system, such as data processing system 200 in FIG. 2.

Signature 8704, in these examples, provides a number of different functions. For example, signature 8704 may check the integrity of a crate and its configuration items. This integrity may be performed by checking a digital signature for the crate and its contents. In these examples, the signatures are located in extensible markup language documents that are separate from the contents that are signed. In other embodiments, signatures may be integral to the signed configuration item.

Signature 8704 may sign an existing aircraft software part as well as other documents, files, and other suitable data. Unpack and inspect 8706 allows a user to remove aircraft software parts and other information from a crate and inspect or view those components. In unpacking a crate, unpack and inspect 8706 unzips or removes aircraft software parts from the crate and places them in a selected file system.

Additionally, if a packing slip is present in the crate, this packing slip also may be displayed. The inspect portion of this function may be used to allow a user to inspect the contents and signature validity of crates 8714 stored in file system 8712. Crate 8708 allows a user to create new crates and manipulate existing crates.

For example, in manipulating crates, a user may organize crates, add to, or subtract from its contents. Crates may be organized in a number of different ways, depending on the particular implementation. For example, a directory may store crates containing aircraft software parts for a particular type of aircraft. Also, crates may be stored based on their source. Upload 8710 provides a function to send signed configuration items in crates from crate tool 8700 to a library, such as library 1700 in FIG. 17, in these examples.

Figure 88:
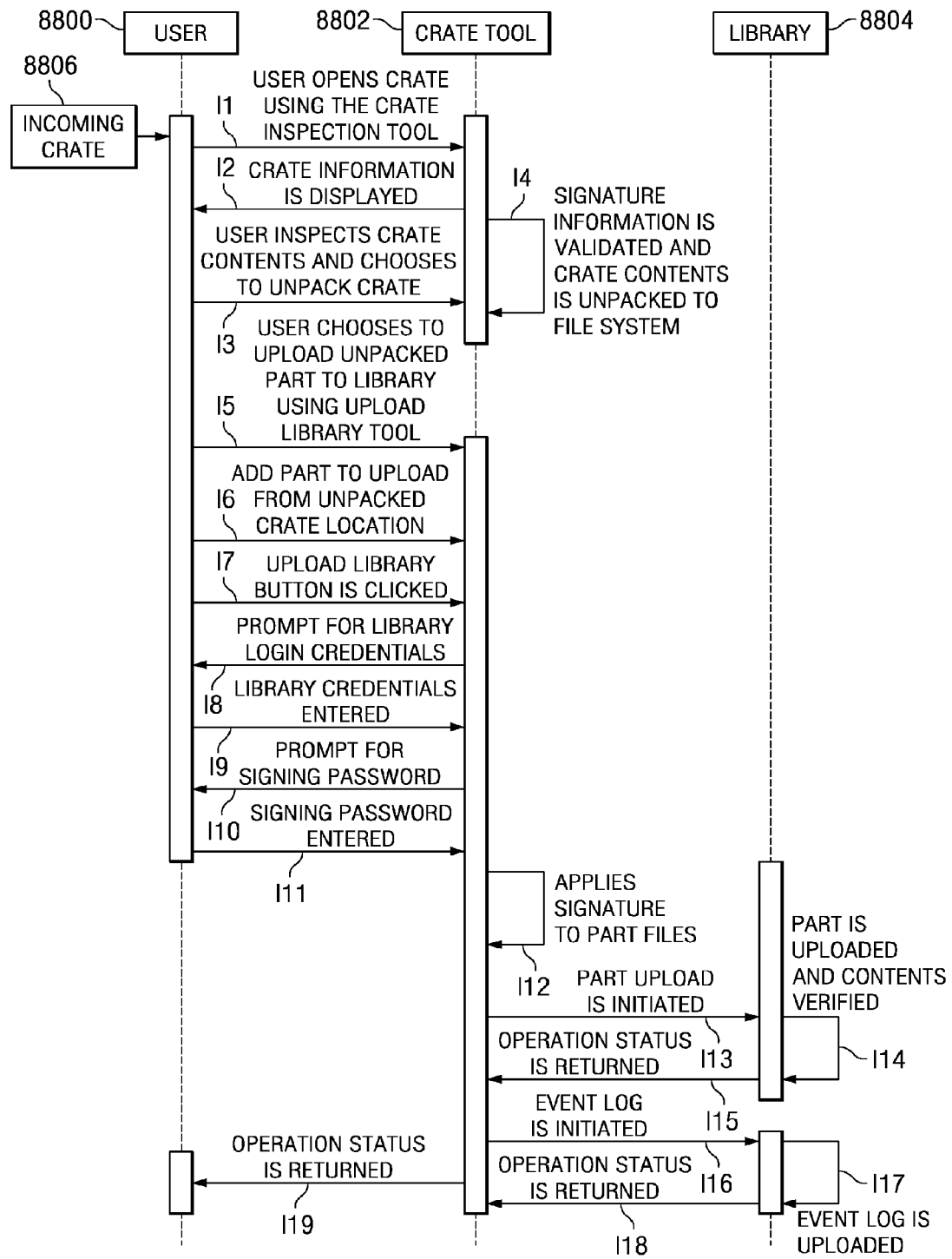
FIG. 88 is a message flow diagram illustrating the processing of a crate in accordance with an advantageous embodiment.

Turning now to FIG. 88, a message flow diagram illustrating the processing of a crate is depicted in accordance with an advantageous embodiment. The message flow in FIG. 88 illustrates a flow of messages used to process crates for uploading to a library.

In this example, the different components involved in processing a crate involve user 8800, crate tool 8802, and library 8804. The message flow, in this example, begins when a user processes or receives incoming crate 8806. In this example, a user may receive incoming crate 8806 from various sources. For example, incoming crate 8806 may be received through an internet connection or through some physical media, such as a flash memory or compact disc.

The user opens the crate using the crate inspection tool (operation I1). In response to this user input, crate tool 8802 displays crate information to the user (operation I2). The user then inspects the crate contents and chooses to unpack the crate (operation I3). In response to receiving this user input, crate tool 8802 validates the signature information and unpacks the contents of the crate into the file system (operation I4). The signatures in incoming crate 8806 are signatures generated by the source of the aircraft software part in incoming crate 8806.

Thereafter, user input is generated by user 8800 to upload the unpacked aircraft software part to the library using a library upload tool (operation I5). The user enters user input to add a part to upload from the unpacked crate location (operation I6). The user then presses an upload to library button (operation I7).

In response to this user input, crate tool 8802 prompts user 8800 for library login credentials (operation I8). In response to this prompt, user 8800 enters library credentials (operation I9). Crate tool 8802 then prompts the user for a signing password to sign the aircraft software part (operation I10). In response to receiving this prompt, user 8800 enters a password (operation I11). The signing password, in these examples, is used to create the signature that is to be applied to the various files for the aircraft software part. In response to receiving the password from the user, crate tool 8802 applies the signature to the different aircraft software part files (operation I12).

As part of this signing process, a new crate is created with the aircraft software part files being placed in that new crate. With this type of implementation, the digital signatures on the aircraft software part in the crate, at this stage, is different from the signatures from incoming crate 8806. The signatures that are applied now are ones for a particular user, such as a particular airline or maintenance facility.

After the signature has been applied, a part upload is initiated by crate tool 8802 to library 8804 (operation I13).

Library 8804 uploads the aircraft software part in the crate and verifies the contents (operation I14). Thereafter, an operation status is returned to crate tool 8802 from library 8804 (operation I15). Crate tool 8802 sends an event log to library 8804 (operation I16). The event log is uploaded by library 8804 (operation I17).

Next, an operation status on the upload is returned to crate tool 8802 from library 8804 (operation I18). This operation status is then presented to user 8800 by crate tool 8802 (operation I19).

Figure 89:
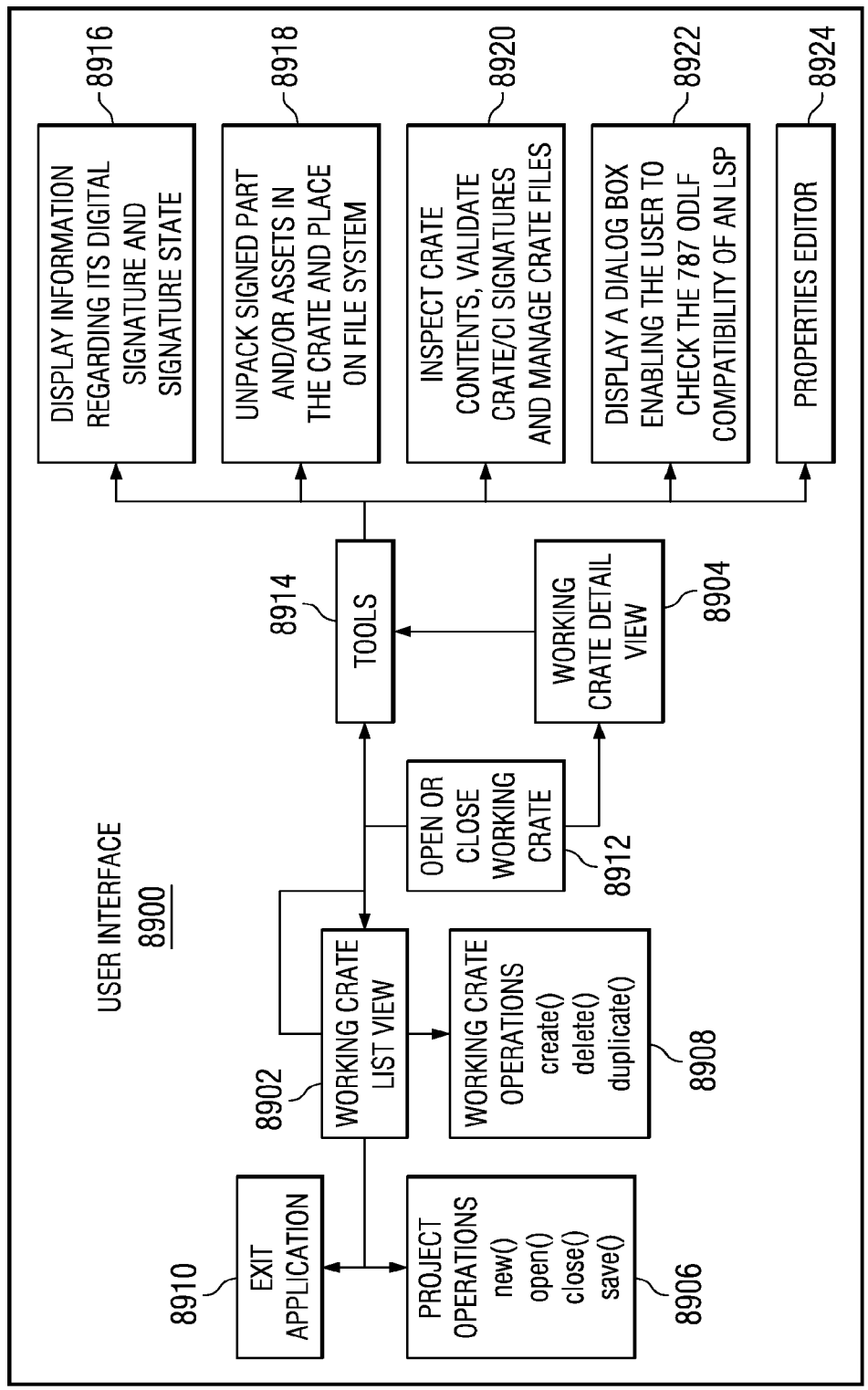
FIG. 89 is a diagram illustrating one implementation of a user interface for a crate tool in accordance with an advantageous embodiment.

Turning now to FIG. 89, a diagram illustrating one implementation of a user interface for a crate tool is depicted in accordance with an advantageous embodiment. In this example, user interface 8900 illustrates components that may be used to implement user interface 8702 in crate tool 8700 in FIG. 87. In this example, user interface 8900 includes working crate list view 8902 and working crate detail view 8904.

Working crate list view 8902 displays a list of different crates. From this view, a user may initiate project operations 8906, working crate operations 8908, or exit application 8910. Project operations 8906 may be used to create a new project, open an existing project, close a current project, or save a current project. Working crate operations 8908 allow a user to create crates, delete crates, or duplicate crates in these examples. Exit application 8910 allows a user to exit the crate tool.

Further, from working crate list view 8902, a user may initiate open or close working crate 8912. If a working crate is open, working crate detail view 8904 is employed. Working crate detail view 8904 provides a user interface that may display different functions, depending on the particular type of crate being processed.

In addition, from working crate list view 8902 and from working crate detail view 8904, a user may access tools 8914. Tools 8914 provide various functions, such as checking crate integrity, unpacking and inspecting crates, and checking compatibility and setting preferences. In this example, tools 8914 provide functions 8916, 8918, 8920, 8922, and 8924. Function 8916 displays information regarding the digital signature and the signature states of the configuration item. Examples of signatures states are manufacturing, approval, and source.

Function 8918 unpacks a signed part and/or assets in the crate and places those components into the file system. Function 8920 provides for an inspection of crate contents, validates crate and component signatures, and manages crate files. Function 8922 allows a user to check the compatibility of an aircraft software part with the airplane's onboard data load function (ODLF). Function 8924 allows a user to edit various properties and preferences. The depicted functions are provided as illustrative examples of functions that may be provided in tools 8914. Of course, other functions may be used in addition to, or in place of, the depicted functions.

Figure 90:
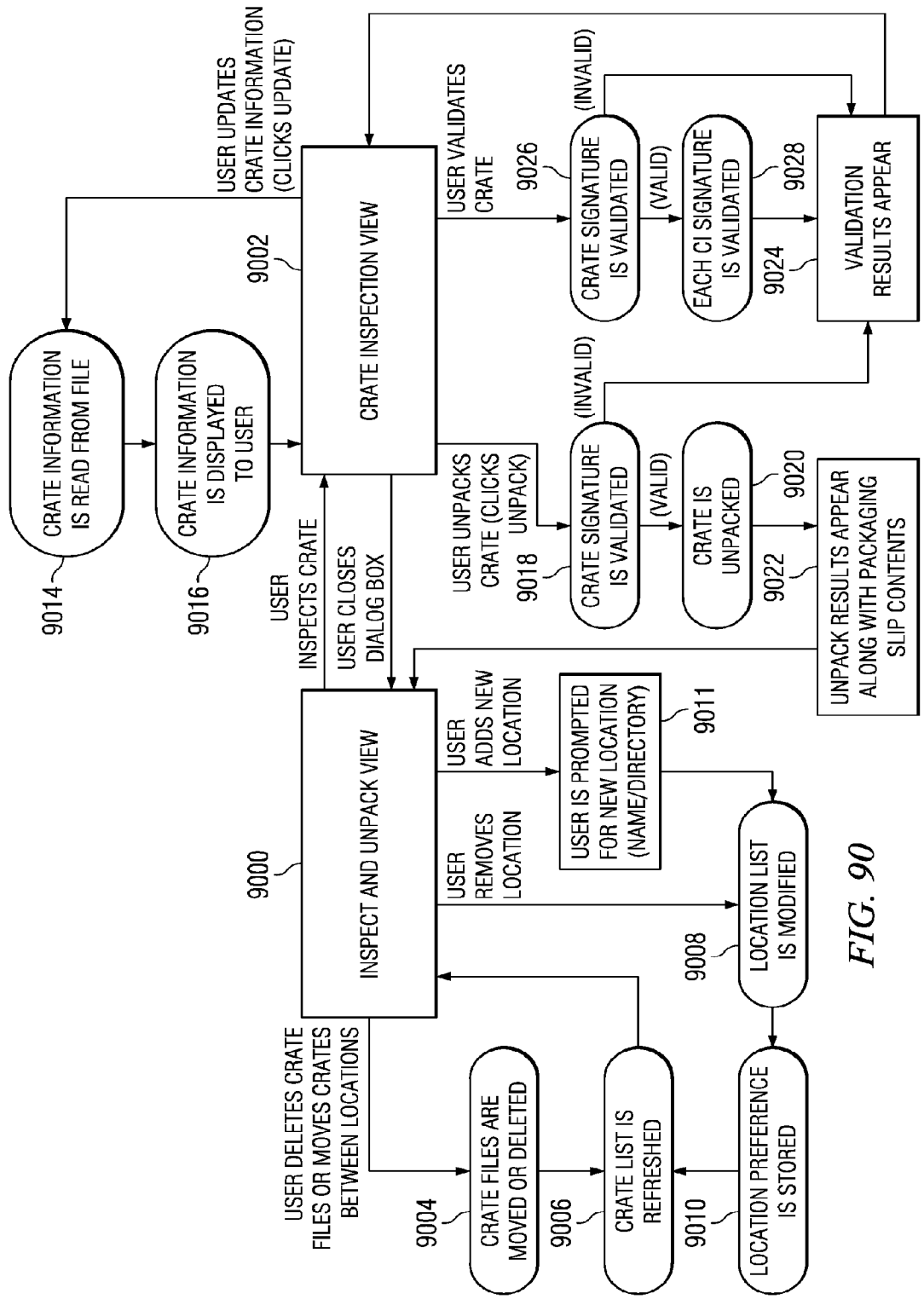
FIG. 90 is a diagram illustrating data flow in inspecting and unpacking crates in accordance with an advantageous embodiment.

With reference now to FIG. 90, a diagram illustrating data flow in inspecting and unpacking crates is depicted in accordance with an advantageous embodiment. The data flow illustrated in FIG. 90 may be implemented in unpack and inspect 8706 in crate tool 8700 in FIG. 87.

In this example, two dialog boxes or views are presented, inspect and unpack view 9000 and crate inspection view 9002. Inspect and unpack view 9000 is displayed to a user and allows a user to perform various actions with respect to a crate that has been received by the crate tool. For example, a user may select an operation to manipulate a crate. This operation may be, for example, delete or move a set of crate files.

If the user selects this operation from inspect and unpack view 9000, the selected crate files are moved or deleted (operation 9004). Thereafter, the crate list is refreshed (operation 9006), and the process returns to inspect and unpack view 9000.

If a user selects an operation such as removing a location, the process then modifies the location list (operation 9008). The location preference is then stored (operation 9010), with the process then returning to operation 9006 as described above. This location preference is a path or direction selected by the user. In this manner, a user may remove a location from a set of directories or a set of locations in which crates may be stored.

At inspect and unpack view 9000, if the user enters user input at a new location in this view, the user is prompted for a new location (operation 9011). Once the user enters the new location information, the process proceeds to operation 9008 as described above. If the user selects or decides to inspect a crate, the process moves to crate inspection view 9002. In this user interface, the user may perform various actions with respect to a crate. For example, a user may select to update crate information. Thereafter, crate information is read from the file (operation 9014). The process then updates dialog box controls with data to display crate information to the user (operation 9016).

When crate inspection view 9002 is displayed, a user may select another action, such as unpacking a crate. The selecting of this action results in the crate signature being validated (operation 9018). If the signature is valid, the crate is unpacked (operation 9020). The process presents the results of unpacking the crate along with displaying any packing slip contents in crate inspection view 9002 (operation 9022). Thereafter, the process returns to inspect and unpack view 9000.

In operation 9018, if the signature of the crate is invalid, the process presents the validation results (operation 9024). These results present in crate inspection view 9002 may include an indication that the signature problem is fatal if the validation is incorrect for a crate signature.

In crate inspection view 9002, if the user selects to validate a crate, the process validates the crate signature (operation 9026). If the crate signature is valid, then each configuration item signature is then validated (operation 9028). In both operations 9026 and 9028, the process proceeds to operation 9024 to display the results of the validation. If a configuration item signature is not valid, then a warning is presented in contrast with a fatal problem occurring if the crate signature is not valid. In crate inspection view 9002, if the user closes the dialog box, the process returns to inspect and unpack view 9000.

Figure 91:
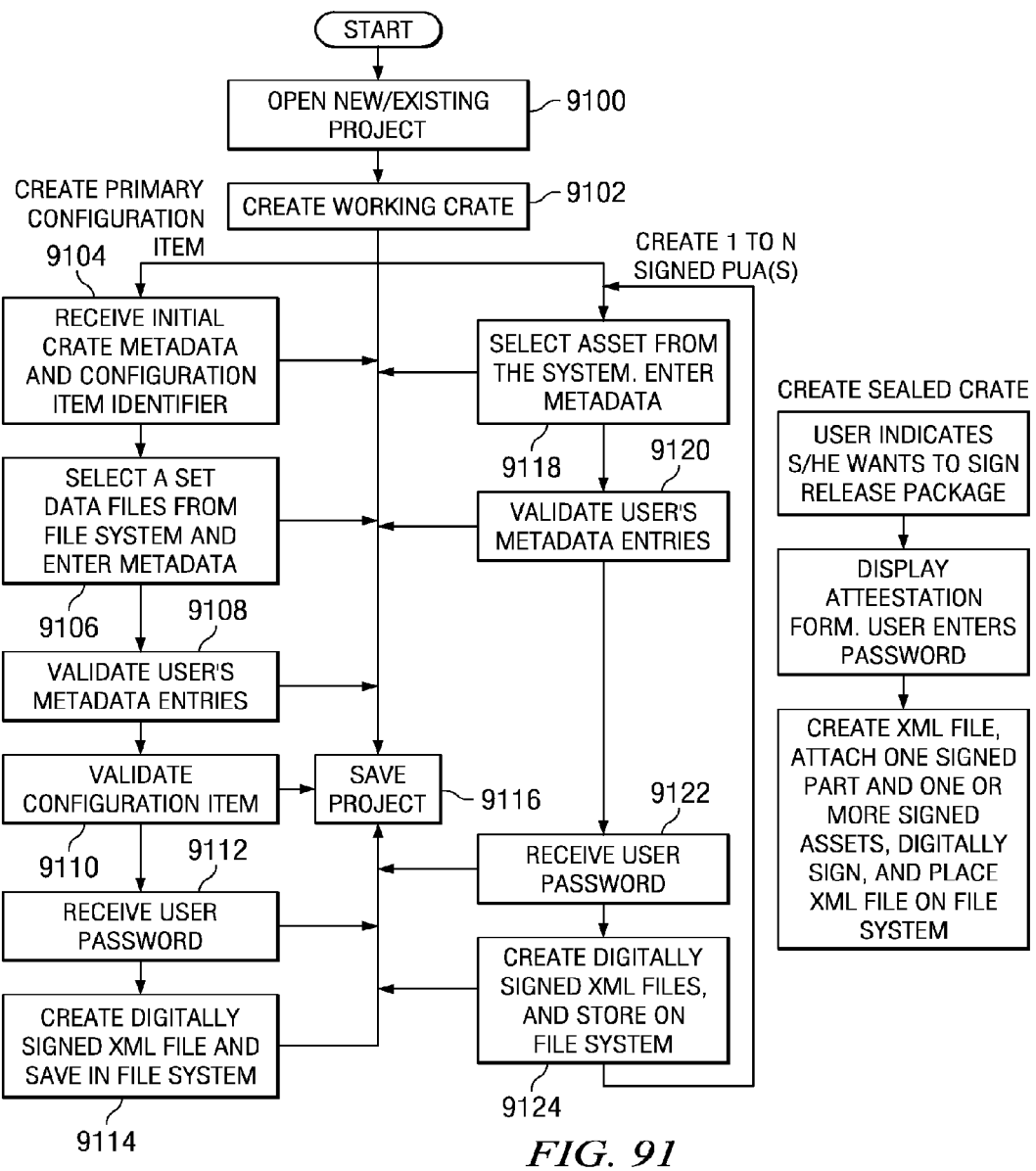
FIG. 91 is a diagram illustrating the data flow in creating a crate in accordance with an advantageous embodiment.

Turning now to FIG. 91, a diagram illustrating the data flow in creating a crate is depicted in accordance with an advantageous embodiment. The process illustrated in FIG. 91 may be implemented in a crate tool, such as crate tool 8700 in FIG. 87. More specifically, the different operations illustrated in FIG. 91 may be implemented in crate 8708 in FIG. 87.

In this example, the process begins by opening a new or existing project (operation 9100). Thereafter, the process creates a working crate (operation 9102). In creating an initial signed configuration item, the process begins by receiving initial crate metadata and a configuration item identifier (operation 9104). In these examples, a configuration item is a single item consisting of a set of files that may be stored within a crate. Each configuration item has a unique identifier. A configuration item may be, for example, an aircraft software part, a related document, or some other file.

The user then navigates to the configuration item's data directory on the file system and enters metadata for those selected files (operation 9106). A directory of data files is selected because a particular configuration item may be comprised of more than one file. For example, an aircraft software part may include an executable file, a configuration file, and a dynamic link library.

Then, the process validates the metadata entries made by the user (operation 9108). In operation 9108, the process may determine whether the metadata entries meet a set of rules. These rules may require certain types of configuration items that contain certain amounts of information and certain types of information. For example, with aircraft software parts, a source or manufacturer of the aircraft software part, as well as an identification of the type of aircraft, may be entered as metadata. In addition, the metadata also may identify a particular aircraft that is to receive the aircraft software part.

The process may validate the configuration item depending upon the type of working crate (operation 9110). Next, the process receives a user password (operation 9112). The process then creates a digitally signed extensible markup language file for the configuration item and stores the digitally signed extensible markup language file with the configuration item in the file system (operation 9114). The process proceeds to save the project (operation 9116). A user may, during any of these different operations, choose to halt and save the project and continue the project at another time.

The user then navigates to the asset's data directory on the file system and enters metadata for those selected files (operation 9118). Thereafter, the process validates the metadata entries made by the user (operation 9120). The process receives a user password (operation 9122). The process then creates a digitally signed extensible markup language file for the asset and stores it on the file system (operation 9124).

Figure 92:
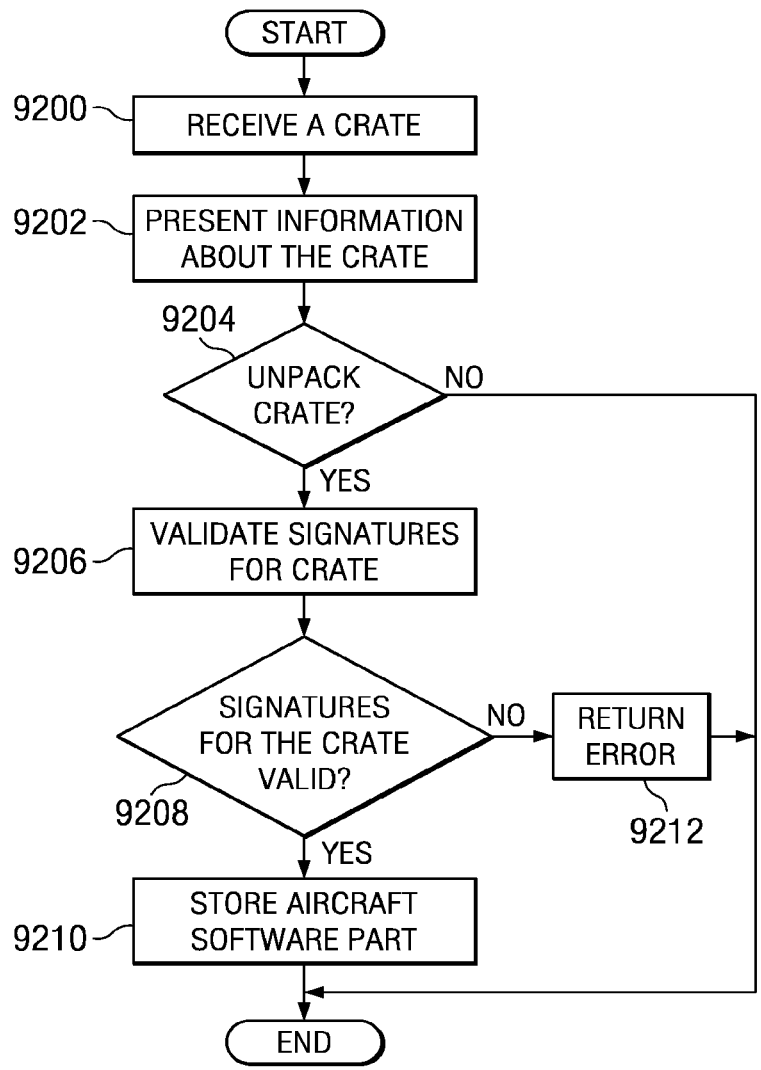
FIG. 92 is a flowchart of a process for processing a received crate in accordance with an advantageous embodiment.

Turning now to FIG. 92, a flowchart of a process for processing a received crate is depicted in accordance with an advantageous embodiment. The process illustrated in FIG. 92 may be implemented in a software component, such as crate tool 8700 in FIG. 87. More specifically, the process may be implemented in unpack and inspect 8706 in FIG. 87.

The process begins by receiving a crate (operation 9200). In this example, the crate may be received through various sources. For example, a physical media may be connected to or placed into the data processing system in which the process executes. In other embodiments, the crate may be received through a communications link, such as a network link.

The process presents information about the crate (operation 9202). In this operation, the information may be presented through a graphical user interface. This information may include, for example, the manufacturer source of the crate, an identification of the contents in the crate, a size of the crate, and other suitable information. Thereafter, a determination is made as to whether to unpack the crate (operation 9204). This determination may be made through receiving user input.

If the crate is to be unpacked, the process validates signatures for the crate (operation 9206). In these examples, the signatures may be signed using a private key. A public key located in the crate may be used to determine whether the manifest and file digests are valid. This validation also is used to determine whether the crate actually has been originated by the source and remains unmodified or tampered with.

A determination is made as to whether the signatures for the crate are valid (operation 9208). If the crate signature is valid, the process unpacks the crate containing the aircraft software part and stores it on the file system (operation 9210). The configuration item signatures do not have to be valid to unpack the crate. It is up to the user whether or not to continue unpacking the crate if one or more invalid configuration item signatures are detected. In these examples, if the crate signature is valid, the aircraft software part is unpacked and stored within a file system as described in operation 9210. The process terminates thereafter.

With reference again to operation 9208, if the crate signature is not valid, an error is returned (operation 9212), with the process terminating thereafter. With reference back to operation 9204, if the user decides not to unpack the crate, the process also terminates.

This tool supports the work flow status and dynamics. The implementation of a user interface as discussed in FIG. 2 above allows the user to create, validate, and complete a crate. A crate starts with a draft status, and so does each component of the crate (such as the part and a related document). As this process proceeds, the status of the crate, as well as each component, changes from draft to in-work, and to complete as the crate is signed. The implementation also allows the user to add, delete, or modify any components of the crate. Any addition, deletion, or modification will result in a change of the current status of the relevant component and that of the crate, and thus requires re-validation and resigning. The status is graphically indicated in both crate list view and crate detailed view. While providing flexibility and supporting work flow, this functionality further ensures the integrity of completed crates.

This tool supports the dynamic release/distribution work flow status. The implementation of a user interface as discussed in FIG. 4 above allows the user to create, validate, and complete a crate. A crate starts with a draft status, and so does each component of the crate (such as the part and a related document). As this process proceeds, the status of the crate, as well as each component, changes from draft to in-work, and to complete as the crate is signed. The implementation also allows the user to add, delete or modify any components of the crate. Any addition, deletion or modification may result in a change of the current status of the relevant component and that of the crate, and thus requires re-validation and resigning. The status is graphically indicated in both crate list view and crate detailed view. While providing flexibility and supporting work flow, this functionality further ensures the integrity of completed crates.

The flowcharts and block diagrams in the different depicted embodiments may illustrate the architecture, functionality, and operation of one or more possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Further, the different block diagrams of software components, hardware components, and data structures illustrated in this disclosure are provided for purposes of depicting one manner in which the different advantageous embodiments can be implemented and are not meant to limit the form that different embodiments may take. For example, some of the block diagrams illustrate functional blocks that may be combined or subdivided in software implementations. Also, the hardware and architecture illustrated in these examples may be varied in different advantageous embodiments. Also, the different examples of graphical user interfaces are presented for purposes of illustrating one manner in which a user interface may be implemented. These examples also are not meant to limit the manner in which different advantageous embodiments may be implemented.

The different advantageous embodiments can take the form of an entirely hardware-based embodiment, an entirely software-based embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, a floppy magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over one or more communications links. Each communications link may be either wired or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output (or I/O) devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for managing aircraft software parts, the computer implemented method comprising:
   receiving an aircraft software part at a library to form a received aircraft software part;
   storing the received aircraft software part in a storage in the library with a plurality of aircraft software parts;
   responsive to receiving a user input from a user interface system to uplink a selected aircraft software part from the plurality of aircraft software parts in the library to a target aircraft data processing system, creating a command to send the selected aircraft software part to an aircraft in which the target aircraft data processing system is located to form an uplink command that is used to send information from the library to the aircraft, wherein the user interface system is configured to manipulate the plurality of aircraft software parts in the library;
   storing the uplink command in a queue in the storage in the library to form a stored uplink command;
   distributing the stored uplink command to a proxy server application in response to a request for commands from the proxy server application; and
   responsive to receiving a request for the selected aircraft software part from the proxy server application processing the stored uplink command, sending the selected aircraft software part to the proxy server application.

2. The computer implemented method of claim 1 further comprising:
   distributing the stored uplink command to a software management tool in response to a request for the commands from the software management tool.

3. The computer implemented method of claim 1 further comprising:
   storing the aircraft software part in a crate in a storage device.

4. The computer implemented method of claim 3, wherein the aircraft software part is digitally signed and the crate is digitally signed.

5. The computer implemented method of claim 1, wherein the aircraft software part is stored in a files system in the storage and wherein the queue is located in a database in the storage.

6. The computer implemented method of claim 1 further comprising:
   deleting a set of aircraft parts from the plurality of aircraft software parts in response to another user input.

7. The computer implemented method of claim 1 further comprising:
   receiving status information on uplinks of the aircraft software parts to form received status information; and
   storing the received status information.

8. An apparatus comprising:
   a file system located on a storage device, wherein the file system stores a plurality of aircraft software parts;
   a database located on the storage device, wherein the database stores a plurality of commands used to manage the plurality of aircraft software parts;

a management component configured to generate the plurality of commands;
a user interface system configured to receive user input to operate the management component; and
a processor unit configured to:
receive an aircraft software part at a library to form a received aircraft software part;
store the received aircraft software part in a storage device in the library with the plurality of aircraft software parts;
create a command to send a selected aircraft software part to an aircraft in which the target aircraft data processing system is located to form an uplink command in response to receiving a user input from the user interface system to uplink the selected aircraft software part from the plurality of aircraft software parts in the library to a target aircraft data processing system, wherein the uplink command is used to send information from the library to the aircraft;
store the uplink command in a queue in the storage device in the library to form a stored uplink command;
distribute the stored uplink command to a proxy server application in response to a request for commands from the proxy server application; and
send the selected aircraft software part to the proxy server application in response to receiving a request for the selected aircraft software part from the proxy server application processing the stored uplink command.

9. The apparatus of claim 8, wherein the management component comprises a parts vault and a command dispatcher.

10. The apparatus of claim 8, wherein the storage device is a set of hard disk drives.

11. A computer comprising:
a bus;
a communications adapter connected to the bus;
a user interface system configured to manipulate a plurality of aircraft software parts in a library, the user interface system in communication with the bus;
a memory connected to the bus, wherein computer usable program code is stored on the bus; and
a processor unit connected to the bus, wherein the processor unit executes the computer usable program code to receive an aircraft software part at the library to form a received aircraft software part; store the received aircraft software part in a storage in the library with the plurality of aircraft software parts;
create a command to send a selected aircraft software part to an aircraft in which the target aircraft data processing system is located to form an uplink command in response to receiving a user input from the user interface system to uplink the selected aircraft software part from the plurality of aircraft software parts in the library to a target aircraft data processing system, wherein the uplink command is used to send information from the library to the aircraft;
store the uplink command in a queue in the storage in the library to form a stored uplink command;
distribute the stored uplink command to a proxy server application in response to a request for commands from the proxy server application;
and send the selected aircraft software part to the proxy server application in response to receiving a request for the selected aircraft software part from the proxy server application processing the stored uplink command.

12. The computer of claim 11, wherein the processor unit further executes the computer usable program code to distribute the stored uplink command to a software management tool in response to a request for the commands from the software management tool.

13. A non-transitory computer readable storage medium storing program code executable by a processor, comprising:
program code, stored on the non-transitory computer readable storage medium and configured to receive an aircraft software part at a library to form a received aircraft software part;
program code, stored on the non-transitory computer readable storage medium and configured to store the received aircraft software part in a storage in the library with a plurality of aircraft software parts;
program code, stored on the non-transitory computer readable storage medium and configured to, responsive to receiving a user input from a user interface system to uplink a selected aircraft software part from the plurality of aircraft software parts in the library to a target aircraft data processing system, create a command to send the selected aircraft software part to an aircraft in which the target aircraft data processing system is located to form an uplink command that is used to send information from the library to the aircraft, wherein the user interface system is configured to manipulate the plurality of aircraft software parts in the library;
program code, stored on the non-transitory computer readable storage medium and configured to store the uplink command in a queue in the storage in the library to form a stored uplink command;
program code, stored on the non-transitory computer readable storage medium and configured to distribute the stored uplink command to a proxy server application in response to a request for commands from the proxy server application; and
computer program code, non-transitory computer readable storage medium and configured to, responsive to receiving a request for the selected aircraft software part from the proxy server application processing the stored uplink command, send the selected aircraft software part to the proxy server application.

14. The non-transitory computer readable storage medium of claim 13 further comprising:
computer program code, stored on the computer recordable storage media, for distributing the stored uplink command to a software management tool in response to a request for the commands from the software management tool.

15. The non-transitory computer readable storage medium of claim 13 further comprising:
computer program code, stored on the non-transitory computer readable storage medium and configured to store the aircraft software part in a crate in the storage device.

16. The non-transitory computer readable storage medium of claim 15, wherein the aircraft software part is digitally signed and the crate is digitally signed.

17. The non-transitory computer readable storage medium of claim 13, wherein the aircraft software part is stored in a files system in the storage and wherein the queue is located in a database in the storage.

18. The non-transitory computer readable storage medium of claim 13 further comprising:
computer program code, stored on the non-transitory computer readable storage medium and configured to delete a set of aircraft parts from the plurality of aircraft software parts in response to another user input.

19. The non-transitory computer readable storage medium of claim 13 further comprising:
 computer program code, stored on the non-transitory computer readable storage medium and configured to receive status information on uplinks of the aircraft software parts to form received status information; and
 computer program code, stored on the non-transitory computer readable storage medium and configured to store the received status information.

* * * * *